United States Patent
Evans et al.

(10) Patent No.: US 10,343,355 B2
(45) Date of Patent: *Jul. 9, 2019

(54) SYSTEMS FOR ADDITIVELY MANUFACTURING COMPOSITE PARTS

(71) Applicant: The Boeing Company, Chicago, IL (US)

(72) Inventors: Nick S. Evans, Lynnwood, WA (US); Faraón Torres, Seattle, WA (US); Ryan G. Ziegler, Mill Creek, WA (US); Samuel F. Harrison, Bothell, WA (US); Ciro J. Grijalva, III, Seattle, WA (US); Hayden S. Osborn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 540 days.

This patent is subject to a terminal disclaimer.

(21) Appl. No.: 14/995,507

(22) Filed: Jan. 14, 2016

(65) Prior Publication Data

US 2017/0028635 A1  Feb. 2, 2017

Related U.S. Application Data

(60) Provisional application No. 62/199,665, filed on Jul. 31, 2015.

(51) Int. Cl.
*B29C 64/20* (2017.01)
*B29C 70/54* (2006.01)
(Continued)

(52) U.S. Cl.
CPC .......... *B29C 70/545* (2013.01); *B29C 64/106* (2017.08); *B29C 64/165* (2017.08);
(Continued)

(58) Field of Classification Search
CPC ..................................................... B29C 64/20
See application file for complete search history.

(56) References Cited

U.S. PATENT DOCUMENTS

| 3,600,272 A | 8/1971 | Cortigene et al. |
| 3,813,976 A | 6/1974 | Greer |

(Continued)

FOREIGN PATENT DOCUMENTS

| CN | 103817937 | 5/2014 |
| DE | 201310103973 | 10/2014 |

(Continued)

OTHER PUBLICATIONS

Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.

(Continued)

*Primary Examiner* — Galen H Hauth
*Assistant Examiner* — Cedrick S Williams
(74) *Attorney, Agent, or Firm* — DASCENZO Intellectual Property Law, P.C.

(57) ABSTRACT

A system for additively manufacturing a composite part (102) comprises a delivery guide, movable relative to a surface. The delivery guide is configured to deposit at least a segment of a continuous flexible line along a print path. The continuous flexible line comprises a non-resin component and a thermosetting resin component that comprises a first part and a second part of a thermosetting resin. The print path is stationary relative to the surface. The delivery guide comprises a first inlet configured to receive the non-resin component, and a second inlet configured to receive at least the first part of the thermosetting resin. The delivery guide is further configured to apply the first part and the second part of the thermosetting resin to the non-resin component.

(Continued)

The system 100 further comprises a feed mechanism, configured to push the continuous flexible line out of the delivery guide.

43 Claims, 28 Drawing Sheets

(51) Int. Cl.

| | | |
|---|---|---|
| *B29C 70/38* | (2006.01) | |
| *B29C 69/00* | (2006.01) | |
| *B29C 70/16* | (2006.01) | |
| *B29C 64/106* | (2017.01) | |
| *B29C 64/165* | (2017.01) | |
| *B29C 64/386* | (2017.01) | |
| *B33Y 10/00* | (2015.01) | |
| *B33Y 30/00* | (2015.01) | |
| *B33Y 40/00* | (2015.01) | |
| *B33Y 50/02* | (2015.01) | |
| *B29K 101/10* | (2006.01) | |
| *B29K 105/00* | (2006.01) | |
| *B29K 105/10* | (2006.01) | |
| *B29L 31/30* | (2006.01) | |

(52) U.S. Cl.
CPC ............ *B29C 64/20* (2017.08); *B29C 64/386* (2017.08); *B29C 69/001* (2013.01); *B29C 70/16* (2013.01); *B29C 70/38* (2013.01); *B29C 70/384* (2013.01); *B29K 2101/10* (2013.01); *B29K 2105/0058* (2013.01); *B29K 2105/101* (2013.01); *B29K 2105/25* (2013.01); *B29K 2995/005* (2013.01); *B29L 2031/3076* (2013.01); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,943,472 A | 7/1990 | Dyksterhouse et al. | |
| 4,988,278 A * | 1/1991 | Mills .................... | B29C 70/526 |
| | | | 156/441 |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,936,861 A * | 8/1999 | Jang ..................... | B29C 70/384 |
| | | | 700/98 |
| 6,129,872 A * | 10/2000 | Jang .................... | B29C 41/36 |
| | | | 264/245 |
| 6,149,856 A | 11/2000 | Zemel et al. | |
| 6,214,279 B1 | 4/2001 | Yang et al. | |
| 6,395,210 B1 | 5/2002 | Head et al. | |
| 6,722,872 B1 | 4/2004 | Swanson et al. | |
| 7,114,943 B1 | 10/2006 | Fong et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,149,989 B2 | 10/2015 | Uckelmann | |
| 2003/0044593 A1 | 3/2003 | Vaidyanathan et al. | |
| 2004/0119188 A1 | 6/2004 | Lowe | |
| 2005/0023719 A1 | 2/2005 | Nielsen et al. | |
| 2005/0038222 A1 | 2/2005 | Joshi et al. | |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2007/0029030 A1 | 2/2007 | McCowin | |
| 2008/0213419 A1 | 9/2008 | Skubic et al. | |
| 2008/0315462 A1 * | 12/2008 | Batzinger .............. | G01B 17/02 |
| | | | 264/407 |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2011/0300301 A1 * | 12/2011 | Fernando .............. | B29B 15/122 |
| | | | 427/385.5 |
| 2014/0061974 A1 | 3/2014 | Tyler | |
| 2014/0086780 A1 | 3/2014 | Miller et al. | |
| 2014/0154347 A1 | 6/2014 | Dilworth et al. | |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 | 10/2014 | Mark et al. | |
| 2014/0328964 A1 * | 11/2014 | Mark ..................... | B29C 70/20 |
| | | | 425/166 |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1 * | 2/2015 | Dietrich ................ | B22F 3/1055 |
| | | | 264/401 |
| 2015/0140230 A1 | 5/2015 | Jones et al. | |
| 2015/0165691 A1 | 6/2015 | Mark et al. | |
| 2015/0174824 A1 | 6/2015 | Gifford et al. | |
| 2015/0217517 A1 | 8/2015 | Karpas et al. | |
| 2015/0266243 A1 | 9/2015 | Mark et al. | |
| 2015/0291833 A1 | 10/2015 | Kunc et al. | |
| 2016/0136897 A1 * | 5/2016 | Nielsen-Cole ......... | B33Y 30/00 |
| | | | 425/131.1 |
| 2016/0159009 A1 | 6/2016 | Canine | |
| 2016/0303793 A1 | 10/2016 | Ermoshkin et al. | |
| 2016/0332363 A1 * | 11/2016 | Moore ................. | B29C 65/1412 |
| 2017/0021566 A1 * | 1/2017 | Lund .................... | B29C 67/0085 |
| 2017/0129180 A1 | 5/2017 | Coates et al. | |

FOREIGN PATENT DOCUMENTS

| | | |
|---|---|---|
| DE | 102015002967 | 10/2016 |
| EP | 1151849 | 11/2001 |
| JP | 2015174284 | 10/2015 |
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |
| WO | WO2015193819 | 12/2015 |
| WO | WO 2016/053681 | 4/2016 |
| WO | WO 2016125138 | 8/2016 |
| WO | WO 2016139059 | 9/2016 |
| WO | WO2016149181 | 9/2016 |

OTHER PUBLICATIONS

Ogale et al., "3-Dimensional Composite Photolithography," Proceedings of the American Society for Composites, Eleventh Technical Conference, pp. 822-828, Oct. 7-9, 1996.

Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.

Gupta et al., "Dual Curing of Carbon Fiber Reinforced Photoresins for Rapid Prototyping," Polymer Composites, vol. 23, No. 6, pp. 1162-1170, Dec. 2002.

Website screenshots showing "Fiber Composite 3D Printing," downloaded from makezine.com/2014/11/05/fiber-composite-3d-printing/, Jun. 2, 2015.

User Manual for 3Doodler 2.0, downloaded from the3doodler.com/manuals/, Aug. 19, 2015.

Website article "Automated Fiber Placement," downloaded from automateddynamics.com/article/thermoplastic-composite-basics/processing-methods/automated-fiber-placement, Aug. 19, 2015.

(56) References Cited

OTHER PUBLICATIONS

Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, downloaded from sciencedirect.com/science/article/pii/S0010448510001788, Aug. 19, 2015.
Website screenshots showing The Mark One Composite 3D Printer, downloaded from markforged.com/mark-one/, Aug. 19, 2015.
Website article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing Krassenstein "Orbital Composites to Make 3D Printing 100 Times Faster Using Carbon Fiber, Fiber Optics, Injection & More," Apr. 28, 2015, downloaded from 3dprint.com/60662/orbital-composites/, Aug. 19, 2015.
Website article "Carbon3D Introduces Breakthrough CLIP Technology for Layerless 3D Printing, 25-100x Faster," Mar. 17, 2015, downloaded from 3ders.org/articles/20150317-carbon3d-introduces-breakthrough-clip-technology-for-layerless-3d-printing.html, Aug. 19, 2015.
Website screenshots showing The Form 1+ SLA 3D Printer, downloaded from formlabs.com/products/form-1-plus/, Aug. 20, 2015.
Formlabs, Frequently Asked Questions (re the Form1+ SLA 3D Printer), downloaded from formlabs.com/support/faq/, Aug. 19, 2015.
Website screenshots showing "Fiber Composite 3D Printing (The Bug)," downloaded from instructables.com/id/Fiber-Composite-3D-Printing-The-Bug/?ALLSTEPS, Aug. 20, 2015.
Screenshots of online article, Evan Milberg, "Arevo Labs Introduces First Robot-Based Platform for 3-D Printing Composite Parts," Composites Manufacturing Magazine website, Nov. 23, 2015, downloaded from compositesmanufacturingmagazine.com/2015/11/arevo-labs-introduces-first-robot-based-platform-for-3-d-printing-composite-parts/ on Jan. 12, 2016.
Printout of online article, Jeff Sloan, "Arevo Labs launches 3D printing platform for composite parts fabrication," CompositesWorld website, Nov. 16, 2015, downloaded from compositesworld.com/products/arevo-labs-launches-3D-printing-platform-for-composite-parts-fabrication on Dec. 9, 2015.
Machine generated English translation of abstract for DE 201310103973 downloaded from Espacenet.com on Nov. 1, 2017.
European Patent Office, Partial European Search Report for related European patent application EP 16 16 8657, dated Dec. 15, 2016.
Printout of online article, "Improving Additive Manufacturing (3D Printing) using Infrared Imaging," Aug. 10, 2016, from AZoM.com website, downloaded on Nov. 4, 2016.
Website screenshots showing Stratonics ThermaViz® Sensor Systems, from Stratonics.com website, downloaded on Nov. 4, 2016.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.
Machine generated English translation of CN 103817937, dated Mar. 26, 2018.
Machine generated English translation of the abstract of JP2015174284, downloaded from Espacenet.com Jun. 12, 2018.
Machine generated English translation of the abstract of DE102015002967, downloaded from Espacenet.com Jun. 12, 2018.

\* cited by examiner

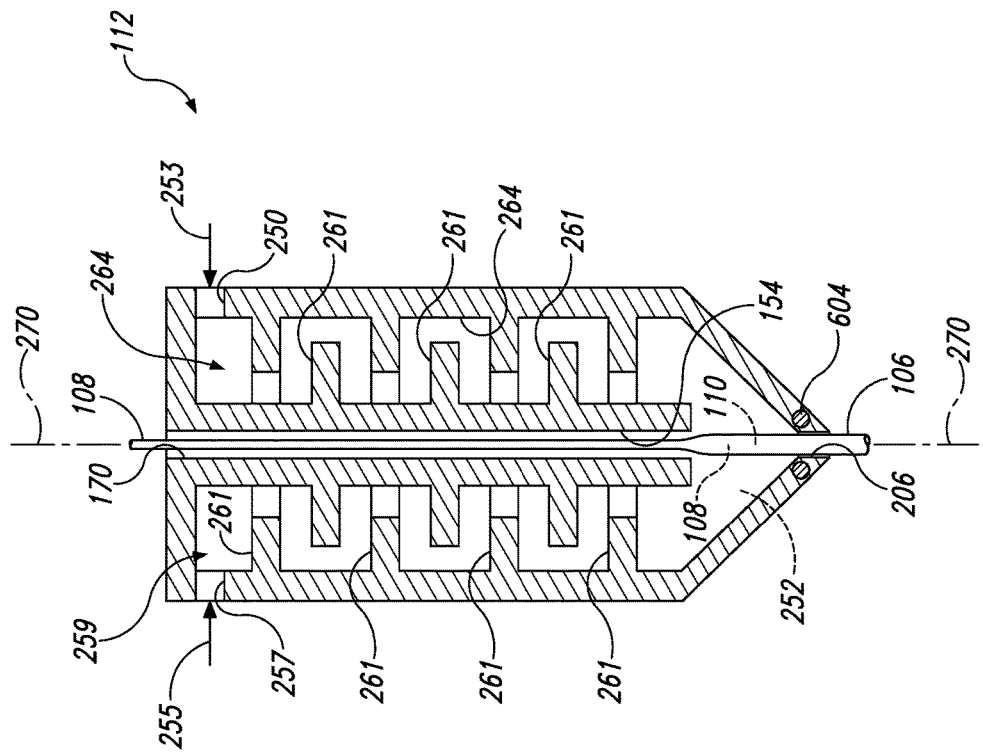
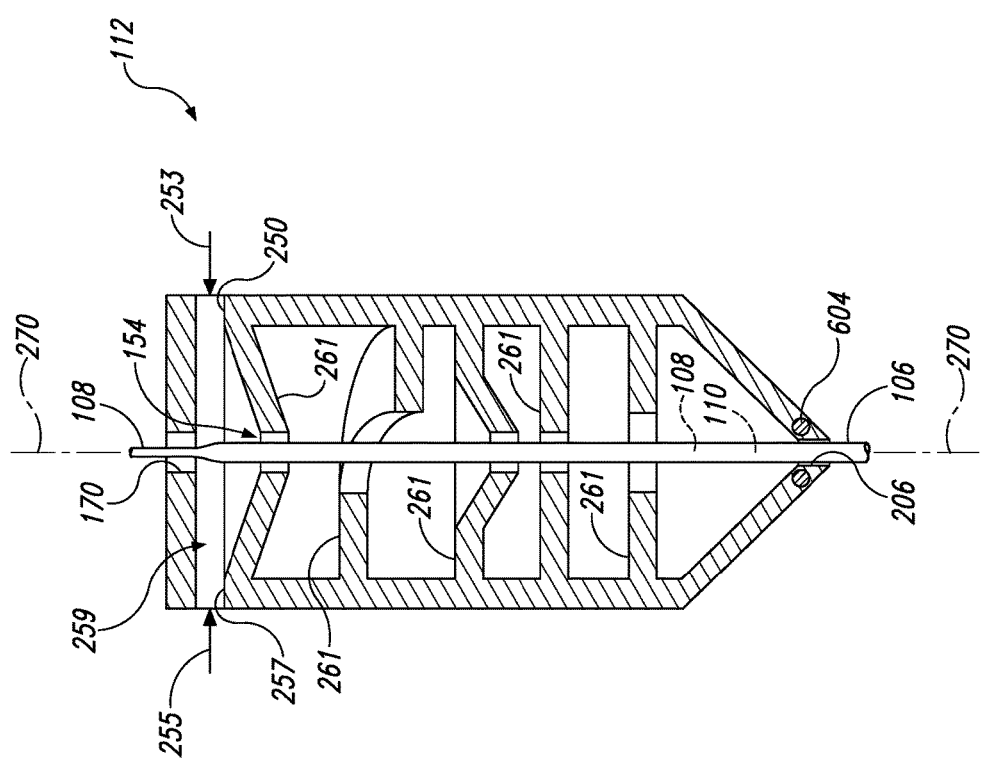

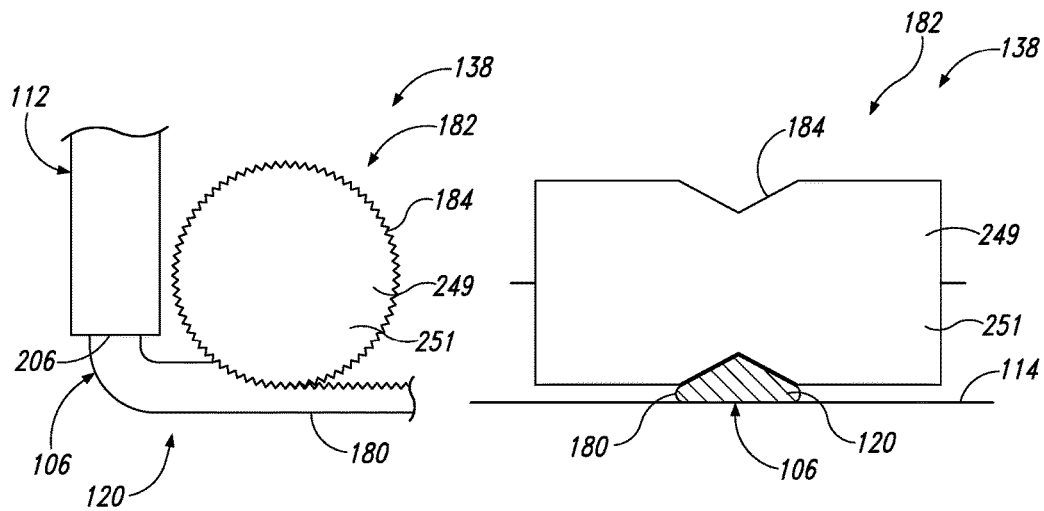
Fig. 12
Fig. 13
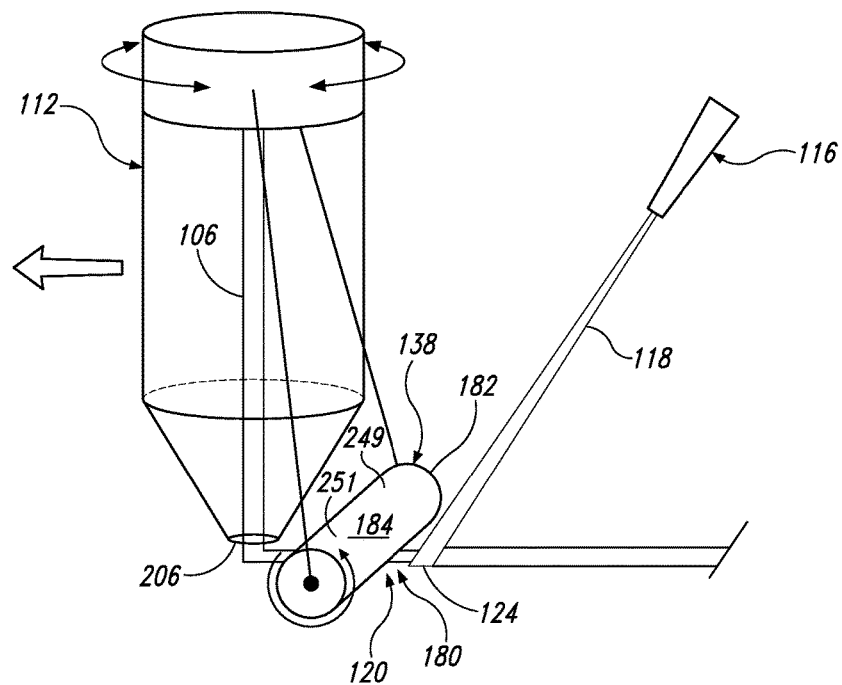
Fig. 14

(CONT.)

334 — AT LEAST ONE OF DEPOSITING THE SEGMENT (120) OF THE CONTINUOUS FLEXIBLE LINE (106) ALONG THE PRINT PATH (122) OR DELIVERING THE PREDETERMINED OR ACTIVELY DETERMINED AMOUNT OF THE CURING ENERGY (118) AT LEAST TO THE PORTION (124) OF THE SEGMENT (120) OF THE CONTINUOUS FLEXIBLE LINE (106) AT THE CONTROLLED RATE PROVIDES DIFFERENT PHYSICAL CHARACTERISTICS AT DIFFERENT LOCATIONS OF THE COMPOSITE PART (102)

338 — THE PHYSICAL CHARACTERISTICS INCLUDE AT LEAST ONE OF STRENGTH, STIFFNESS, FLEXIBILITY, DUCTILITY, OR HARDNESS

346 — RESTRICTIVELY CURING AT LEAST A PORTION OF THE COMPOSITE PART (102)

348 — THE PORTION OF THE COMPOSITE PART (102) IS RESTRICTIVELY CURED TO FACILITATE SUBSEQUENT PROCESSING OF THE PORTION

354 — SIMULTANEOUSLY WITH DEPOSITING THE SEGMENT (120) OF THE CONTINUOUS FLEXIBLE LINE (106) ALONG THE PRINT PATH (122), COMPACTING AT LEAST A SECTION (180) OF THE SEGMENT (120) OF THE CONTINUOUS FLEXIBLE LINE (106) AFTER THE SEGMENT (120) OF THE CONTINUOUS FLEXIBLE LINE (106) IS DEPOSITED ALONG THE PRINT PATH (122)

356 — IMPARTING A DESIRED CROSS-SECTIONAL SHAPE TO THE SEGMENT (120) OF THE CONTINUOUS FLEXIBLE LINE (106)

392 — HEATING THE SECTION (180) OF THE SEGMENT (120) OF THE CONTINUOUS FLEXIBLE LINE (106) TO AT LEAST PARTIALLY CURE AT LEAST THE SECTION (180) OF THE SEGMENT (120) OF THE CONTINUOUS FLEXIBLE LINE (106)

358 — SIMULTANEOUSLY WITH DEPOSITING THE SEGMENT (120) OF THE CONTINUOUS FLEXIBLE LINE (106) ALONG THE PRINT PATH (122), ROUGHENING AT LEAST A SECTION (194) OF THE SEGMENT (120) OF THE CONTINUOUS FLEXIBLE LINE (106) AFTER THE SEGMENT (120) OF THE CONTINUOUS FLEXIBLE LINE (106) IS DEPOSITED ALONG THE PRINT PATH (122)

394 — HEATING THE SECTION (194) OF THE SEGMENT (120) OF THE CONTINUOUS FLEXIBLE LINE (106) TO AT LEAST PARTIALLY CURE AT LEAST THE SECTION (194) OF THE SEGMENT (120) OF THE CONTINUOUS FLEXIBLE LINE (106)

360 — SIMULTANEOUSLY WITH ROUGHENING AT LEAST THE SECTION (194) OF THE SEGMENT (120) OF THE CONTINUOUS FLEXIBLE LINE (106), COLLECTING DEBRIS RESULTING FROM ROUGHENING AT LEAST THE SECTION (194) OF THE SEGMENT (120) OF THE CONTINUOUS FLEXIBLE LINE (106)

362 — SIMULTANEOUSLY WITH ROUGHENING AT LEAST THE SECTION (194) OF THE SEGMENT (120) OF THE CONTINUOUS FLEXIBLE LINE (106), DISPERSING DEBRIS RESULTING FROM ROUGHENING AT LEAST THE SECTION (194) OF THE SEGMENT (120) OF THE CONTINUOUS FLEXIBLE LINE (106)

```
┌─ 434
│ DELIVERING A PREDETERMINED OR ACTIVELY DETERMINED AMOUNT OF CURING ENERGY (118) AT LEAST TO
│ A PORTION (124) OF THE SEGMENT (120) OF THE CONTINUOUS FLEXIBLE LINE (106) AT A CONTROLLED RATE
│ WHILE ADVANCING THE CONTINUOUS FLEXIBLE LINE (106) TOWARD THE PRINT PATH (122) AND AFTER THE
│ SEGMENT (120) OF THE CONTINUOUS FLEXIBLE LINE (106) IS DEPOSITED ALONG THE PRINT PATH (122) TO
│ AT LEAST PARTIALLY CURE AT LEAST THE PORTION (124) OF THE SEGMENT (120) OF THE
│ CONTINUOUS FLEXIBLE LINE (106)
│  ┌─ 436
│  │ PARTIALLY CURING A FIRST LAYER (140) OF THE SEGMENT (120) OF THE CONTINUOUS FLEXIBLE
│  │ LINE (106) AS THE FIRST LAYER (140) IS BEING DEPOSITED AND FURTHER CURING THE FIRST
│  │ LAYER (140) AS A SECOND LAYER (142) IS BEING DEPOSITED AGAINST THE FIRST LAYER (140)
│  ┌─ 438
│  │ PARTIALLY CURING A FIRST LAYER (140) OF THE SEGMENT (120) OF THE CONTINUOUS FLEXIBLE
│  │ LINE (106) AS THE FIRST LAYER (140) IS BEING DEPOSITED AND FULLY CURING THE FIRST LAYER (140)
│  │ AS A SECOND LAYER (142) IS BEING DEPOSITED AGAINST THE FIRST LAYER (140)
│  ┌─ 440
│  │ CURING LESS THAN AN ENTIRETY OF THE COMPOSITE PART (102)
│  ┌─ 446
│  │ SELECTIVELY VARYING AT LEAST ONE OF A DELIVERY RATE, A DELIVERY DURATION, OR A
│  │ TEMPERATURE OF THE CURING ENERGY (118) TO IMPART VARYING PHYSICAL
│  │ CHARACTERISTICS TO THE COMPOSITE PART (102)
│  │  ┌─ 448
│  │  │ THE VARYING PHYSICAL CHARACTERISTICS INCLUDE AT LEAST ONE OF STRENGTH,
│  │  │ STIFFNESS, FLEXIBILITY, DUCTILITY, OR HARDNESS
```

```
┌─ 442
│ RESTRICTIVELY CURING AT LEAST A PORTION OF THE COMPOSITE PART (102)
│  ┌─ 444
│  │ THE PORTION OF COMPOSITE PART (102) IS RESTRICTIVELY CURED TO FACILITATE
│  │ SUBSEQUENT PROCESSING OF THE PORTION OF THE COMPOSITE PART (102)
```

```
┌─ 450
│ SIMULTANEOUSLY WITH DELIVERING THE PREDETERMINED OR ACTIVELY DETERMINED AMOUNT OF THE
│ CURING ENERGY (118) AT LEAST TO THE PORTION (124) OF THE SEGMENT (120) OF THE CONTINUOUS
│ FLEXIBLE LINE (106) AT THE CONTROLLED RATE, AT LEAST PARTIALLY PROTECTING AT LEAST THE
│ PORTION (124) OF THE SEGMENT (120) OF THE CONTINUOUS FLEXIBLE LINE (106) FROM OXIDATION AFTER
│ THE SEGMENT (120) EXITS A DELIVERY GUIDE (112)
│  ┌─ 452
│  │ AT LEAST THE PORTION (124) OF THE SEGMENT (120) OF THE CONTINUOUS FLEXIBLE LINE (106) IS
│  │ AT LEAST PARTIALLY PROTECTED FROM THE OXIDATION WITH A SHIELDING GAS (221)
```

```
┌─ 454
│ SIMULTANEOUSLY WITH DEPOSITING THE SEGMENT (120) OF THE CONTINUOUS FLEXIBLE LINE (106)
│ ALONG THE PRINT PATH (122), COMPACTING AT LEAST A SECTION (180) OF THE SEGMENT (120) OF THE
│ CONTINUOUS FLEXIBLE LINE (106) AFTER THE SEGMENT (120) OF THE CONTINUOUS FLEXIBLE LINE (106)
│ IS DEPOSITED ALONG THE PRINT PATH (122)
│  ┌─ 456
│  │ IMPARTING A DESIRED CROSS-SECTIONAL SHAPE TO THE SEGMENT (120) OF THE CONTINUOUS FLEXIBLE LINE (106)
│  ┌─ 480
│  │ HEATING THE SECTION (180) OF THE SEGMENT (120) OF THE CONTINUOUS FLEXIBLE LINE (106) TO AT LEAST
│  │ PARTIALLY CURE AT LEAST THE SECTION (180) OF THE SEGMENT (120) OF THE CONTINUOUS FLEXIBLE LINE (106)
```

SYSTEMS FOR ADDITIVELY MANUFACTURING COMPOSITE PARTS

RELATED APPLICATION

This application claims priority to U.S. Provisional Patent Application No. 62/199,665, entitled "SYSTEMS AND METHODS FOR ADDITIVELY MANUFACTURING COMPOSITE PARTS," which was filed on Jul. 31, 2015, and the complete disclosure of which is hereby incorporated by reference.

BACKGROUND

Conventionally, manufacturing of typical composite parts relies on sequential layering of multiple plies of composite material, with each ply containing, e.g., unidirectional reinforcement fibers or randomly oriented chopped fibers. Parts manufactured in this manner must have laminar construction, which undesirably increases the weight of the finished part, since not all of the reinforcement fibers are oriented along the direction(s) of the force(s) to be applied to the parts. Additionally, limitations inherent to laminar techniques of manufacturing composites are not conducive to implementation of many types of advanced structural designs.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a system for additively manufacturing a composite part. The system comprises a delivery guide, movable relative to a surface. The delivery guide is configured to deposit at least a segment of a continuous flexible line along a print path. The continuous flexible line comprises a non-resin component and a thermosetting resin component. The thermosetting resin component comprises a first part of a thermosetting resin and a second part of the thermosetting resin. The print path is stationary relative to the surface. The delivery guide comprises a first inlet, configured to receive the non-resin component, and a second inlet, configured to receive at least the first part of the thermosetting resin. The delivery guide is further configured to apply the first part of the thermosetting resin and the second part of the thermosetting resin to the non-resin component. The system further comprises a feed mechanism, configured to push the continuous flexible line out of the delivery guide.

Another example of the present disclosure relates to a method of additively manufacturing a composite part. The method comprises depositing a segment of a continuous flexible line along a print path. The continuous flexible line comprises a non-resin component and a thermosetting resin component that is not fully cured. The method further comprises, while advancing the continuous flexible line toward the print path, delivering a predetermined or actively determined amount of curing energy at least to a portion of the segment of the continuous flexible line at a controlled rate after the segment of the continuous flexible line is deposited along the print path to at least partially cure at least the portion of the segment of the continuous flexible line.

Yet another example of the present disclosure relates to a method of additively manufacturing a composite part. The method comprises applying a thermosetting resin to a non-resin component of a continuous flexible line while pushing the non-resin component through a delivery guide and pushing the continuous flexible line out of the delivery guide. The continuous flexible line further comprises a thermosetting resin component that comprises at least some of the thermosetting resin applied to the non-resin component. The method further comprises depositing, via the delivery guide, a segment of the continuous flexible line along a print path.

BRIEF DESCRIPTION OF THE DRAWINGS

Figure 1:
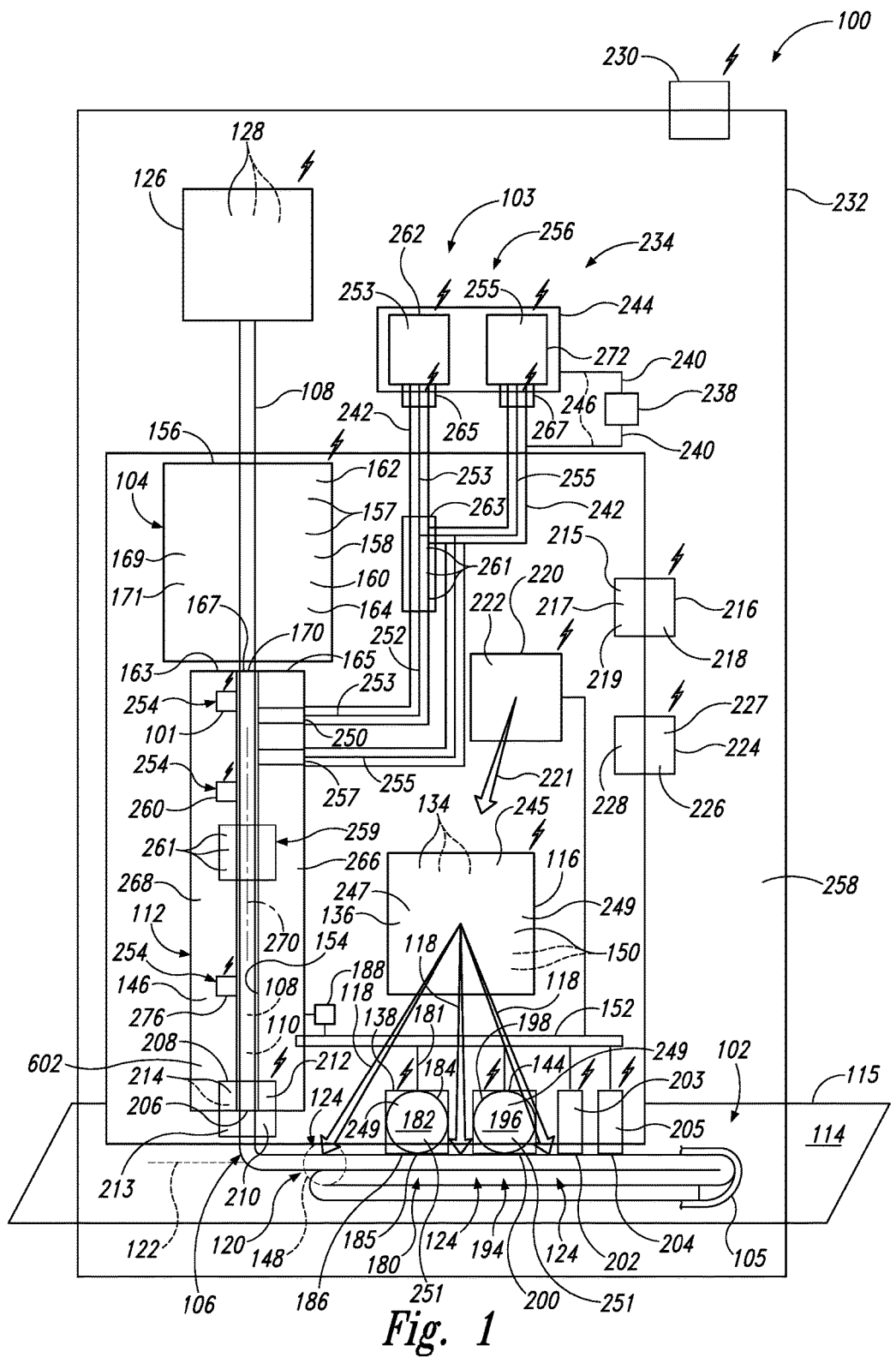
Figure 4:
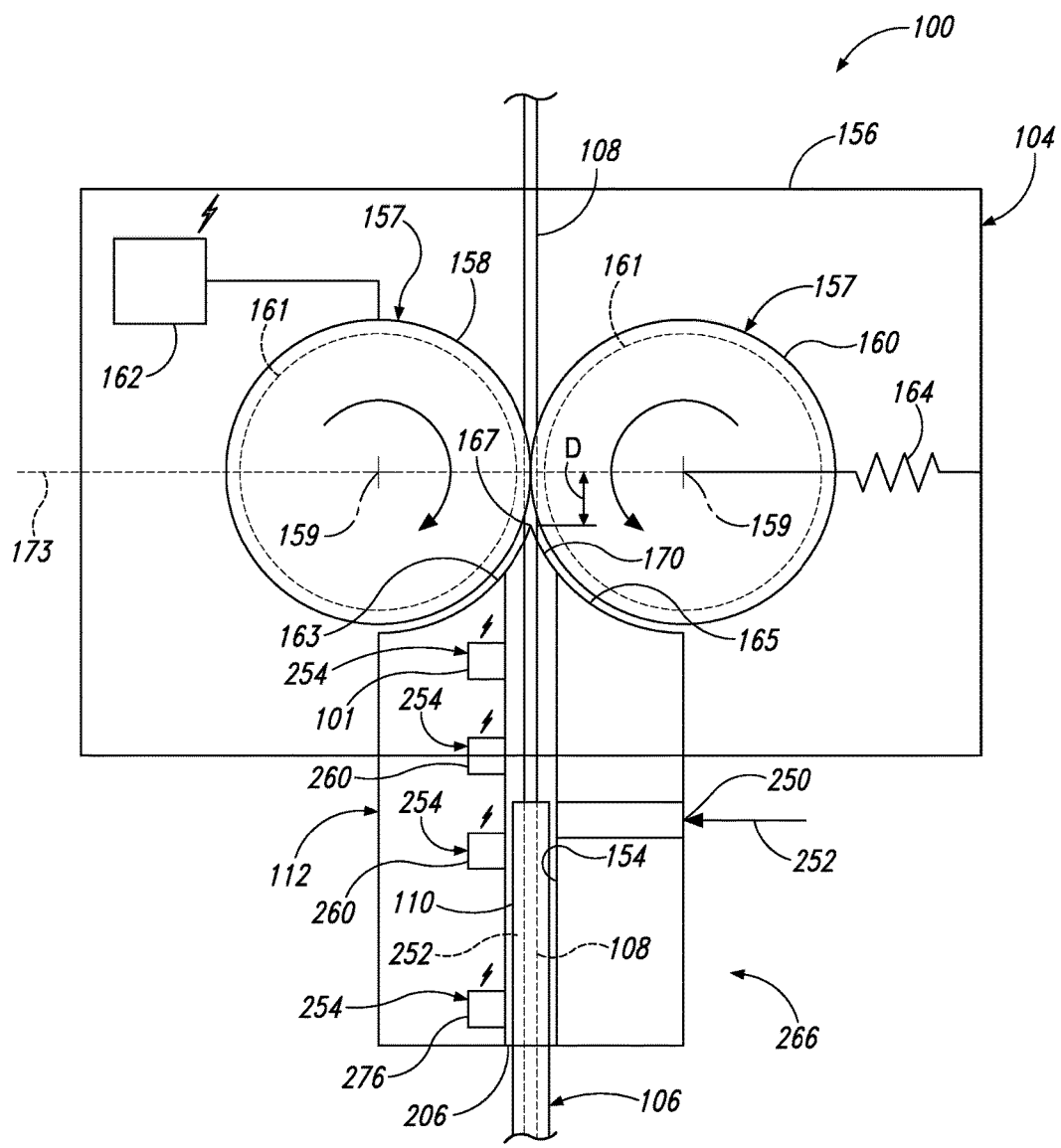
Figure 5:
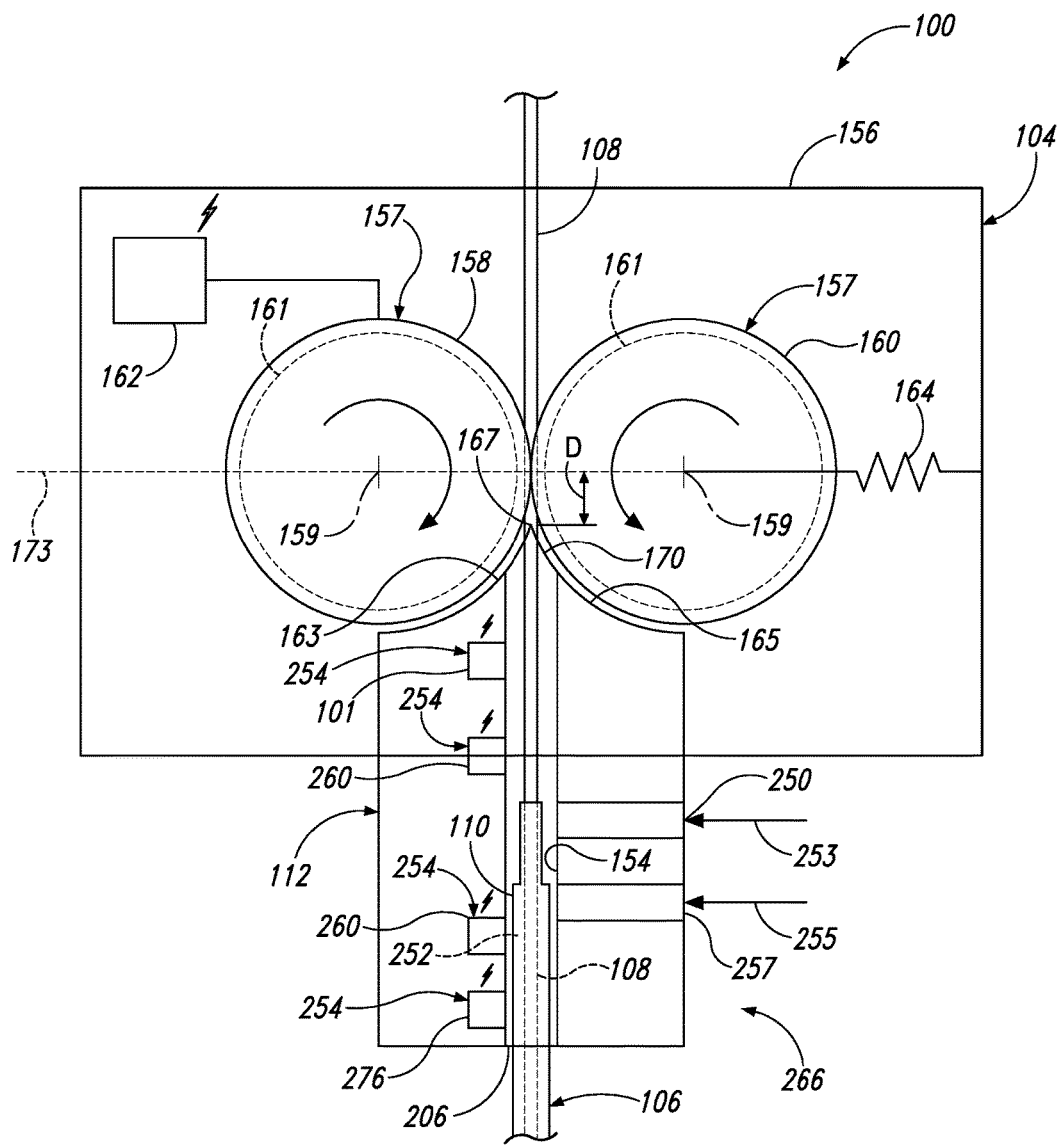
Figure 6:
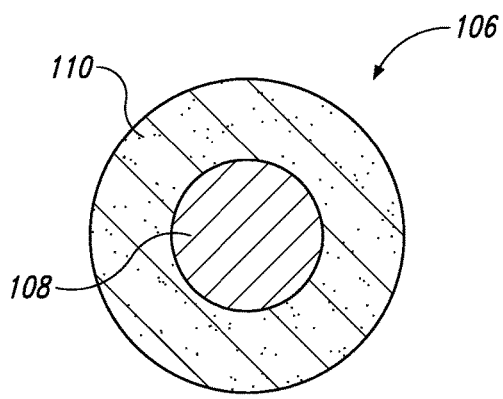
Figure 7:
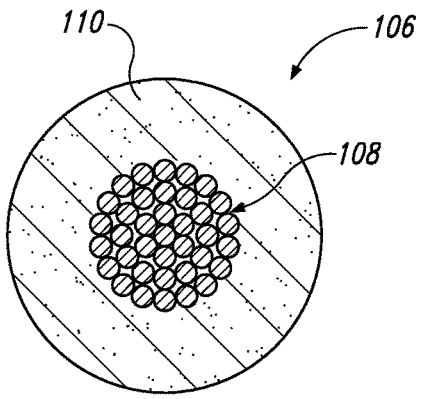
Figure 8:
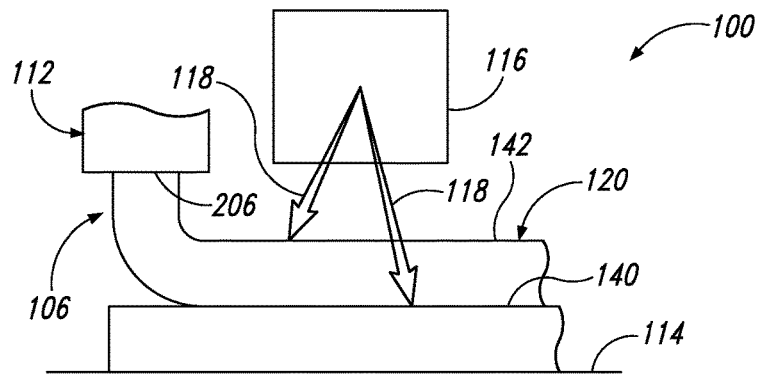
Figure 9:
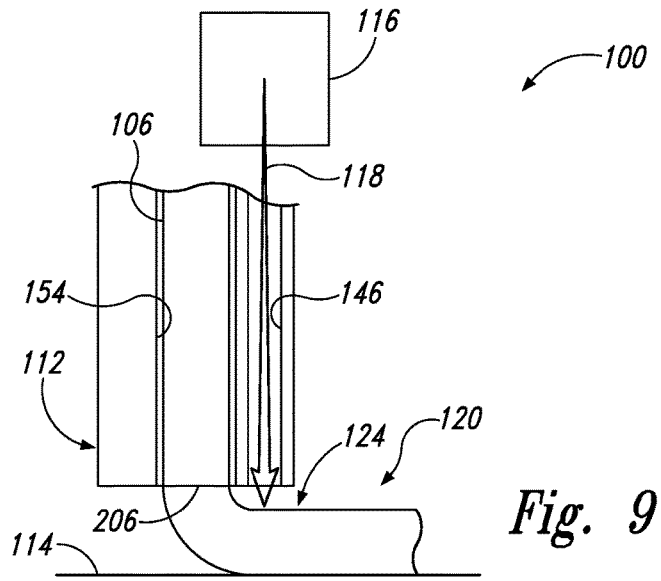
Figure 10:
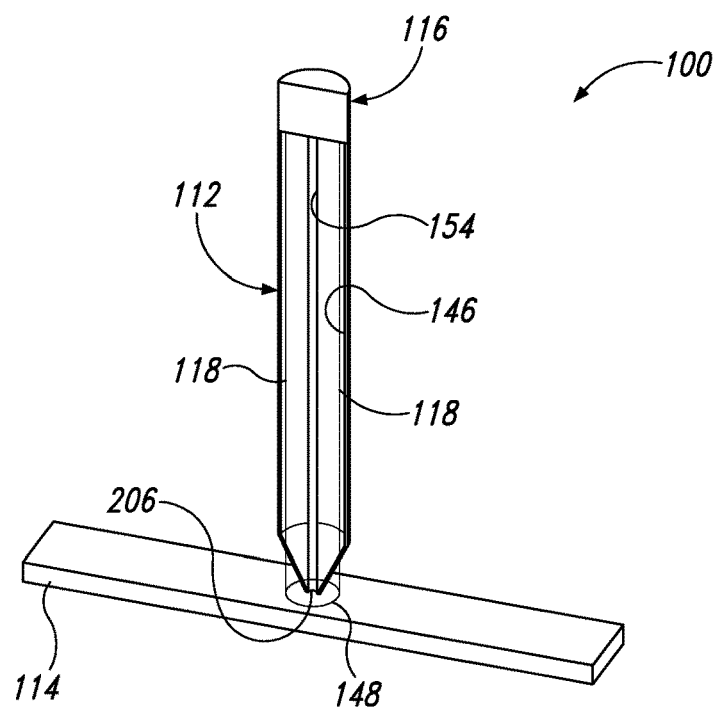
Figure 11:
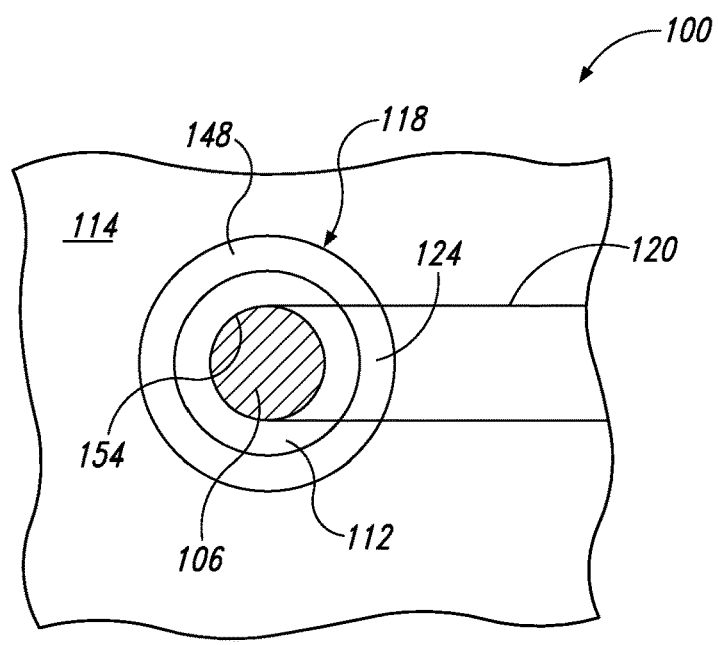
Figure 15:
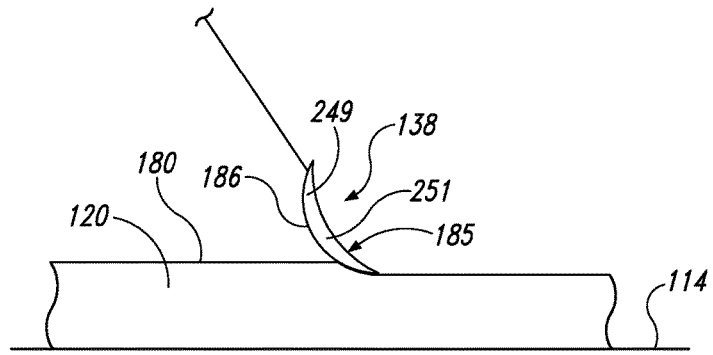
Figure 16:
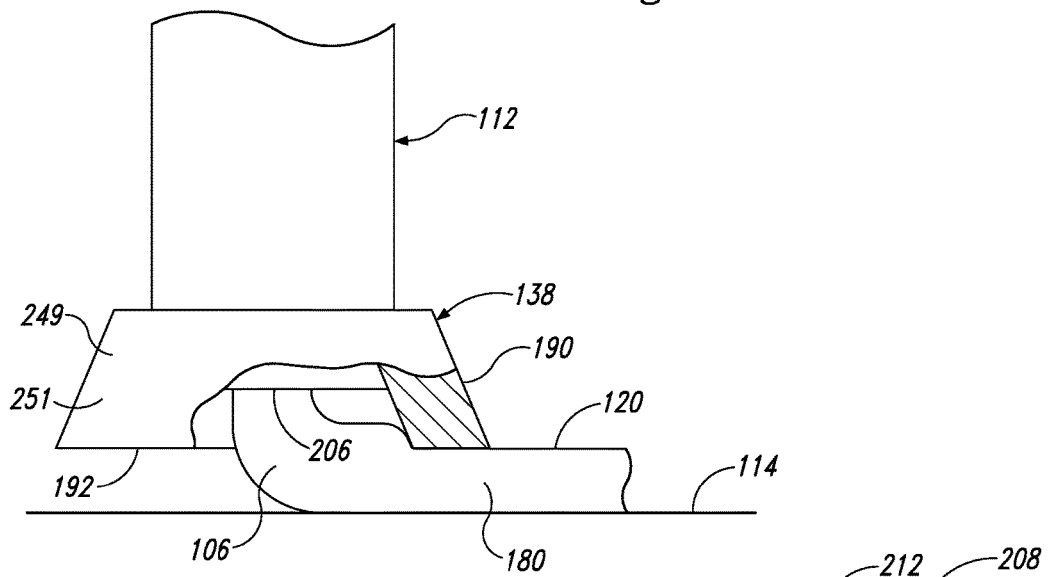
Figure 17:
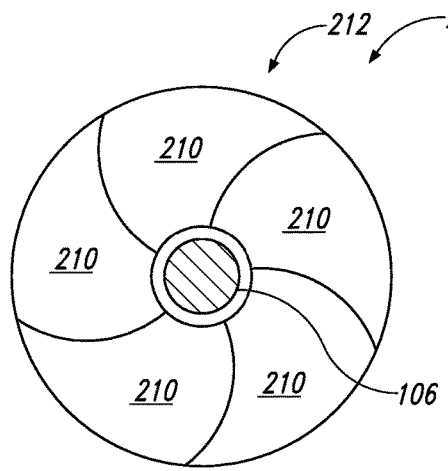
Figure 18:
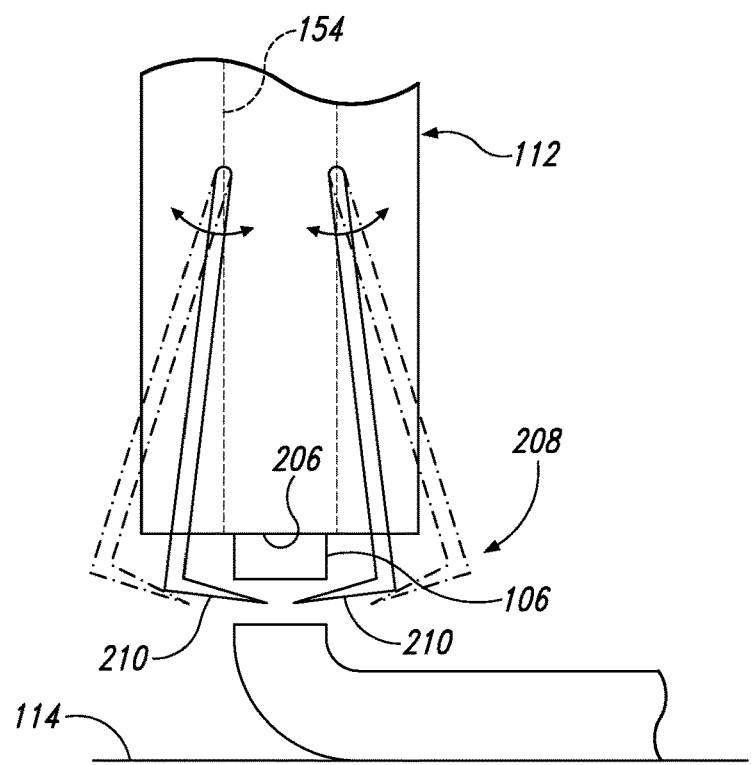
Figure 19:
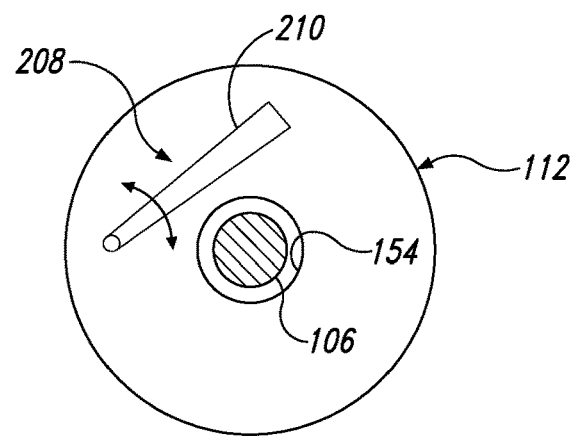
Figure 20:
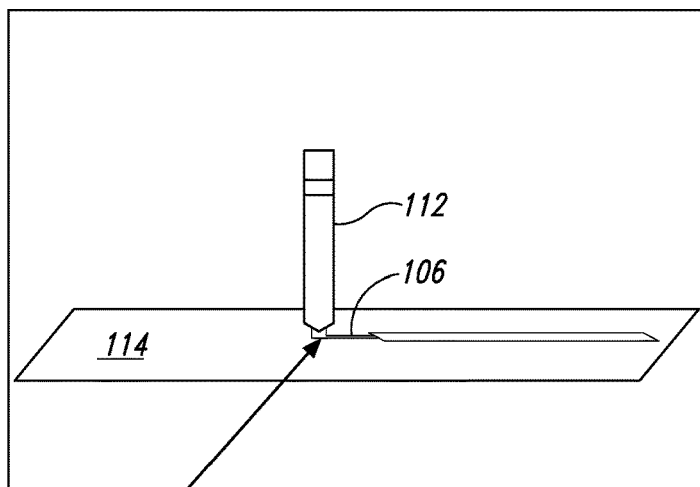
Figure 21:
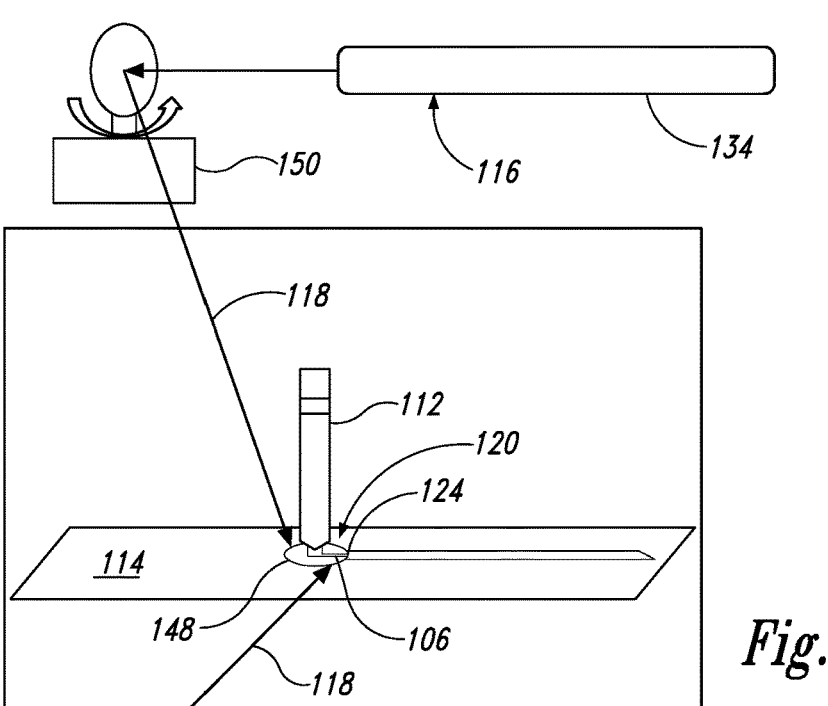
Figure 22:
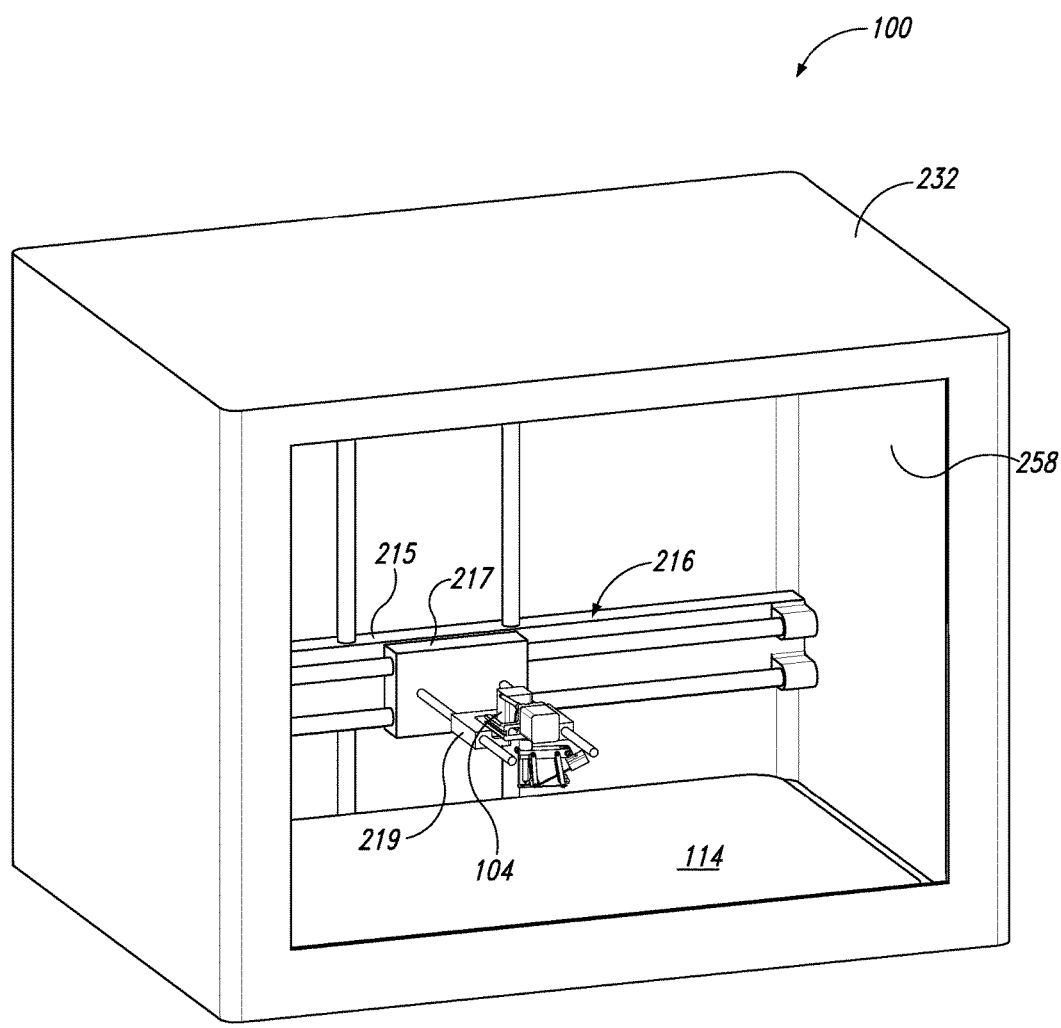
Figure 23:
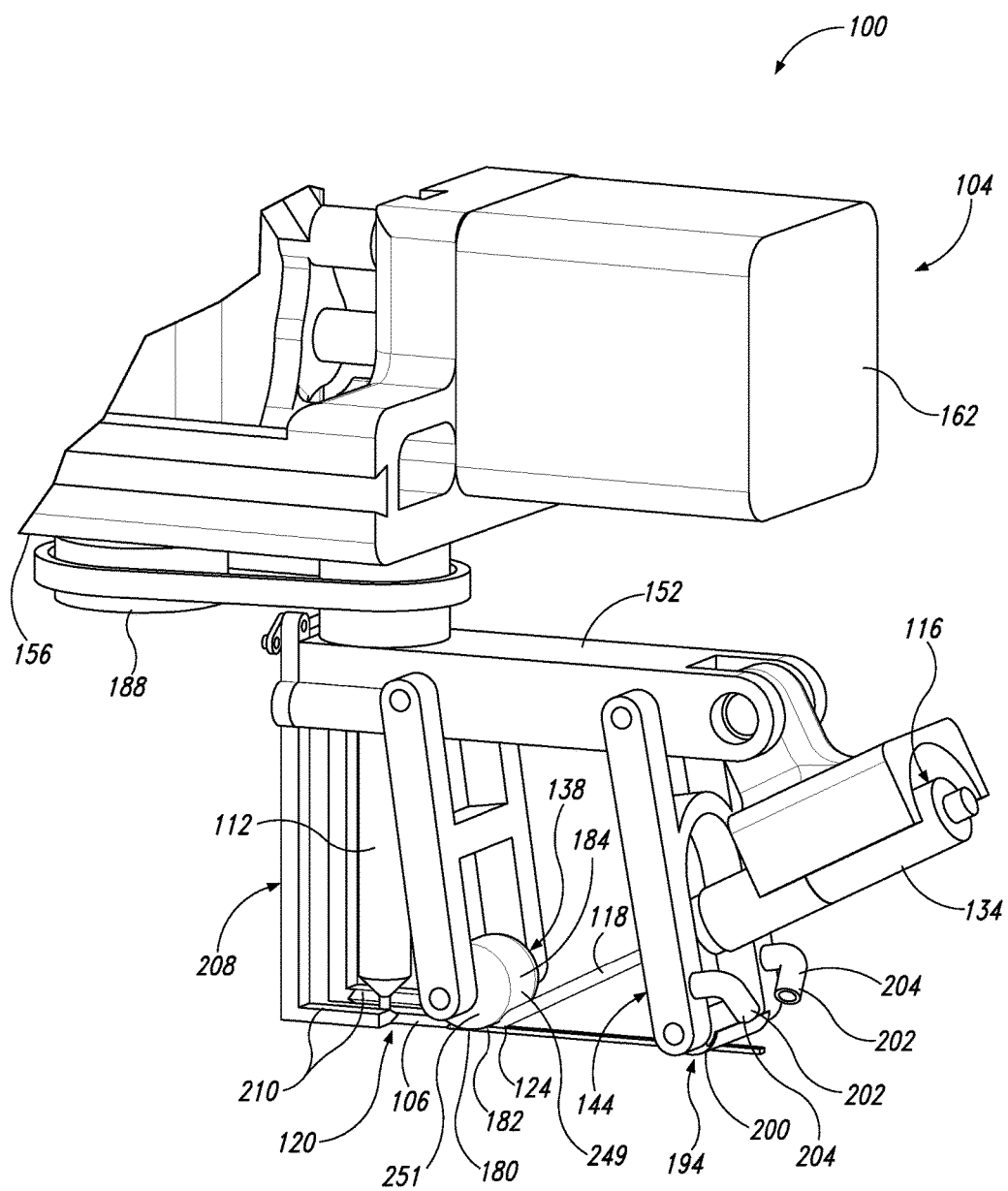
Figure 24:
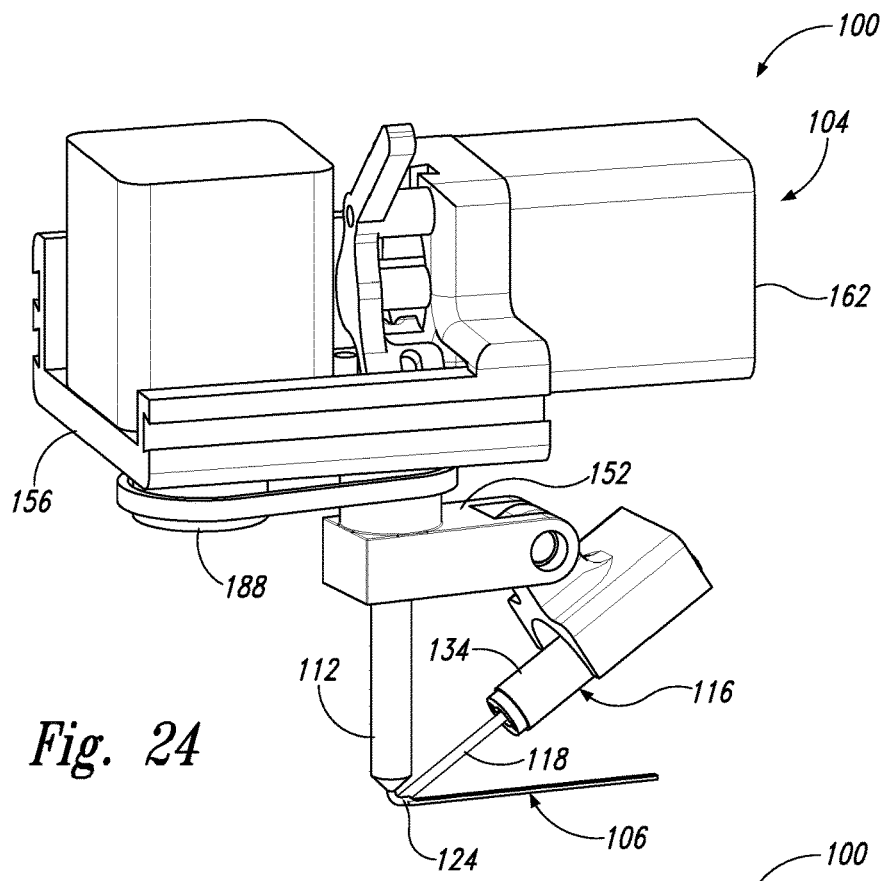
Figure 25:
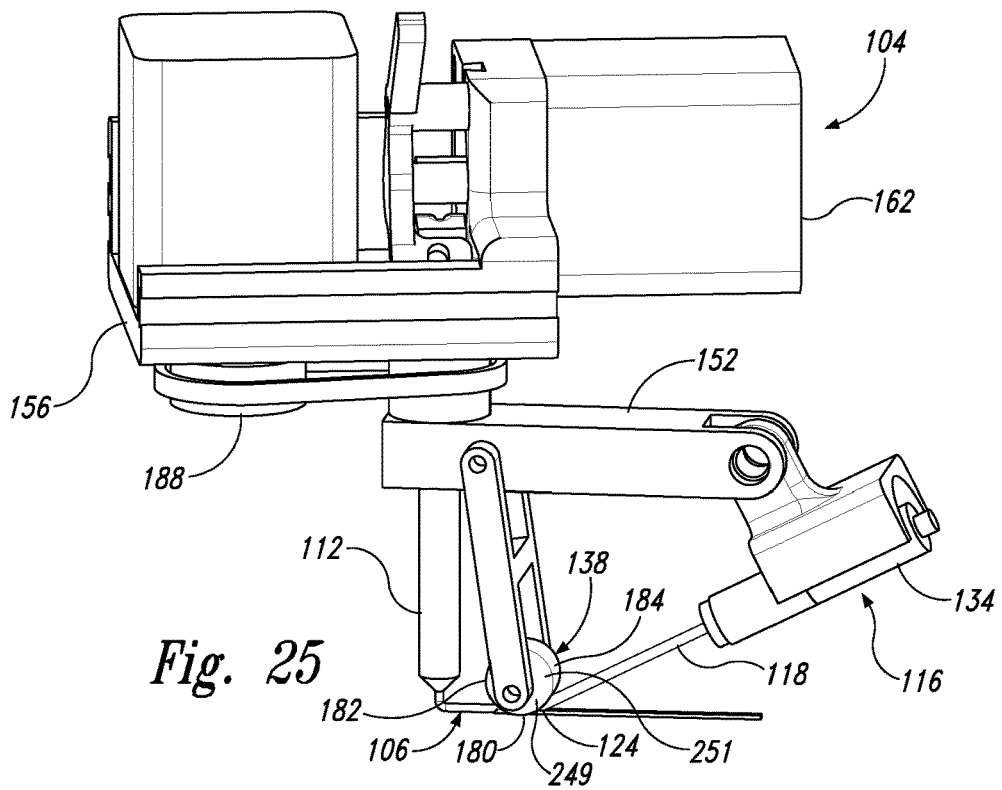
Figure 26:
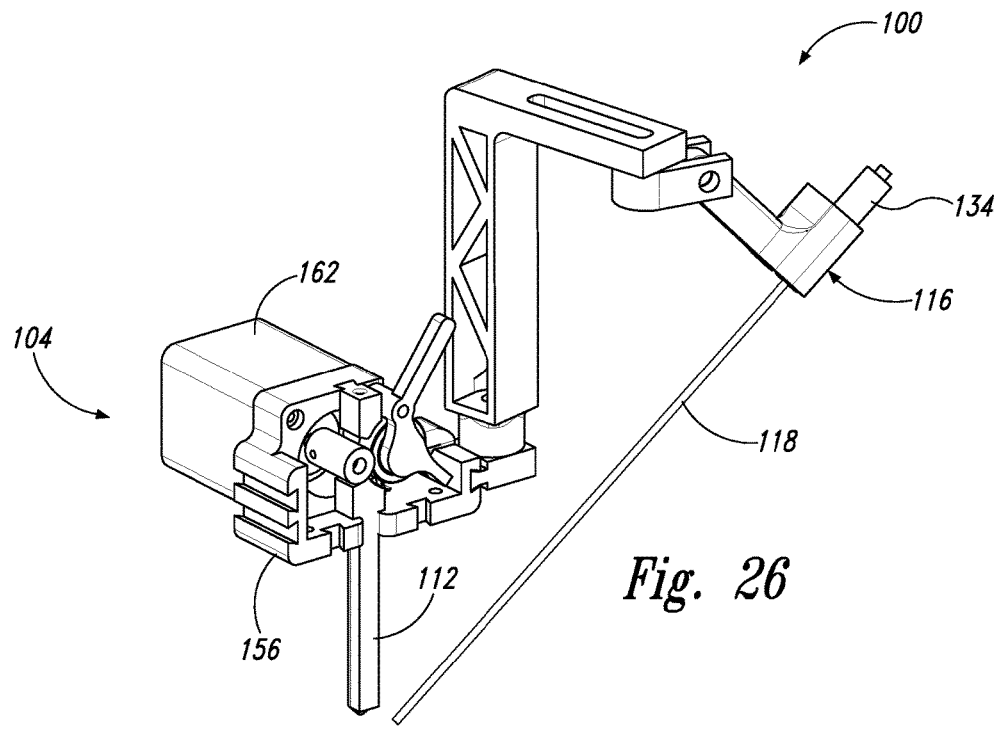
Figure 27:
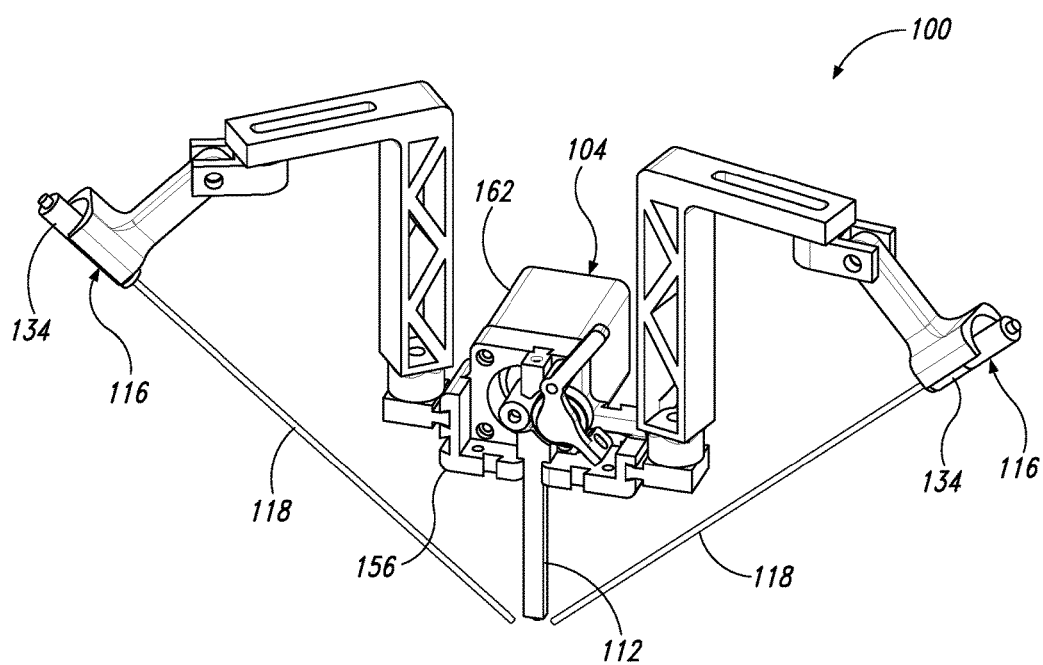
Figure 28:
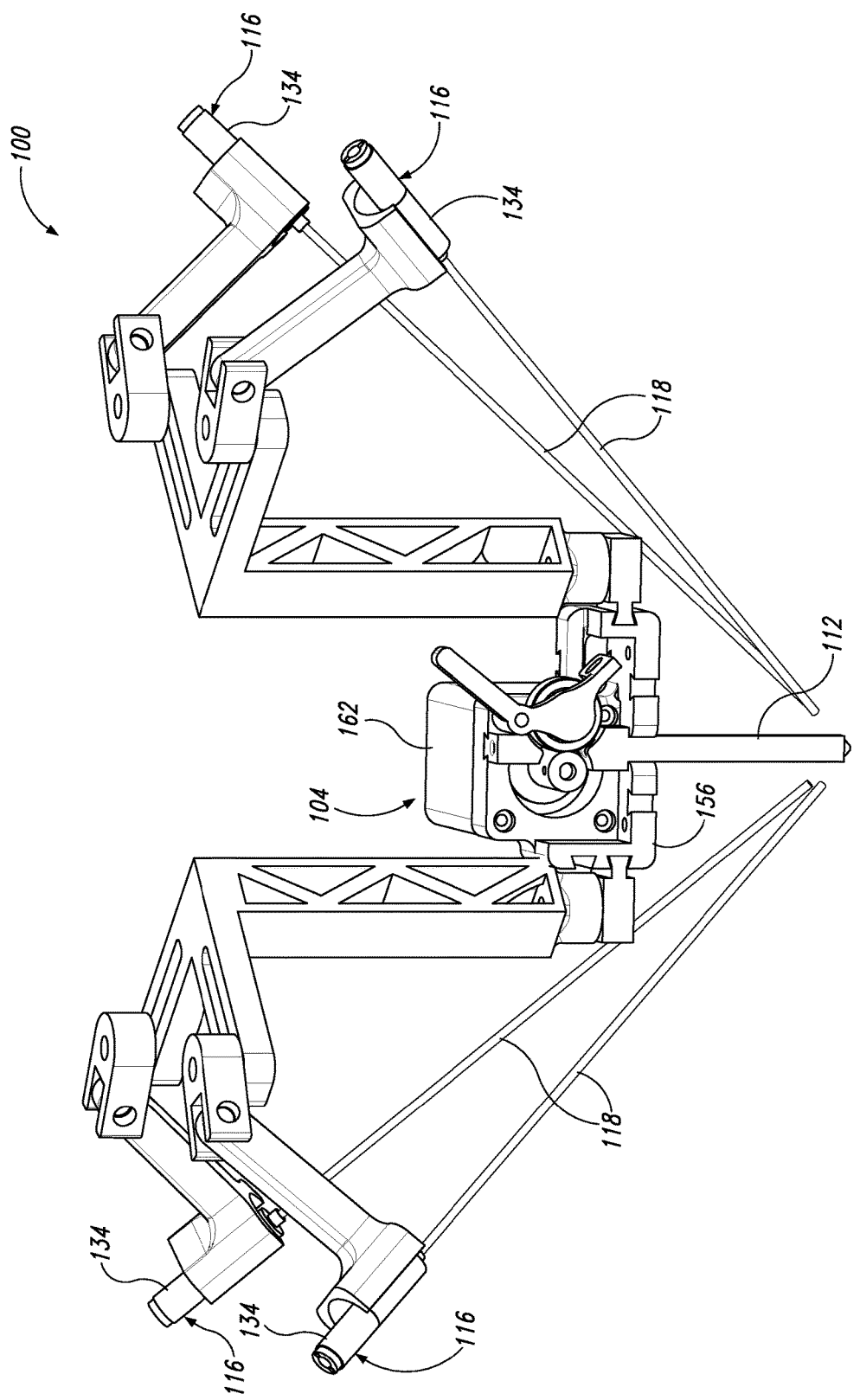
Figure 29:
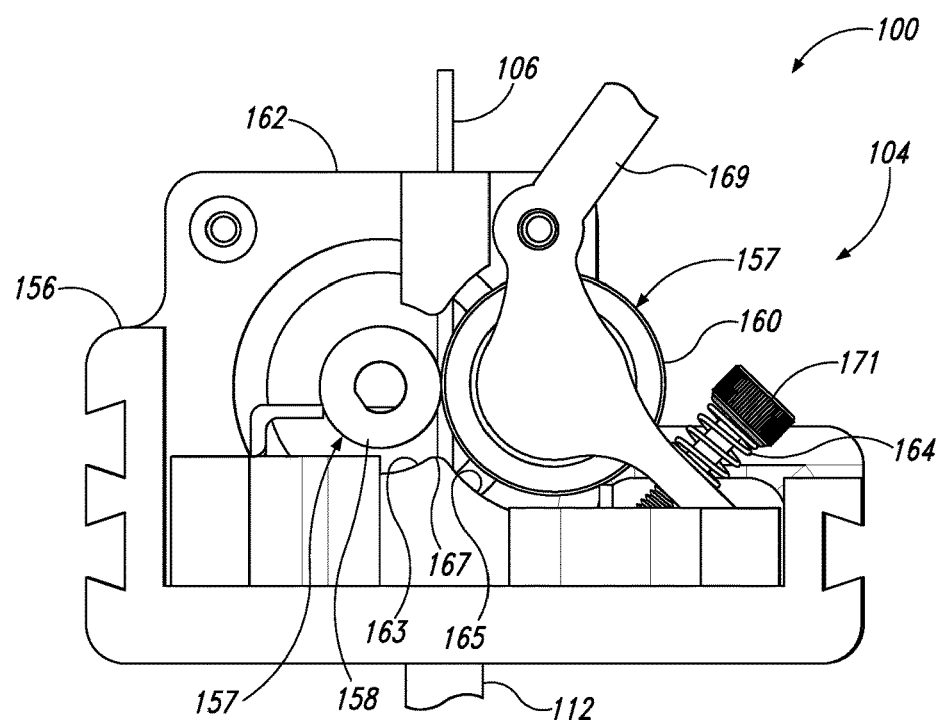
Figure 30:
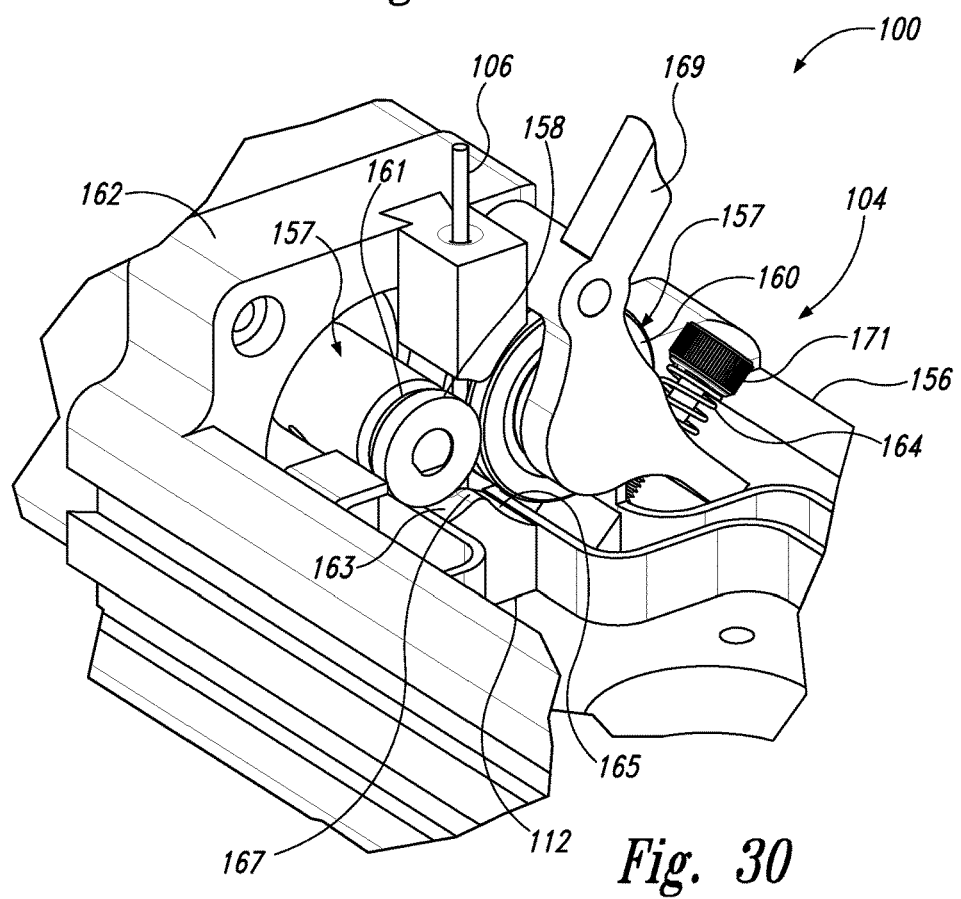
Figure 31:
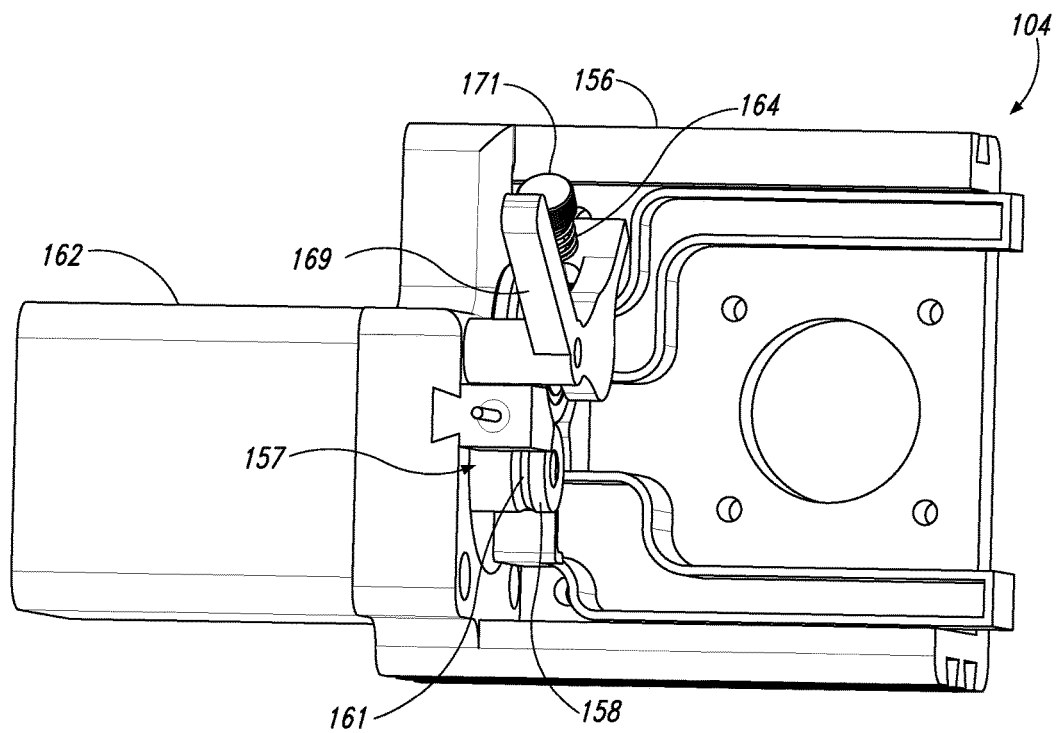
Figure 32:
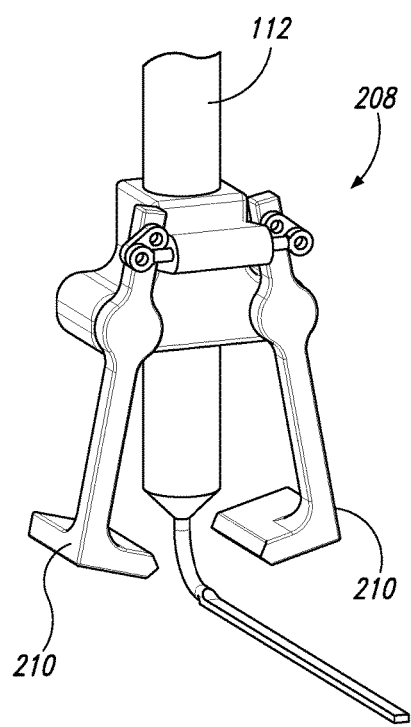
Figure 33:
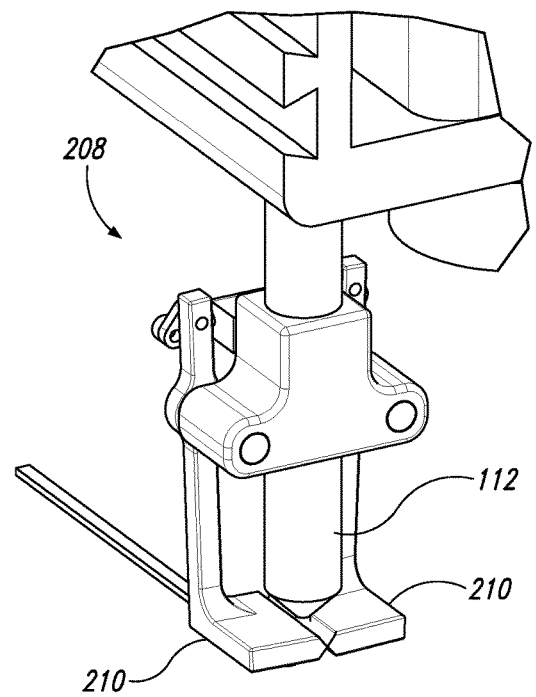
Figure 34A:
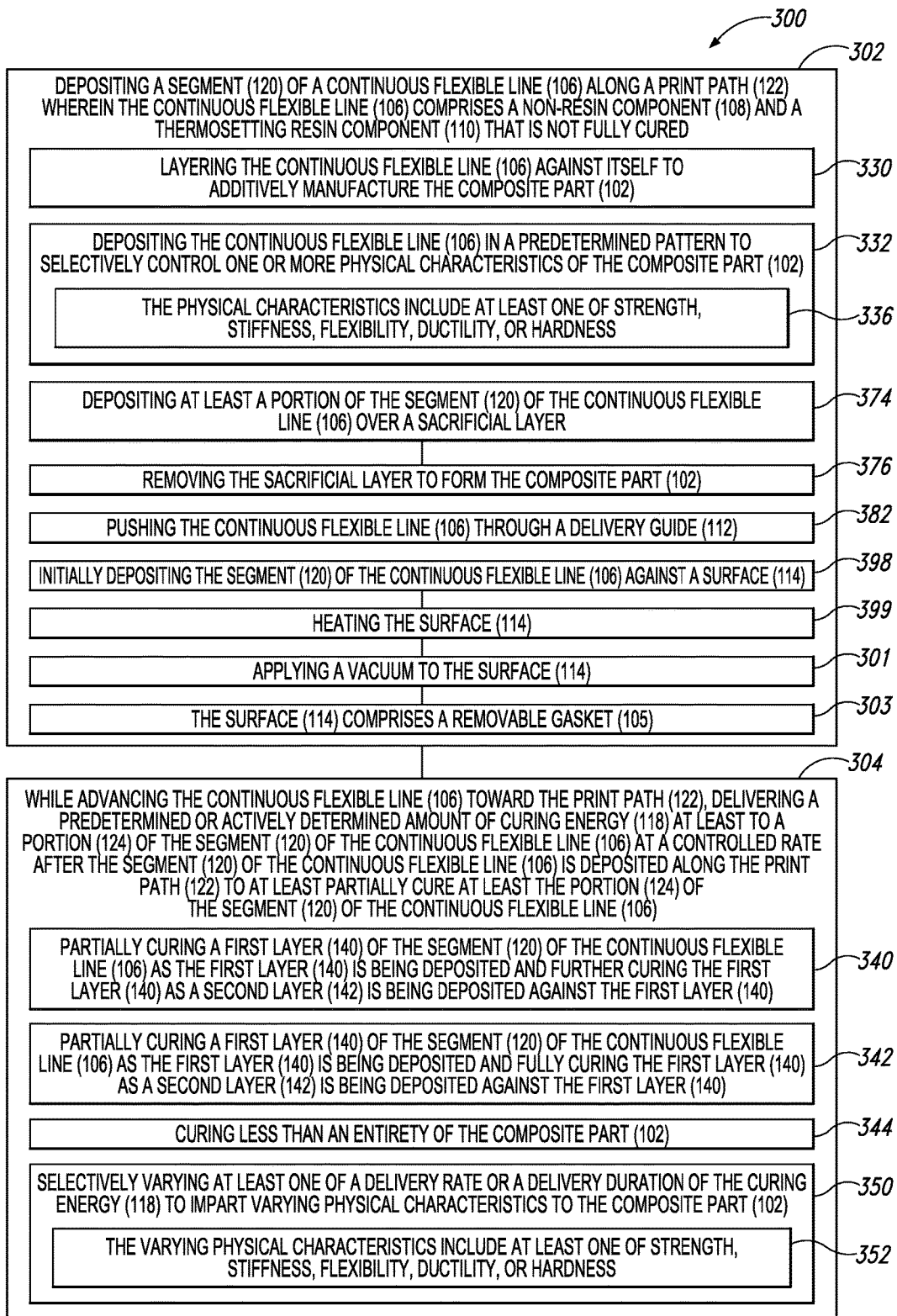
Figure 34B:
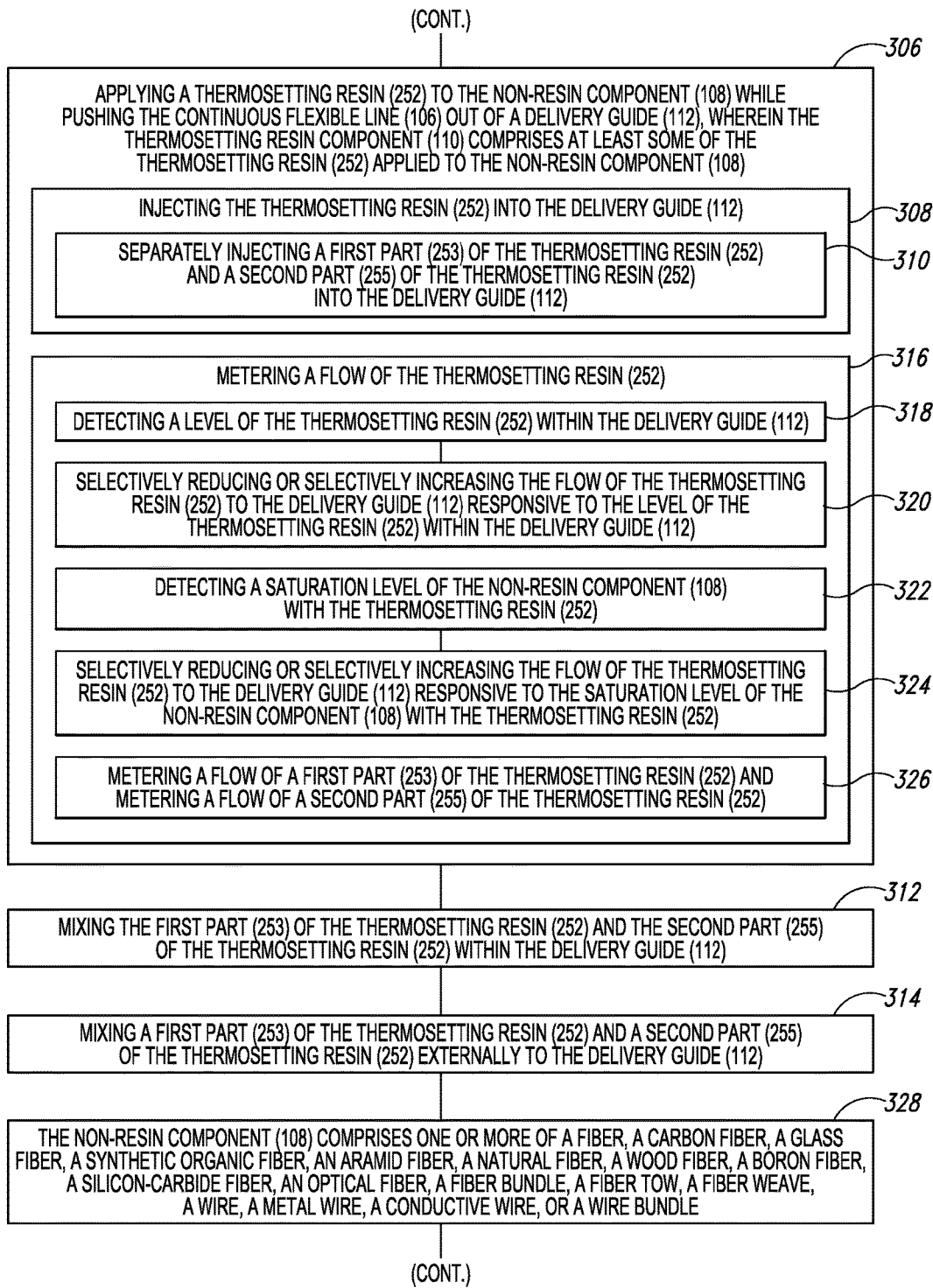
Figure 34D:
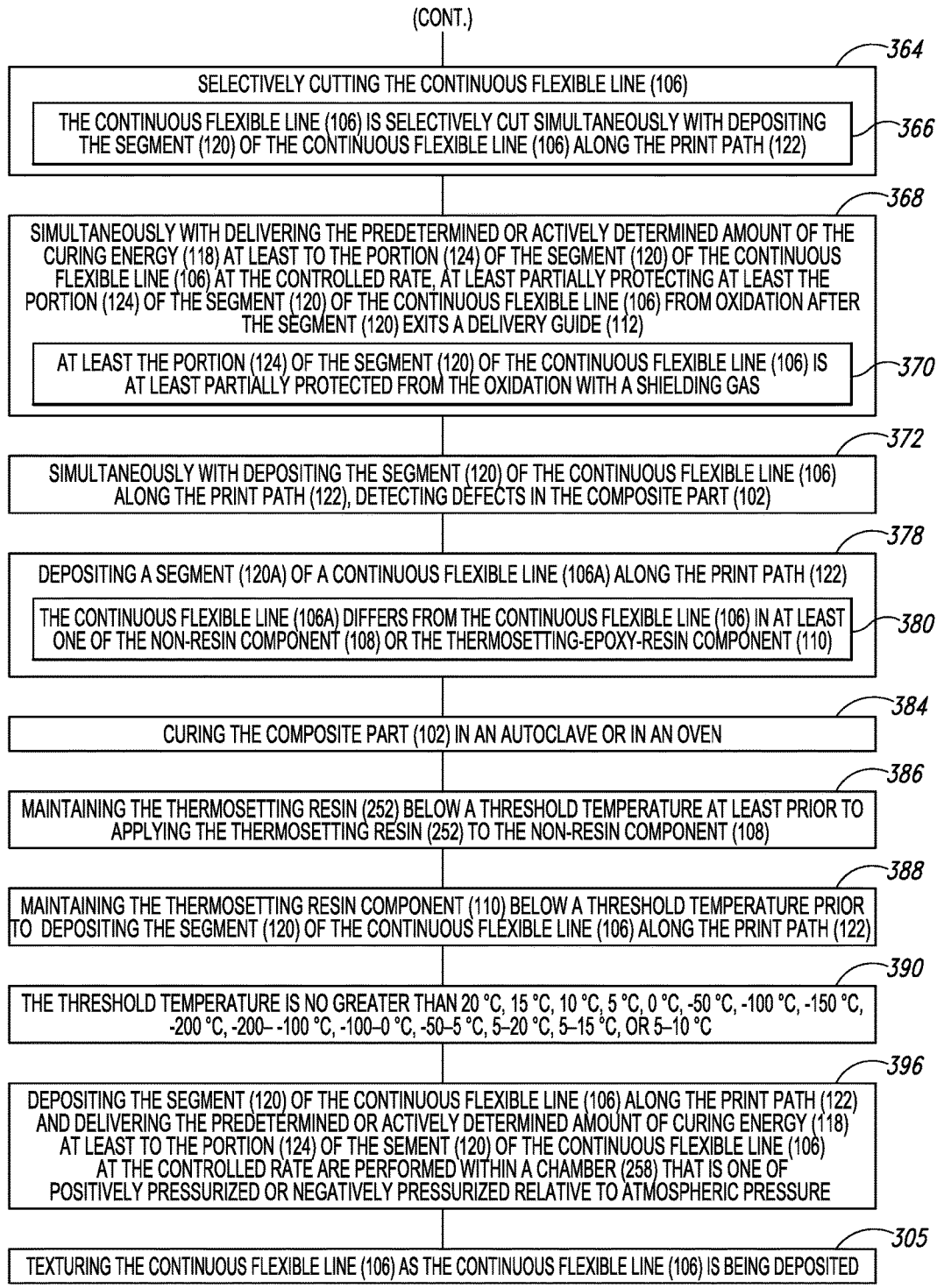
Figure 35A:
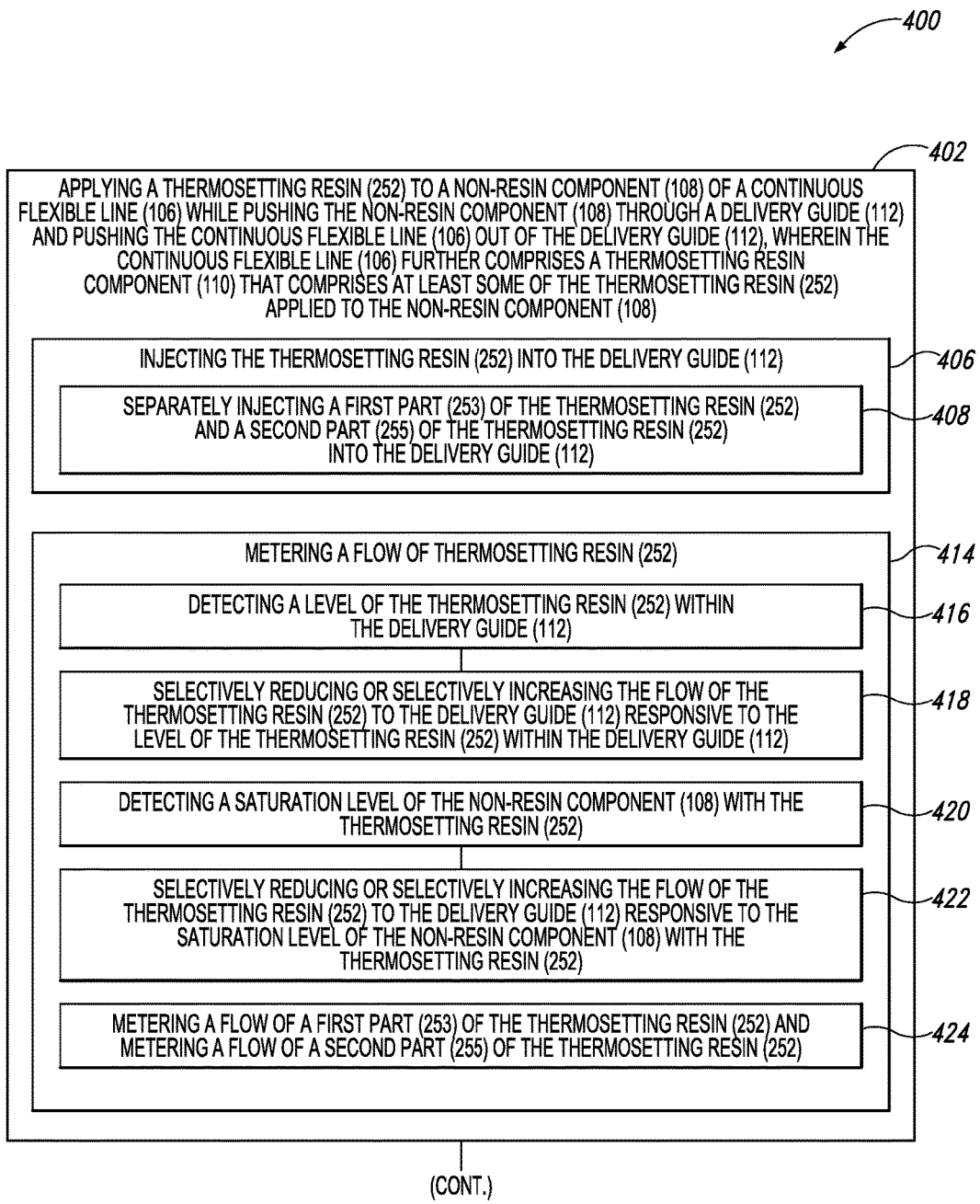
Figure 35B:
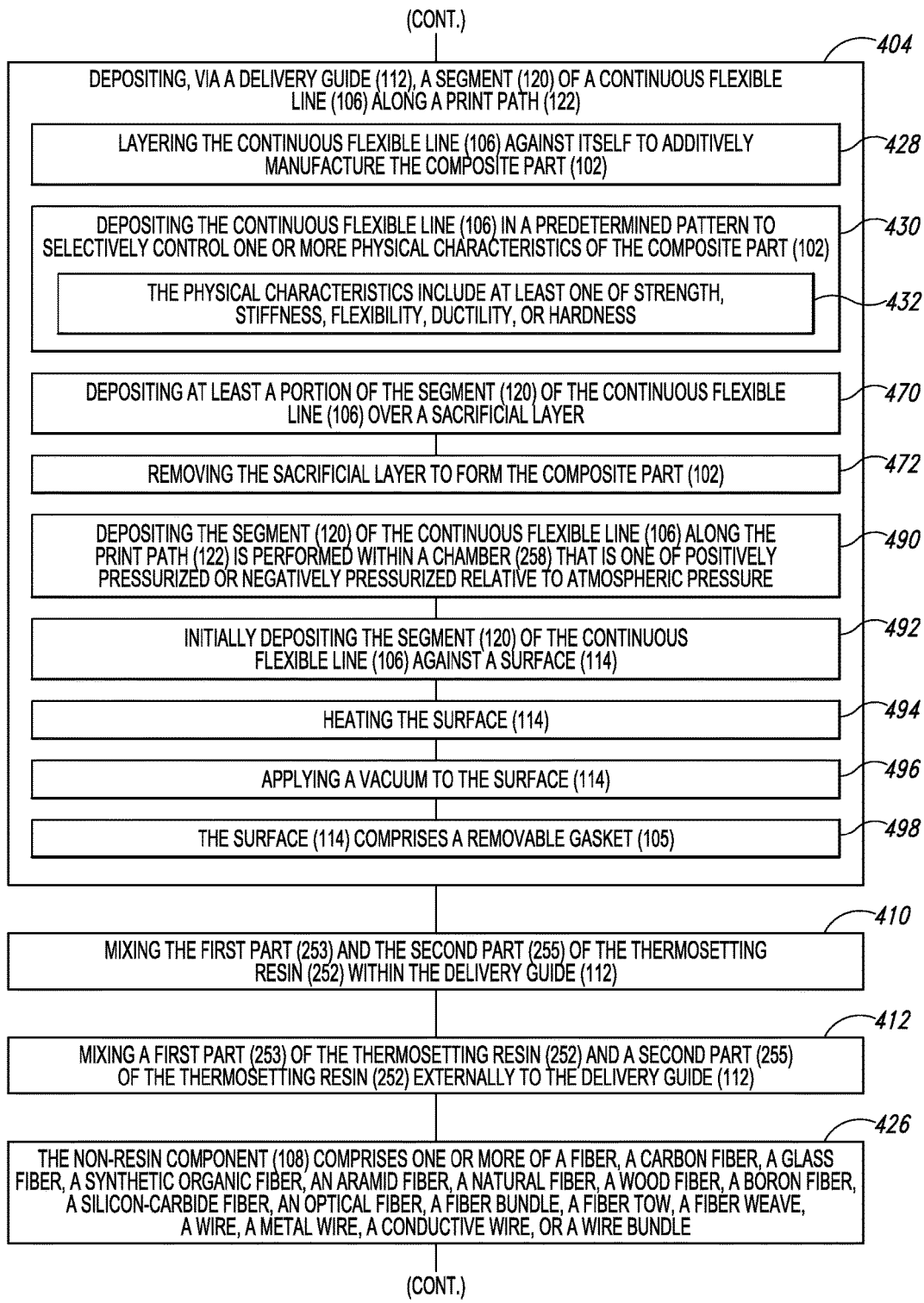
Figure 35D:
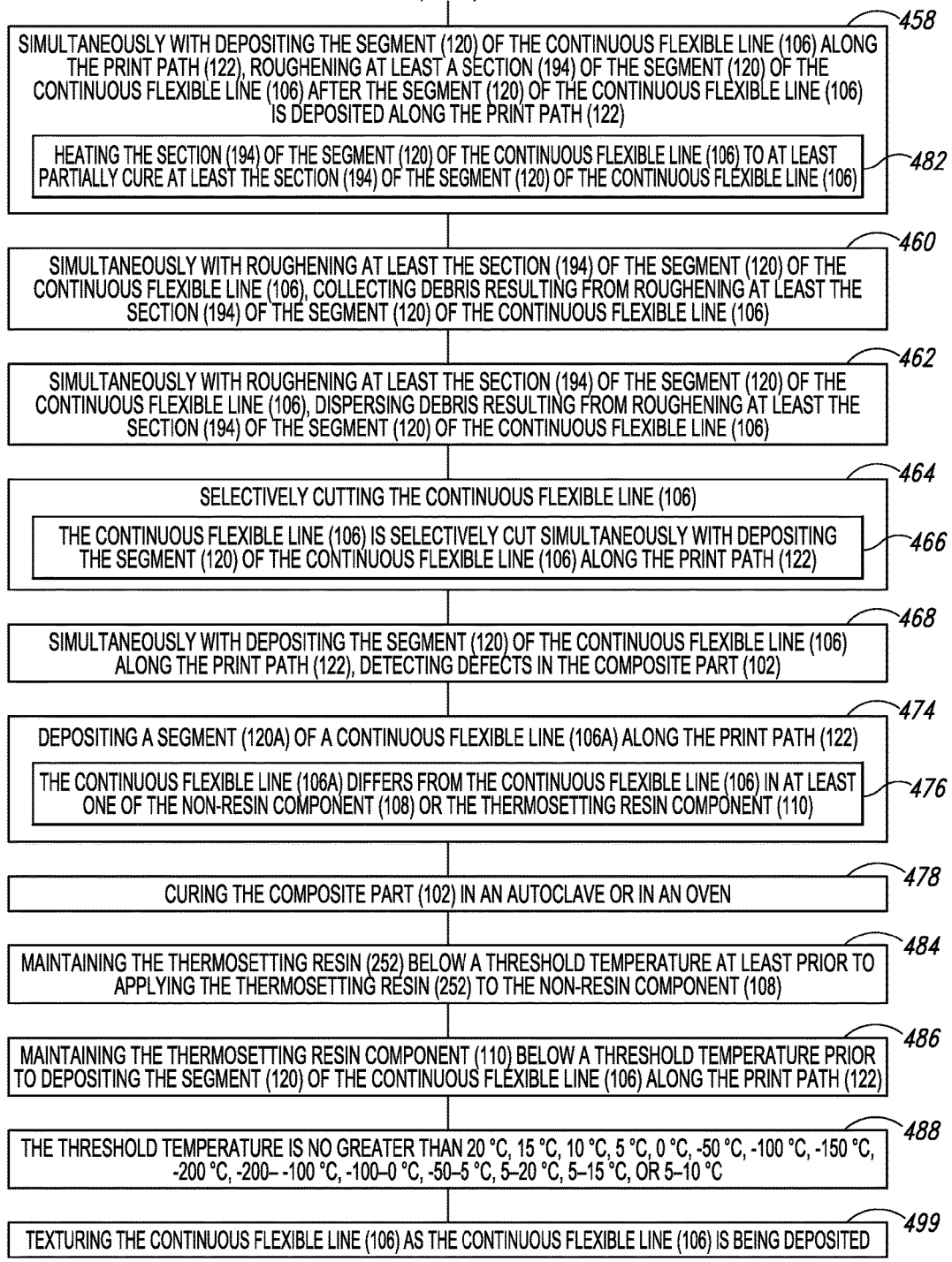
Figure 36:
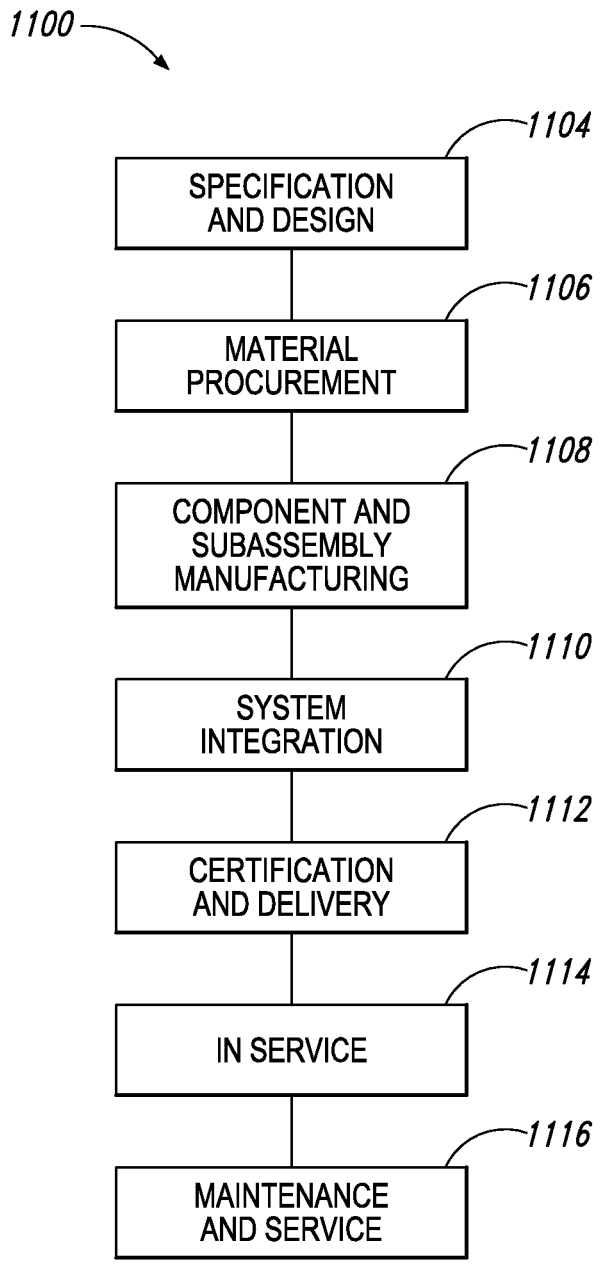
Figure 37:
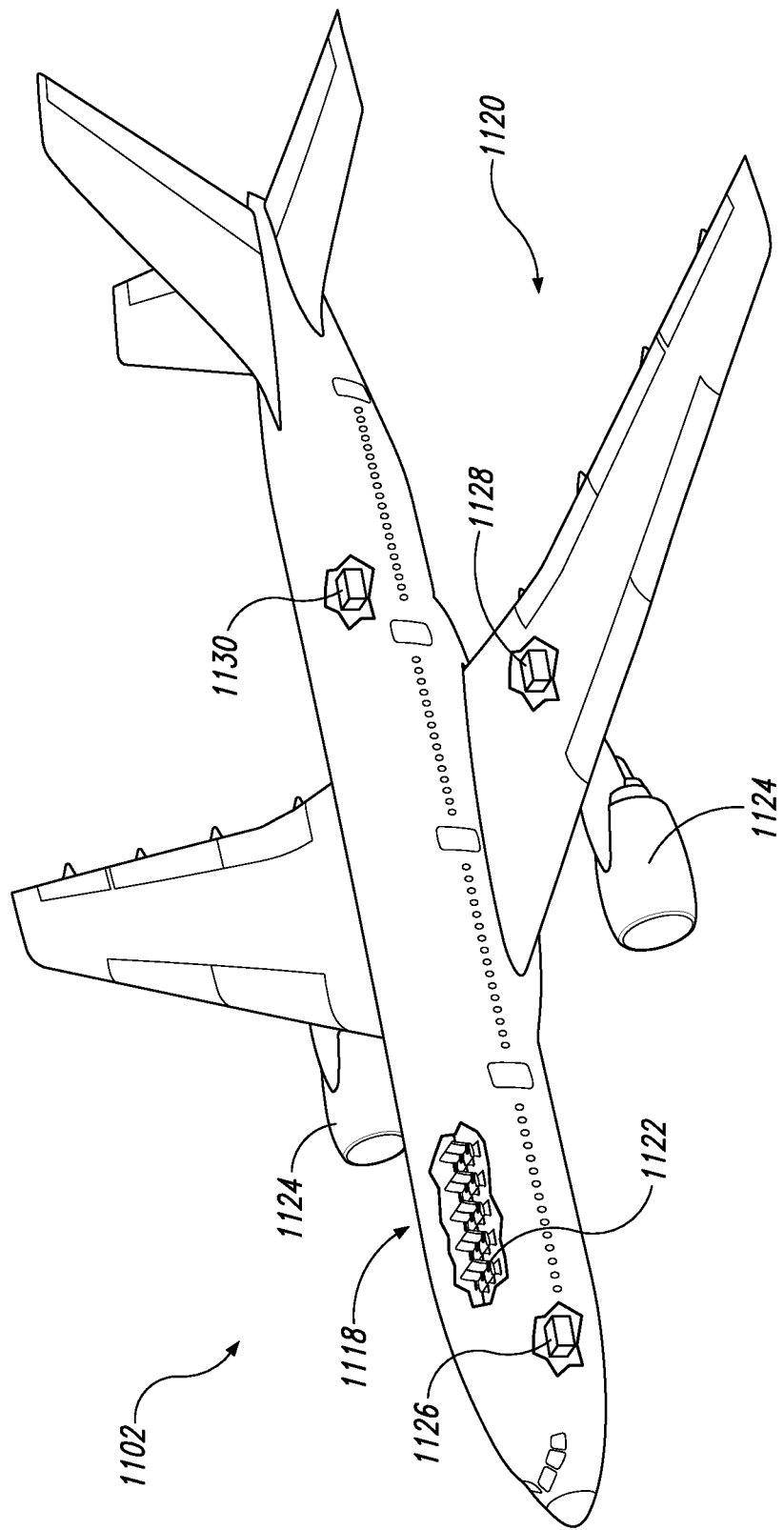

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic diagram of a system for additively manufacturing a composite part, according to one or more examples of the present disclosure;

FIG. 2 is a schematic cross-sectional view of a delivery guide of the system of FIG. 1, according to one or more examples of the present disclosure;

FIG. 3 is a schematic cross-sectional view of a delivery guide of the system of FIG. 1, according to one or more examples of the present disclosure;

FIG. 4 is a schematic illustration of a feed assembly and a delivery guide of the system of FIG. 1, according to one or more examples of the present disclosure;

FIG. 5 is a schematic illustration of a feed assembly and a delivery guide of the system of FIG. 1, according to one or more examples of the present disclosure;

FIG. 6 is a schematic cross-sectional view of a continuous flexible line deposited by the system of FIG. 1, according to one or more examples of the present disclosure;

FIG. 7 is schematic cross-sectional view of a continuous flexible line deposited by the system of FIG. 1, according to one or more examples of the present disclosure;

FIG. 8 is a schematic view of a portion of the system of FIG. 1, illustrating two layers of continuous flexible line being cured simultaneously, according to one or more examples of the present disclosure;

FIG. 9 is a schematic illustration of a portion of the system of FIG. 1, in which a delivery guide comprises a curing-energy passage, according to one or more examples of the present disclosure;

FIG. 10 is a schematic illustration of a portion of the system of FIG. 1, in which a delivery guide comprises a curing-energy passage and curing energy is delivered in the form of a ring, according to one or more examples of the present disclosure;

FIG. 11 is a schematic illustration of a portion of the system of FIG. 1, in which curing energy is delivered in the form of a ring, according to one or more examples of the present disclosure;

FIG. 12 is a schematic illustration of a delivery guide and a compactor, comprising a compaction roller of the system of FIG. 1, according to one or more examples of the present disclosure;

FIG. 13 is a schematic illustration of a portion of the system of FIG. 1 with a compactor comprising a compaction roller, according to one or more examples of the present disclosure;

FIG. 14 is a schematic illustration of a portion of the system of FIG. 1 with a compactor comprising a compaction roller, according to one or more examples of the present disclosure;

FIG. 15 is a schematic illustration of a portion of the system of FIG. 1 with a compactor comprising a compaction wiper, according to one or more examples of the present disclosure;

FIG. 16 is a schematic illustration of a portion of the system of FIG. 1 with a compactor comprising a skirt, according to one or more examples of the present disclosure;

FIG. 17 is a schematic illustration of a cutter comprising an iris-diaphragm of the system of FIG. 1, according to one or more examples of the present disclosure;

FIG. 18 is a schematic illustration of a portion of the system of FIG. 1 with a cutter comprising two blades movable relative to a delivery guide, according to one or more examples of the present disclosure;

FIG. 19 is a schematic illustration of a portion of the system of FIG. 1 with a cutter comprising at least one blade positioned within a delivery guide, according to one or more examples of the present disclosure;

FIG. 20 is a schematic illustration of the system of FIG. 1 with a cutter comprising a cutting laser, according to one or more examples of the present disclosure;

FIG. 21 is a schematic illustration of the system of FIG. 1 with a source of curing energy comprising one or more curing lasers, according to one or more examples of the present disclosure;

FIG. 22 is a view of the system of FIG. 1 comprising a frame and a drive assembly, according to one or more examples of the present disclosure;

FIG. 23 is a view of a portion of the system of FIG. 1 with a cutter, a compactor, a surface roughener, and a curing source comprising a curing laser, according to one or more examples of the present disclosure;

FIG. 24 is a view of a portion of the system of FIG. 1 with a curing source comprising a curing laser, according to one or more examples of the present disclosure;

FIG. 25 is a view of a portion of the system of FIG. 1 with a compactor and a curing source comprising a curing laser, according to one or more examples of the present disclosure;

FIG. 26 is a view of a portion of the system of FIG. 1 with a curing source comprising a curing laser, according to one or more examples of the present disclosure;

FIG. 27 is a view of a portion of the system of FIG. 1 with a curing source comprising two curing lasers, according to one or more examples of the present disclosure;

FIG. 28 is a view of a portion of the system of FIG. 1 with a curing source comprising four curing lasers, according to one or more examples of the present disclosure;

FIG. 29 is a view of a portion of the system of FIG. 1 illustrating a feed mechanism, according to one or more examples of the present disclosure;

FIG. 30 is another view of the portion of FIG. 29;

FIG. 31 is another view of the portion of FIG. 29;

FIG. 32 is a view of a portion of the system of FIG. 1 with a cutter comprising two blades movable relative to a delivery guide, according to one or more examples of the present disclosure;

FIG. 33 is another view of the portion of FIG. 32;

FIGS. 34A, 34B, 34C, and 34D collectively are a block diagram of a method for additively manufacturing composite parts, according to one or more examples of the present disclosure;

FIGS. 35A, 35B, 35C, and 35D collectively are a block diagram of a method for additively manufacturing composite parts, according to one or more examples of the present disclosure;

FIG. 36 is a block diagram representing aircraft production and service methodologies;

FIG. 37 is a schematic illustration of an aircraft; and

Figure 38:
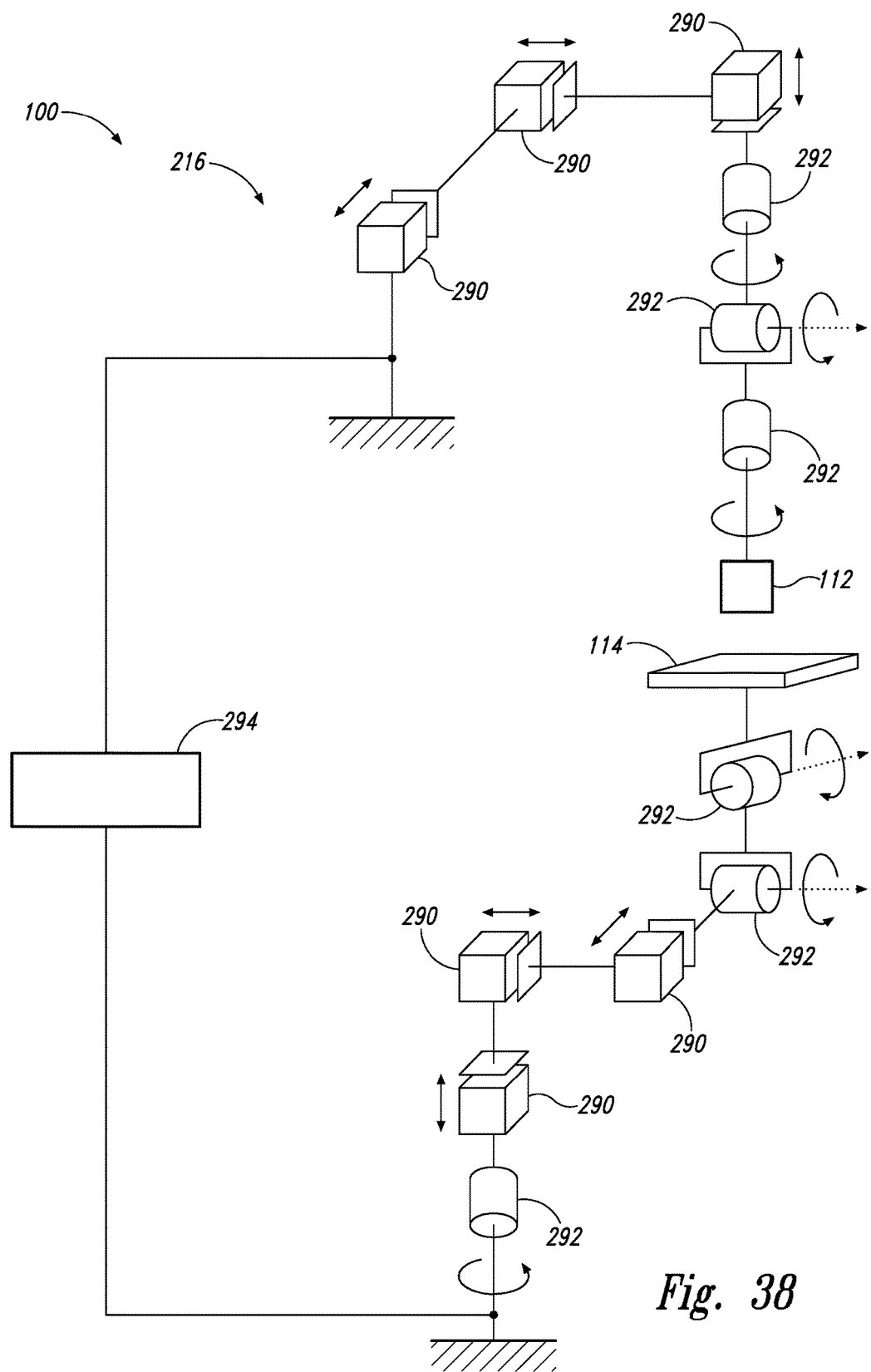

FIG. 38 is a schematic illustration of the system of FIG. 1, in which twelve degrees of freedom are provided between a delivery guide and a surface, according to one or more examples of the present disclosure.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the schematic diagram also may exist. Dashed lines, if any, connecting blocks designating the various elements and/or components represent couplings similar in function and purpose to those represented by solid lines; however, couplings represented by the dashed lines either may be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements also may be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 34-36, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 34-36 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, or component "configured to" perform a specified function is indeed capable of performing the specified function without any alteration, rather than merely having potential to perform the specified function after further modification. In other words, the system, apparatus, structure, article, element, or component is specifically selected, created, implemented, utilized, programmed, and/or designed for the purpose of performing the specified function. As used herein, "configured to" denotes existing characteristics of a system, apparatus, structure, article, element, or component which enable the system, apparatus, structure, article, element, or component to actually perform the specified function. For purposes of this disclosure, a system, apparatus, structure, article, element, or component described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring, e.g., to FIG. 1, system 100 for additively manufacturing composite part 102 is disclosed. System 100 comprises delivery guide 112, movable relative to surface 114. Delivery guide 112 is configured to deposit at least segment 120 of continuous flexible line 106 along print path 122. Continuous flexible line 106 comprises non-resin component 108 and thermosetting resin component 110. Thermosetting resin component 110 comprises first part 253 of thermosetting resin 252 and second part 255 of thermosetting resin 252. Print path 122 is stationary relative to surface 114. Delivery guide 112 comprises first inlet 170, configured to receive non-resin component 108, and second inlet 250, configured to receive at least first part 253 of thermosetting resin 252. Delivery guide 112 is further configured to apply first part 253 of thermosetting resin 252 and second part 255 of thermosetting resin 252 to non-resin component 108. System 100 further comprises feed mechanism 104, configured to push continuous flexible line 106 out of delivery guide 112. The preceding subject matter of this paragraph characterizes example 1 of the present disclosure.

System 100 therefore may be used to manufacture composite parts 102 from at least a composite material that is created from thermosetting resin 252 and non-resin component 108 while composite part 102 is being manufactured. In addition, system 100 may be used to manufacture composite parts 102 with continuous flexible line 106 being oriented in desired and/or predetermined orientations throughout composite part 102, such as to define desired properties of composite part 102.

Because continuous flexible line 106 is created by system 100 in delivery guide 112 during manufacturing of composite part 102, system 100 has the flexibility of permitting selection of different non-resin components 108 and/or different thermosetting resins 252 to customize or otherwise create a desired composite part 102 with different characteristics at different locations within composite part 102. Moreover, because thermosetting resin 252 is applied to non-resin component 108 within delivery guide 112, which is downstream of feed mechanism 104, feed mechanism 104 may engage and operate directly on non-resin component 108 without thermosetting resin 252 in liquid form hindering operation of feed mechanism 104. Additionally or alternatively, such a configuration may permit for greater control of the creation of thermosetting resin component 110, such as by avoiding thermosetting resin 252 in liquid form being withdrawn from non-resin component 108 by feed mechanism 104.

Some examples of system 100 additionally or alternatively may be described as 3-D printers.

As mentioned, feed mechanism 104 is configured to push continuous flexible line 106 out of delivery guide 112. In other words, delivery guide 112, which deposits continuous flexible line 106 along print path 122, is positioned downstream of feed mechanism 104 with respect to a direction of movement of continuous flexible line 106 when composite part 102 is being manufactured by system 100.

As used herein, the terms "upstream" and "downstream" relate to the intended direction of travel of non-resin component 108, thermosetting resin component 110, or thermosetting resin 252 generally through system 100, or portion thereof, including, for example, feed mechanism 104 and delivery guide 112.

As used herein, a "continuous flexible line" is an elongate structure having a length significantly longer than a dimension (e.g., diameter or width) that is transverse, or perpendicular, to its length. As an illustrative, non-exclusive example, continuous flexible line 106 may have a length that is at least 100, at least 1000, at least 10000, at least 100000, or at least 1000000 times greater than its diameter or width.

As used herein, a "thermosetting resin" is a resin material that is configured to be cured, or hardened, by selective application of heat and/or radiation, and/or by time above a threshold curing temperature. Moreover, thermosetting resin 252 is comprised of first part 253 and second part 255. In some examples, thermosetting resin 252 may be an epoxy resin. In some examples, first part 253 and second part 255 may be described as co-reactants. In some examples, such co-reactants may be hardeners or curatives.

As mentioned, delivery guide 112 is movable relative to surface 114. This means that in some examples, system 100 may include delivery guide 112 configured to be selectively moved relative to surface 114, which surface 114 may be a part of system 100 or a part of a structure, such as an airplane wing or a fuselage, etc. Additionally, in examples where system 100 includes surface 114, surface 114 may be selectively moved relative to delivery guide 112. Also, in some examples, system 100 may include delivery guide 112 and surface 114, and both may be selectively moved relative to each other.

Referring generally to FIG. 1 and particularly to, e.g., FIGS. 2, 3, and 5, delivery guide 112 further comprises third inlet 257, configured to receive second part 255 of thermosetting resin 252. The preceding subject matter of this paragraph characterizes example 2 of the present disclosure, wherein example 2 also includes the subject matter according to example 1, above.

Accordingly, first part 253 and second part 255 of thermosetting resin 252 are brought together within delivery guide 112 where thermosetting resin 252 is applied to non-resin component 108. Thus, the component parts of thermosetting resin 252, that is, first part 253 and second part 255, may be maintained separately and brought together only when being applied to non-resin component 108. As a result, thermosetting resin 252 does not begin to cure prior to being applied to non-resin component 108, and, depending on thermosetting resin 252 selected for a specific application, only begins to cure just prior in time to being deposited by delivery guide 112 along print path 122.

Referring generally to FIG. 1 and particularly to, e.g., FIGS. 2 and 3, delivery guide 112 further comprises internal mixing structure 259, configured to operatively combine first part 253 and second part 255 of thermosetting resin 252 within delivery guide 112. The preceding subject matter of this paragraph characterizes example 3 of the present disclosure, wherein example 3 also includes the subject matter according to example 2, above.

Internal mixing structure 259, when present, facilitates the mixing of first part 253 and second part 255 of thermosetting resin 252, such as to ensure a uniform distribution of the component parts of thermosetting resin 252 and uniform property characteristics of thermosetting resin component 110, and thus of continuous flexible line 106.

Referring generally to FIG. 1 and particularly to, e.g., FIGS. 2 and 3, delivery guide 112 further comprises outlet 206 and line passage 154, extending from first inlet 170 to outlet 206. Outlet 206 is configured to provide an exit for continuous flexible line 106 from delivery guide 112. Internal mixing structure 259 comprises one or more mixing guides 261, positioned within delivery guide 112, and configured to intermix first part 253 and second part 255 of thermosetting resin 252. The preceding subject matter of this paragraph characterizes example 4 of the present disclosure, wherein example 4 also includes the subject matter according to example 3, above.

Mixing guides 261, when present, facilitate mixing of first part 253 and second part 255 of thermosetting resin 252. Mixing guides 261 may take any suitable form, such as to impart turbulent flow and/or change of directions of first part 253 and/or second part 255 to ensure adequate mixing thereof.

In some examples, mixing guides 261 may be described as baffles, vanes, and/or fins.

Referring generally to FIG. 1 and particularly to, e.g., FIGS. 2 and 3, one or more mixing guides 261 are at least partially discontinuous along line passage 154. The preceding subject matter of this paragraph characterizes example 5 of the present disclosure, wherein example 5 also includes the subject matter according to example 4, above.

By being discontinuous, mixing guides 261 may facilitate adequate mixing of first part 253 and second part 255 of thermosetting resin 252 within delivery guide 112.

Referring generally to FIG. 1 and particularly to, e.g., FIG. 2, only a portion of one or more mixing guides 261 defines line passage 154. The preceding subject matter of this paragraph characterizes example 6 of the present disclosure, wherein example 6 also includes the subject matter according to any one of examples 4 or 5, above.

By having a portion of one or more mixing guides 261, itself, define line passage 154, through which non-resin component 108 is pushed by feed mechanism 104, adequate coating and/or saturation of non-resin component 108 with thermosetting resin 252 may be achieved.

In FIG. 2, five differently configured mixing guides 261 are illustrated as examples only and do not limit the present disclosure to such structural mixing guides 261. Rather, as illustrative, non-exclusive examples only, mixing guides 261 may include a ramped construction, a funneled construction, a spiral construction, and/or a plate-like construction. Additionally or alternatively, as illustrated in FIG. 2, line passage 154, as defined by mixing guides 161 may vary in width and/or diameter among different mixing guides 161. Other configurations of mixing guides 161 are within the scope of the present disclosure and the examples illustrated in FIG. 2 are not limiting.

Referring generally to FIG. 1 and particularly to, e.g., FIG. 2, at least a portion of one or more mixing guides 261 is angled toward outlet 206. The preceding subject matter of this paragraph characterizes example 7 of the present disclosure, wherein example 7 also includes the subject matter according to any one of examples 4-6, above.

By being angled toward outlet 206, mixing guides 261 may facilitate the initial threading or feeding of non-resin component 108 through delivery guide 112, as well as facilitate the feeding of non-resin component 108 and continuous flexible line 106 through delivery guide 112 during manufacture of composite part 102.

Referring generally to FIG. 1 and particularly to, e.g., FIG. 2, at least the portion of one or more mixing guides 261 is angled toward outlet 206 at a pitch that varies along line passage 154. The preceding subject matter of this paragraph characterizes example 8 of the present disclosure, wherein example 8 also includes the subject matter according to example 7, above.

By having a varied pitch of mixing guides 261, radially inward regions of mixing guides 261 may facilitate feeding of non-resin component 108 and continuous flexible line 106 through delivery guide 112, while radially outward regions of mixing guides 261, or mixing guides 261 as a whole, may facilitate mixing of first part 253 and second part 255 of thermosetting resin 252. In some examples, a first mixing guide 261 may have a different pitch angle than the remaining mixing guides 261, with the first mixing guide 261 being upstream of the other mixing guides 261. In other examples, the pitch angle of the mixing guides 261 may not vary.

Referring generally to FIG. 1 and particularly to, e.g., FIGS. 2 and 3, delivery guide 112 has central longitudinal axis 270. Line passage 154 is concentric with central longitudinal axis 270 of delivery guide 112. The preceding subject matter of this paragraph characterizes example 9 of the present disclosure, wherein example 9 also includes the subject matter according to any one of examples 4-8, above.

Such a configuration of delivery guide 112 may facilitate sufficient application of thermosetting resin 252 to non-resin component 108, such as coming into contact with an entire circumference of non-resin component 108 as it travels through delivery guide 112. Moreover, such a configuration may result in an efficient packaging of delivery guide 112.

Referring generally to FIG. 1 and particularly to, e.g., FIG. 3, delivery guide 112 further comprises outlet 206 and line passage 154, extending from first inlet 170 to adjacent outlet 206. Outlet 206 is configured to provide an exit for continuous flexible line 106 from delivery guide 112. Delivery guide 112 further comprises resin passage 264, extending from second inlet 250 and third inlet 257 to adjacent outlet 206. Internal mixing structure 259 comprises one or more mixing guides 261, positioned within resin passage 264. The preceding subject matter of this paragraph characterizes example 10 of the present disclosure, wherein example 10 also includes the subject matter according to example 3, above.

By having resin passage 264 separate from line passage 154 and having mixing guides 261 of resin passage 264, adequate mixing of first part 253 and second part 255 of thermosetting resin 252 may result prior to thermosetting resin 252 being applied to non-resin component 108. As a result, pockets or concentrations of first part 253 and/or second part 255 being absorbed by or adhering to non-resin component 108 may be avoided.

Referring generally to FIG. 1 and particularly to, e.g., FIG. 3, line passage 154 is isolated from resin passage 264 longitudinally along at least a portion of line passage 154. Line passage 154 and resin passage 264 are in fluid communication with each other adjacent to outlet 206, such that thermosetting resin 252 is applied to non-resin component 108 adjacent to outlet 206. The preceding subject matter of this paragraph characterizes example 11 of the present disclosure, wherein example 11 also includes the subject matter according to example 10, above.

Again, by having resin passage 264 separate from, and in this example isolated from, line passage 154, adequate mixing of first part 253 and second part 255 of thermosetting resin 252 may result prior to thermosetting resin 252 being applied to non-resin component 108. Moreover, by applying thermosetting resin 252 to non-resin component 108 adjacent to outlet 206, feeding of non-resin component 108 through line passage 154 may be more easily facilitated, in so far as non-resin component 108 is not wet with thermosetting resin 252 while being fed through line passage 154.

Referring generally to FIG. 1 and particularly to, e.g., FIG. 3, one or more mixing guides 261 are at least partially discontinuous along resin passage 264. The preceding subject matter of this paragraph characterizes example 12 of the present disclosure, wherein example 12 also includes the subject matter according to any one of examples 10 or 11, above.

By being discontinuous, mixing guides 261 may facilitate adequate mixing of first part 253 and second part 255 of thermosetting resin 252 within resin passage 264.

Referring to FIG. 1, delivery guide 112 is configured to provide selective access to internal mixing structure 259 for removing cured thermosetting resin 252 from delivery guide 112. The preceding subject matter of this paragraph characterizes example 13 of the present disclosure, wherein example 13 also includes the subject matter according to any one of examples 3-12, above.

Depending on a selected thermosetting resin 252, over time, thermosetting resin 252 may harden, or otherwise clog, delivery guide 112, as a result of becoming cured, or partially cured. Accordingly, by being configured to provide selective access to internal mixing structure 259, any cured thermosetting resin 252 may be able to be removed for subsequent use of delivery guide 112 and system 100.

Referring to FIG. 1, delivery guide 112 further comprises first portion 266 and second portion 268, configured to be selectively spaced away from first portion 266. The preceding subject matter of this paragraph characterizes example 14 of the present disclosure, wherein example 14 also includes the subject matter according to example 13, above.

By having two portions that may be selectively separated, at least partially, access to the internal volume and internal mixing structure 259 may be permitted, such as to remove cured thermosetting resin 252.

Referring to FIG. 1, first portion 266 is hinged to second portion 268. The preceding subject matter of this paragraph characterizes example 15 of the present disclosure, wherein example 15 also includes the subject matter according to example 14, above.

A hinged connection between first portion 266 and second portion 268 may facilitate and/or ease selective opening and closing of delivery guide 112 for access to internal mixing structure 259.

Referring to FIG. 1, system 100 further comprises first vessel 262, configured to dispense first part 253 of thermosetting resin 252 to second inlet 250 of delivery guide 112. System 100 further comprises second vessel 272, configured to dispense second part 255 of thermosetting resin 252 to third inlet 257 of delivery guide 112. The preceding subject matter of this paragraph characterizes example 16 of the present disclosure, wherein example 16 also includes the subject matter according to any one of examples 2-15, above.

Vessel 262 provides a volume of first part 253 of thermosetting resin 252, and vessel 272 provides a volume of second part 255 of thermosetting resin 252. Moreover, vessel 262 and vessel 272 may be replenished during manufacture of composite part 102 and optionally may be replenished with different first parts 253 and second parts 255, respectively, during manufacture of composite part 102, such as to create desired properties at different locations within composite part 102.

Additionally or alternatively, more than one vessel 262 and/or more than one vessel 272 may be provided, with individual vessels 262 and/or individual vessels 272, each holding different first parts 253 and/or different second parts 255, respectively, for selective delivery to second inlet 250 and third inlet 257, respectively.

Referring to FIG. 1, system 100 further comprises resin-metering system 256, configured to actively control a flow of first part 253 of thermosetting resin 252 to second inlet 250 of delivery guide 112 and to actively control a flow of second part 255 of thermosetting resin 252 to third inlet 257 of delivery guide 112. The preceding subject matter of this paragraph characterizes example 17 of the present disclosure, wherein example 17 also includes the subject matter according to example 16, above.

By actively controlling a flow of first part 253 and second part 255 to delivery guide 112, a desired volume of thermosetting resin 252 may be delivered to delivery guide 112 and applied to non-resin component 108. Moreover, over supplying thermosetting resin 252 to delivery guide 112 may be avoided, for example, avoiding undesirable spillage or leakage of thermosetting resin 252 on component parts of system 100 and/or on composite part 102 being manufactured. Additionally or alternatively, it may be desirable for continuous flexible line 106 to have a greater volume of thermosetting resin 252 along a subset of its length and a lesser volume of thermosetting resin 252, or even no thermosetting resin 252, along a different subset of its length, such as to result in desired properties of composite part 102.

Referring generally to FIG. 1 and particularly to, e.g., FIG. 5, resin-metering system 256 comprises at least one sensor 254, configured to detect a level of thermosetting resin 252 in delivery guide 112. The preceding subject matter of this paragraph characterizes example 18 of the present disclosure, wherein example 18 also includes the subject matter according to example 17, above.

One or more sensors 254 provide data for resin-metering system 256 to base its active control of the flow of first part 253 and second part 255 of thermosetting resin 252.

Any suitable sensors 254 may be provided, including sensors 254 that are configured to detect the presence of first part 253 and/or second part 255. Sensors 254 may be optical, capacitive, and/or ultrasonic, as examples.

Referring generally to FIG. 1 and particularly to, e.g., FIG. 5, at least one sensor 254 comprises high-level sensor 101, configured to detect when the level of thermosetting resin 252 is at or above an upper threshold level in delivery guide 112. Resin-metering system 256 is configured to reduce the flow of first part 253 and second part 255 of thermosetting resin 252 responsive to thermosetting resin 252 being at or above the upper threshold level in delivery guide 112. The preceding subject matter of this paragraph characterizes example 19 of the present disclosure, wherein example 19 also includes the subject matter according to example 18, above.

By including high-level sensor 101, resin-metering system 256 may actively control the flow of first part 253 and/or second part 255 to avoid unwanted overflow of first part 253 and/or second part 255 upstream of delivery guide 112, such as into feed mechanism 104, which may be undesirable.

Referring generally to FIG. 1 and particularly to, e.g., FIG. 5, at least one sensor 254 comprises low-level sensor 260, configured to detect when the level of thermosetting resin 252 is at or below a lower threshold level in delivery guide 112. Resin-metering system 256 is configured to increase the flow of first part 253 and second part 255 of thermosetting resin 252 responsive to thermosetting resin 252 being at or below the lower threshold level in delivery guide 112. The preceding subject matter of this paragraph characterizes example 20 of the present disclosure, wherein example 20 also includes the subject matter according to any one of examples 18 or 19, above.

By including low-level sensor 260, resin-metering system 256 may actively control the flow of first part 253 and/or second part 255 to ensure that sufficient thermosetting resin 252 is being applied to non-resin component 108. For example, if low-level sensor 260 detects none of first part 253, second part 255 and/or thermosetting resin 252 or detects an insufficient level of first part 253, second part 255 and/or thermosetting resin 252, then resin-metering system 256 may increase the flow of first part 253 and/or second part 255 to delivery guide 112 and thus to non-resin component 108.

Referring to FIG. 5, low-level sensor 260 is positioned upstream from second inlet 250 and third inlet 257. The preceding subject matter of this paragraph characterizes example 21 of the present disclosure, wherein example 21 also includes the subject matter according to example 20, above.

Positioning low-level sensor 260 upstream from second inlet 250 and third inlet 257 may facilitate the detection of a low level of first part 253, second part 255, and/or thermosetting resin 252 prior to the level being unacceptably low, such that it results in less than sufficient saturation of non-resin component 108.

Referring generally to FIG. 1 and particularly to, e.g., FIG. 5, low-level sensor 260 is positioned downstream from second inlet 250 and third inlet 257. The preceding subject matter of this paragraph characterizes example 22 of the present disclosure, wherein example 22 also includes the subject matter according to example 20, above.

Positioning low-level sensor 260 downstream from second inlet 250 and third inlet 257 may facilitate detection of an unacceptably low level of first part 253, second part 255, and/or thermosetting resin 252, so that resin-metering system 256 may take corrective action.

Referring generally to FIG. 1 and particularly to, e.g., FIG. 5, at least one sensor 254 comprises saturation sensor 276, positioned to detect a level of saturation of non-resin component 108 with thermosetting resin 252 prior to exiting delivery guide 112. The preceding subject matter of this paragraph characterizes example 23 of the present disclosure, wherein example 23 also includes the subject matter according to any one of examples 18-22, above.

By including saturation sensor 276 in a position to detect a level of saturation of non-resin component 108 prior to continuous flexible line 106 exiting delivery guide 112, resin-metering system 256 may be used to ensure that continuous flexible line 106 is always at a desired, or above a minimum threshold level of, saturation.

Referring to FIG. 1, resin-metering system 256 further comprises first pump 265, configured to selectively increase and decrease the flow of first part 253 of thermosetting resin 252 responsive to input from at least one sensor 254. Resin-metering system 256 further comprises second pump 267, configured to selectively increase and decrease the flow of second part 255 of thermosetting resin 252 responsive to input from at least one sensor 254. The preceding subject matter of this paragraph characterizes example 24 of the present disclosure, wherein example 24 also includes the subject matter according to any one of examples 18-23, above.

Pump 265 and pump 267 provide for selective increase and/or decrease in the flow of first part 253 and second part 255 of thermosetting resin 252 based on input from one or more sensors 254.

Referring to FIG. 1, system 100 further comprises external mixing structure 263, configured to operatively combine first part 253 and second part 255 of thermosetting resin 252 outside of delivery guide 112. Second inlet 250 is configured to receive thermosetting resin 252 from external mixing structure 263. The preceding subject matter of this paragraph characterizes example 25 of the present disclosure, wherein example 25 also includes the subject matter according to example 1, above.

By having external mixing structure 263, that is mixing structure outside of delivery guide 112, delivery guide 112 may be smaller than in examples with internal mixing structure. Moreover, external mixing structure 263 may comprise an off-the-shelf product that is easily replaced during the use and/or lifetime of system 100.

Referring to FIG. 1 external mixing structure 263 comprises one or more mixing guides 261, configured to intermix first part 253 of thermosetting resin 252 and second part 255 of thermosetting resin 252. The preceding subject matter of this paragraph characterizes example 26 of the present disclosure, wherein example 26 also includes the subject matter according to example 25, above.

Mixing guides 261, when present, facilitate mixing of first part 253 and second part 255 of thermosetting resin 252. Mixing guides 261 may take any suitable form, such as to impart turbulent flow and/or change of directions of first part 253 and/or second part 255 to ensure adequate mixing thereof.

Referring to FIG. 1, external mixing structure 263 comprises an off-the-shelf resin-mixing nozzle. The preceding subject matter of this paragraph characterizes example 27 of the present disclosure, wherein example 27 also includes the subject matter according to any one of examples 25 or 26, above.

Use of an off-the-shelf mixing nozzle may facilitate easy and cost-effective replacement of external mixing structure 263, thereby avoiding having to replace delivery guide 112.

Illustrative, non-exclusive examples of off-the-shelf resin mixing nozzles includes those marketed for epoxy mixing, such as under the 3M™, LOCTITE™, DEVCON™, and SKIA™ brands.

Referring to FIG. 1, system 100 further comprises first vessel 262, configured to dispense first part 253 of thermosetting resin 252 to external mixing structure 263. System 100 further comprises second vessel 272, configured to dispense second part 255 of thermosetting resin 252 to external mixing structure 263. The preceding subject matter of this paragraph characterizes example 28 of the present disclosure, wherein example 28 also includes the subject matter according to any one of examples 25-27, above.

Vessel 262 provides a volume of first part 253 of thermosetting resin 252, and vessel 272 provides a volume of second part 255 of thermosetting resin 252. Moreover, vessel 262 and vessel 272 may be replenished during manufacture of composite part 102 and optionally may be replenished with different first parts 253 and second parts 255, respectively, during manufacture of composite part 102, such as to create desired properties at different locations within composite part 102.

Additionally or alternatively, more than one vessel 262 and/or more than one vessel 272 may be provided, with individual vessels 262 and/or individual vessels 272, each holding different first parts 253 and/or different second parts 255, respectively, for selective delivery to second inlet 250 and third inlet 257, respectively.

Referring to FIG. 1, system 100 further comprises resin-metering system 256, configured to actively control a flow of first part 253 of thermosetting resin 252 to external mixing structure 263 and to actively control a flow of second part 255 of thermosetting resin 252 to external mixing structure 263, and thus to actively control a flow of thermosetting resin 252 to second inlet 250 of delivery guide 112. The preceding subject matter of this paragraph characterizes example 29 of the present disclosure, wherein example 29 also includes the subject matter according to example 28, above.

By actively controlling a flow of first part 253 and second part 255 to external mixing structure 263, a desired volume of thermosetting resin 252 may be delivered to delivery guide 112 and applied to non-resin component 108. Moreover, over supplying thermosetting resin 252 to delivery guide 112 may be avoided, for example, avoiding undesirable spillage or leakage of thermosetting resin 252 on component parts of system 100 and/or on composite part 102 being manufactured. Additionally or alternatively, it may be desirable for continuous flexible line 106 to have a greater volume of thermosetting resin 252 along a subset of its length and a lesser volume of thermosetting resin 252, or even no thermosetting resin 252, along a different subset of its length, such as to result in desired properties of composite part 102.

Referring generally to FIG. 1 and particularly to, e.g., FIG. 4, resin-metering system 256 comprises at least one sensor 254, configured to detect a level of thermosetting resin 252 in delivery guide 112. The preceding subject matter of this paragraph characterizes example 30 of the present disclosure, wherein example 30 also includes the subject matter according to example 29, above.

One or more sensors 254 provide data for resin-metering system 256 to base its active control of the flow of first part 253 and second part 255 of thermosetting resin 252.

Any suitable sensors 254 may be provided, including sensors 254 that are configured to detect the presence of first part 253 and/or second part 255. Sensors 254 may be optical, capacitive, and/or ultrasonic, as examples.

Referring generally to FIG. 1 and particularly to, e.g., FIG. 4, at least one sensor 254 comprises high-level sensor 101, configured to detect when the level of thermosetting resin 252 is at or above an upper threshold level in delivery guide 112. Resin-metering system 256 is configured to reduce the flow of first part 253 and second part 255 of the thermosetting resin 252 responsive to thermosetting resin 252 being at or above the upper threshold level in delivery guide 112. The preceding subject matter of this paragraph characterizes example 31 of the present disclosure, wherein example 31 also includes the subject matter according to example 30, above.

By including high-level sensor 101, resin-metering system 256 may actively control the flow of thermosetting resin 252 to delivery guide 112 to avoid unwanted overflow of thermosetting resin 252 upstream of delivery guide 112, such as into feed mechanism 104, which may be undesirable.

Referring generally to FIG. 1 and particularly to, e.g., FIG. 4, at least one sensor 254 comprises low-level sensor 260, configured to detect when the level of thermosetting resin 252 is at or below a lower threshold level in delivery guide 112. Resin-metering system 256 is configured to increase the flow of first part 253 and second part 255 of thermosetting resin 252 responsive to thermosetting resin 252 being at or below the lower threshold level in delivery guide 112. The preceding subject matter of this paragraph characterizes example 32 of the present disclosure, wherein example 32 also includes the subject matter according to any one of examples 30 or 31, above.

By including low-level sensor 260, resin-metering system 256 may actively control the flow of thermosetting resin 252 to delivery guide 112 to ensure that sufficient thermosetting resin 252 is being applied to non-resin component 108. For example, if low-level sensor 260 detects none of thermosetting resin 252 or detects an insufficient level of thermosetting resin 252, then resin-metering system 256 may increase the flow of first part 253 and/or second part 255 to external mixing structure 263 and thus thermosetting resin 252 to delivery guide 112 and non-resin component 108.

Referring to FIG. 4, low-level sensor 260 is positioned upstream from second inlet 250. The preceding subject matter of this paragraph characterizes example 33 of the present disclosure, wherein example 33 also includes the subject matter according to example 32, above.

Positioning low-level sensor 260 upstream from second inlet 250 may facilitate the detection of a low level of thermosetting resin 252 prior to the level being unacceptably low, such that it results in less than sufficient saturation of non-resin component 108.

Referring generally to FIG. 1 and particularly to, e.g., FIG. 4, low-level sensor 260 is positioned downstream from second inlet 250. The preceding subject matter of this paragraph characterizes example 34 of the present disclosure, wherein example 34 also includes the subject matter according to example 32, above.

Positioning low-level sensor 260 downstream from second inlet 250 may facilitate detection of an unacceptably low level of thermosetting resin 252, so that resin-metering system 256 may take corrective action.

Referring generally to FIG. 1 and particularly to, e.g., FIG. 4, at least one sensor 254 comprises saturation sensor 276, positioned to detect a level of saturation of non-resin component 108 with thermosetting resin 252 prior to exiting delivery guide 112. The preceding subject matter of this paragraph characterizes example 35 of the present disclosure, wherein example 35 also includes the subject matter according to any one of examples 30-34, above.

By including saturation sensor 276 in a position to detect a level of saturation of non-resin component 108 prior to continuous flexible line 106 exiting delivery guide 112, resin-metering system 256 may be used to ensure that continuous flexible line 106 is always at a desired, or above a minimum threshold level of, saturation.

Referring to FIG. 1, resin-metering system 256 further comprises first pump 265, configured to selectively increase and decrease the flow of first part 253 of thermosetting resin 252 responsive to input from at least one sensor 254. Resin-metering system 256 further comprises second pump 267, configured to selectively increase and decrease the flow of second part 255 of thermosetting resin 252 responsive to input from at least one sensor 254. The preceding subject matter of this paragraph characterizes example 36 of the present disclosure, wherein example 36 also includes the subject matter according to any one of examples 30-35, above.

Pump 265 and pump 267 provide for selective increase and/or decrease in the flow of first part 253 and second part 255 of thermosetting resin 252 based on input from one or more sensors 254.

Referring to FIG. 1, delivery guide 112 is configured to be selectively replaced. The preceding subject matter of this paragraph characterizes example 37 of the present disclosure, wherein example 37 also includes the subject matter according to any one of examples 1-36, above.

Accordingly, if and when thermosetting resin 252 cures or otherwise hardens within delivery guide 112, it may be replaced with a new delivery guide 112.

Referring generally to FIG. 1 and particularly to, e.g., FIGS. 6 and 7, non-resin component 108 of continuous flexible line 106 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 38 of the present disclosure, wherein example 38 also includes the subject matter according to any one of examples 1-37, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

Referring to FIG. 1, system 100 further comprises origin 126 of non-resin component 108. The preceding subject matter of this paragraph characterizes example 39 of the present disclosure, wherein example 39 also includes the subject matter according to any one of examples 1-38, above.

System 100, with origin 126, includes the material itself that defines non-resin component 108. When provided, origin 126 may provide one or more non-resin components 108, such as including a first non-resin component 108 with first desired properties and a second non-resin component 108 with second desired properties that are different from the first desired properties. For example, when more than one non-resin component 108 is provided, one or more may be selected for desired properties of composite part 102.

Referring to FIG. 1, origin 126 of non-resin component 108 comprises spool 128 of non-resin component 108. The preceding subject matter of this paragraph characterizes example 40 of the present disclosure, wherein example 40 also includes the subject matter according to example 39, above.

Origin 126 in the form of spool 128 may provide a significant length of non-resin component 108 in a compact volume that is readily replenished or replaced during a manufacturing operation. Other forms for origin 126 also are within the scope of the present disclosure and are not limited to spool 128.

Referring generally to FIG. 1 and particularly to, e.g., FIGS. 8-11, 14, 21, and 23-28, system 100 further comprises source 116 of curing energy 118. Source 116 is configured to deliver curing energy 118 at least to portion 124 of segment 120 of continuous flexible line 106 after segment 120 of continuous flexible line 106 exits delivery guide 112. The preceding subject matter of this paragraph characterizes example 41 of the present disclosure, wherein example 41 also includes the subject matter according to any one of examples 1-40, above.

Inclusion of source 116 provides a mechanism for thermosetting resin component 110 to be at least partially cured, and optionally fully cured, as continuous flexible line 106 is being deposited relative to surface 114 via delivery guide 112. That is, composite part 102 is at least partially cured, and in some examples fully cured, as it is being manufactured, or in situ.

As illustrative, non-exclusive examples, thermosetting resin 252, and thus thermosetting resin component 110 may be configured to be at least partially cured, or hardened, when curing energy 118 in the form of heat is delivered via radiation, convention, and/or conduction.

Referring generally to FIG. 1 and particularly to, e.g., FIGS. 8-11, 14, 21, and 23-28, source 116 of curing energy 118 is configured to deliver curing energy 118 at least to portion 124 of segment 120 of continuous flexible line 106 as feed mechanism 104 pushes continuous flexible line 106 out of delivery guide 112 toward print path 122 and after segment 120 of continuous flexible line 106 is deposited along print path 122. The preceding subject matter of this paragraph characterizes example 42 of the present disclosure, wherein example 42 also includes the subject matter according to example 41, above.

By delivering curing energy 118 to portion 124 of segment 120 of continuous flexible line 106 after segment 120 is deposited by delivery guide 112, thermosetting resin component 110 within portion 124 is at least further cured, so that portion 124 is effectively fixed in a desired place relative to the remainder of segment 120 having been already deposited by delivery guide 112. In other words, source 116 provides for in situ curing of composite part 102 as it is being manufactured by system 100.

Referring generally to FIG. 1 and particularly to, e.g., FIGS. 8-11, 14, 21, and 23-28, source 116 of curing energy 118 is configured to deliver a predetermined or actively determined amount of curing energy 118 at a controlled rate at least to portion 124 of segment 120 of continuous flexible line 106. The preceding subject matter of this paragraph characterizes example 43 of the present disclosure, wherein example 43 also includes the subject matter according to any one of examples 41 or 42, above.

As a result of delivering a predetermined or actively determined amount of curing energy 118 at a controlled rate, a desired level, or degree, of cure may be established with respect to portion 124 of segment 120 at any given time during manufacture of composite part 102. For example, it may be desirable to cure one portion 124 greater than or less than another portion 124 during manufacture of composite part 102. A predetermined amount of curing energy 118 may be based, e.g., on thermosetting resin 252 used for thermosetting resin component 110. An actively determined amount of curing energy 118 may be based, e.g., on real-time data sensed from continuous flexible line 106 as it is being deposited, including (but not limited to) hardness, color, temperature, glow, etc.

Referring generally to FIG. 1 and particularly to, e.g., FIGS. 21 and 23-28, source 116 of curing energy 118 comprises one or more curing lasers 134. The preceding subject matter of this paragraph characterizes example 44 of the present disclosure, wherein example 44 also includes the subject matter according to any one of examples 41-43, above.

Inclusion of one or more curing lasers 134 facilitates a concentrated and directed stream of curing energy 118, such that curing energy 118 may be selectively and precisely directed at portion 124 of segment 120 during manufacture of composite part 102.

Referring generally to FIG. 1 and particularly to, e.g., FIGS. 21 and 23-28, source 116 of curing energy 118 comprises one or more ultraviolet-light sources, infrared-light sources, or x-ray sources. The preceding subject matter of this paragraph characterizes example 45 of the present disclosure, wherein example 45 also includes the subject matter according to any one of examples 41-44, above.

Inclusion of one or more ultraviolet-light sources, infrared-light sources, or x-ray sources permits for use of thermosetting resins 252 for thermosetting resin component 110 that are configured to be cured via radiation from ultraviolet light, infrared light, or x-rays.

Referring generally to FIG. 1 and particularly to, e.g., FIGS. 21 and 23-28, source 116 of curing energy 118 comprises one or more visible light sources. The preceding subject matter of this paragraph characterizes example 46 of the present disclosure, wherein example 46 also includes the subject matter according to any one of examples 41-45, above.

Inclusion of one or more visible light sources permits for use of thermosetting resins 252 for thermosetting resin component 110 that are configured to be cured via radiation from visible light.

Referring to FIG. 1, source 116 of curing energy 118 comprises heat source 136. The preceding subject matter of this paragraph characterizes example 47 of the present disclosure, wherein example 47 also includes the subject matter according to any one of examples 41-46, above.

Inclusion of heat source 136 permits for use of thermosetting resins 252 for thermosetting resin component 110 that are configured to be cured via heat delivered by heat source 136.

Referring to FIG. 1, heat source 136 comprises convective heat source 247. The preceding subject matter of this paragraph characterizes example 48 of the present disclosure, wherein example 48 also includes the subject matter according to example 47, above.

Inclusion of convective heat source 247 permits for use of thermosetting resins 252 for thermosetting resin component 110 that are configured to be cured via heat delivered by convection.

Referring generally to FIG. 1, curing energy 118 comprises a hot gas stream. The preceding subject matter of this paragraph characterizes example 49 of the present disclosure, wherein example 49 also includes the subject matter according to example 48, above.

A hot gas stream may be an effective way to cure thermosetting resin component 110, depending on the specific configuration of thermosetting resin component 110. Moreover, production of a hot gas stream may be less expensive to implement than, for example, curing laser 134 as part of system 100.

Referring to FIG. 1, heat source 136 comprises radiative heat source 245. The preceding subject matter of this paragraph characterizes example 50 of the present disclosure, wherein example 50 also includes the subject matter according to any one of examples 47-49, above.

Inclusion of radiative heat source 245 permits for use of thermosetting resins 252 for thermosetting resin component 110 that are configured to be cured via heat delivered by radiation.

Referring generally to FIG. 1 and particularly to, e.g., FIG. 22, system 100 further comprises chamber 258. Delivery guide 112 and feed mechanism 104 are positioned within chamber 258. Delivery guide 112 is configured to deposit segment 120 of continuous flexible line 106 along print path 122 within chamber 258. Heat source 136 is configured to heat chamber 258. The preceding subject matter of this paragraph characterizes example 51 of the present disclosure, wherein example 51 also includes the subject matter according to any one of examples 47-50, above.

Providing chamber 258, within which continuous flexible line 106 is deposited via delivery guide 112, and heating chamber 258 to cure thermosetting resin component 110 may provide an efficient way to cure thermosetting resin component 110 via heat without expensive and complicated mechanisms that require concentrated and directed heat at segment 120.

Referring generally to FIG. 1 and particularly to, e.g., FIG. 22, chamber 258 is one of positively pressurized or negatively pressurized relative to atmospheric pressure. The preceding subject matter of this paragraph characterizes example 52 of the present disclosure, wherein example 52 also includes the subject matter according to example 51, above.

Depending on the configuration of composite part 102 being manufactured, it may be desirable to increase and/or decrease the pressure within chamber 258 during curing to obtain desirable properties of composite part 102.

Chamber 258 may be described as, or as comprising or as being comprised by, an autoclave.

Referring generally to FIG. 1 and particularly to, e.g., FIGS. 12-16, 23, and 25, heat source 136 comprises conductive heat source 249. The preceding subject matter of this paragraph characterizes example 53 of the present disclosure, wherein example 53 also includes the subject matter according to any one of examples 47-52, above.

Inclusion of conductive heat source 249 permits for use of thermosetting resins 252 for thermosetting resin component 110 that are configured to be cured via heat delivered by conduction, such as by conductive heat source 249 being placed in direct contact with portion 124 of segment 120 of continuous flexible line 106 after segment 120 of continuous flexible line 106 exits delivery guide 112.

Referring generally to FIG. 1 and particularly to, e.g., FIGS. 12-16, 23, and 25, conductive heat source 249 comprises resistive heater 251. The preceding subject matter of this paragraph characterizes example 54 of the present disclosure, wherein example 54 also includes the subject matter according to example 53, above.

Inclusion of resistive heater 251 may be an efficient and inexpensive option for generating heat for curing thermosetting resin component 110 during manufacture of composite part 102 by system 100.

Referring generally to FIG. 1 and particularly to, e.g., FIGS. 14-16, 23, and 25, system 100 further comprises compactor 138, operatively coupled to delivery guide 112. Compactor 138 is configured to impart a compaction force at least to section 180 of segment 120 of continuous flexible line 106 after segment 120 of continuous flexible line 106 exits delivery guide 112. Compactor 138 comprises conductive heat source 249. The preceding subject matter of this paragraph characterizes example 55 of the present disclosure, wherein example 55 also includes the subject matter according to any one of examples 53 or 54, above.

Compactor 138 compacts adjacent layers of continuous flexible line 106 that have been deposited by delivery guide 112 along print path 122. Moreover, compactor 138 is in direct contact with segment 120 to impart the compaction force thereto, and therefore may deliver heat via conduction directly to segment 120.

Referring generally to FIG. 1 and particularly to, e.g., FIGS. 12-14, 23, and 25, compactor 138 comprises compaction roller 182, having compaction-roller surface 184 that is configured to roll over at least section 180 of segment 120 of continuous flexible line 106 after segment 120 of continuous flexible line 106 exits delivery guide 112. Compaction-roller surface 184 is heated by conductive heat source 249. The preceding subject matter of this paragraph characterizes example 56 of the present disclosure, wherein example 56 also includes the subject matter according to example 55, above.

Compaction roller 182, compared to alternative examples of compactor 138, may reduce the axial movement of thermosetting resin component 110 along segment 120 during compaction. Additionally, compared to alternative examples of compactor 138, compaction roller 182 may provide a more desirable normal, or perpendicular, component of the compaction force.

Referring generally to FIG. 1 and particularly to, e.g., FIG. 12, compaction-roller surface 184 is textured. The preceding subject matter of this paragraph characterizes example 57 of the present disclosure, wherein example 57 also includes the subject matter according to example 56, above.

When compaction-roller surface 184 is textured, compaction-roller surface 184 imparts a texture to segment 120 or abrades segment 120, providing it with an increased surface area for better adhesion of a subsequent layer of continuous flexible line 106 deposited against it.

Referring generally to FIG. 1 and particularly to, e.g., FIG. 13, compaction-roller surface 184 is shaped to impart a predetermined cross-sectional shape at least to section 180 of segment 120 of continuous flexible line 106 after segment 120 of continuous flexible line 106 exits delivery guide 112. The preceding subject matter of this paragraph characterizes example 58 of the present disclosure, wherein example 58 also includes the subject matter according to any one of examples 56 or 57, above.

It may be desirable, in some applications, to impart a predetermined cross-sectional shape to continuous flexible line 106 as it is being deposited by delivery guide 112.

Referring generally to FIG. 1 and particularly to, e.g., FIG. 15, compactor 138 comprises compaction wiper 185, having wiper drag surface 186 that is configured to drag against at least section 180 of segment 120 of continuous flexible line 106 after segment 120 of continuous flexible line 106 exits delivery guide 112. Wiper drag surface 186 is heated by conductive heat source 249. The preceding subject matter of this paragraph characterizes example 59 of the present disclosure, wherein example 59 also includes the subject matter according to example 55, above.

Compaction wiper 185, compared to alternative examples of compactor 138, may increase the axial movement of thermosetting resin component 110 along segment 120 during compaction.

Referring generally to FIG. 1, wiper drag surface 186 is textured. The preceding subject matter of this paragraph characterizes example 60 of the present disclosure, wherein example 60 also includes the subject matter according to example 59, above.

When drag surface 186 is textured, drag surface 186 imparts a texture to segment 120 or abrades segment 120, providing it with an increased surface area for better adhesion of a subsequent layer of continuous flexible line 106 deposited against it.

Referring generally to FIG. 1, wiper drag surface 186 is shaped to impart a predetermined cross-sectional shape to segment 120 of continuous flexible line 106 after segment 120 of continuous flexible line 106 exits delivery guide 112. The preceding subject matter of this paragraph characterizes example 61 of the present disclosure, wherein example 61 also includes the subject matter according to any one of examples 59 or 60, above.

As mentioned, it may be desirable, in some applications, to impart a predetermined cross-sectional shape to continuous flexible line 106 as it is being deposited by delivery guide 112.

Referring generally to FIG. 1 and particularly to, e.g., FIGS. 14, 23, and 25, compactor 138 is biased toward section 180 of segment 120 of continuous flexible line 106. The preceding subject matter of this paragraph characterizes example 62 of the present disclosure, wherein example 62 also includes the subject matter according to any one of examples 55-61, above.

By being biased toward section 180, compactor 138 imparts a desired compaction force against section 180.

Referring generally to FIG. 1 and particularly to, e.g., FIGS. 14, 23, and 25, compactor 138 is rotatable relative to delivery guide 112. The preceding subject matter of this paragraph characterizes example 63 of the present disclosure, wherein example 63 also includes the subject matter according to any one of examples 55-62, above.

By being rotatable relative to delivery guide 112, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 14, 23, and 25, compactor 138 is configured to trail delivery guide 112 when delivery guide 112 moves relative to surface 114. The preceding subject matter of this paragraph characterizes example 64 of the present disclosure, wherein example 64 also includes the subject matter according to any one of examples 55-63, above.

By trailing delivery guide 112, compactor 138 is selectively positioned to impart its compaction force against section 180 of segment 120 directly following section 180 exiting delivery guide 112.

Referring generally to FIG. 1 and particularly to, e.g., FIGS. 23 and 25, system 100 further comprises pivoting arm 152, coupled relative to delivery guide 112 such that pivoting arm 152 trails delivery guide 112 as delivery guide 112 moves relative to surface 114. Compactor 138 is coupled to pivoting arm 152. The preceding subject matter of this paragraph characterizes example 65 of the present disclosure, wherein example 65 also includes the subject matter according to any one of examples 55-64, above.

Pivoting arm 152 provides for selective pivoting of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 23 and 25, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 66 of the present disclosure, wherein example 66 also includes the subject matter according to example 65, above.

Pivoting-arm actuator 188 provides for selective pivoting of pivoting arm 152 and thus of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 23 and 25, pivoting-arm actuator 188 is configured to actively coordinate the rotational position of pivoting arm 152 with movement of delivery guide 112 relative to surface 114. The preceding subject matter of this paragraph characterizes example 67 of the present disclosure, wherein example 67 also includes the subject matter according to example 66, above.

Accordingly, compactor 138 may be selectively and actively positioned to impart its compaction force against section 180 of segment 120 as delivery guide 112 moves, including as it changes directions, relative to surface 114 and/or vice versa.

Referring to FIG. 16, compactor 138 comprises skirt 190, coupled to delivery guide 112. Skirt 190 comprises skirt drag surface 192 that is positioned to drag against at least section 180 of segment 120 of continuous flexible line 106 after segment 120 of continuous flexible line 106 exits delivery guide 112. Skirt drag surface 192 is heated by conductive heat source 249. The preceding subject matter of this paragraph characterizes example 68 of the present disclosure, wherein example 68 also includes the subject matter according to example 55, above.

Skirt 190 extends from delivery guide 112 and circumferentially around outlet 206. Accordingly, regardless of a direction of movement of delivery guide 112 relative to surface 114, and/or vice versa, skirt 190 is positioned to compact section 180 of segment 120 of continuous flexible line 106 as it is being deposited.

Referring generally to FIG. 1 and particularly to, e.g., FIG. 23, system 100 further comprises surface roughener 144, operatively coupled to delivery guide 112. Surface roughener 144 is configured to abrade at least section 194 of segment 120 of continuous flexible line 106 after segment 120 of continuous flexible line 106 exits delivery guide 112. Surface roughener 144 comprises conductive heat source 249. The preceding subject matter of this paragraph characterizes example 69 of the present disclosure, wherein example 69 also includes the subject matter according to any one of examples 53-68, above.

Surface roughener 144 abrades section 194, providing it with an increased surface area for better adhesion of a subsequent layer deposited against it. Moreover, surface roughener 144 is in direct contact with segment 120 to abrade section 194, and therefore may deliver heat via conduction directly to segment 120.

Referring generally to FIG. 1, surface roughener 144 comprises roughening roller 196 having roughening-roller surface 198 that is configured to rotationally abrade at least section 194 of segment 120 of continuous flexible line 106 after segment 120 of continuous flexible line 106 exits delivery guide 112. Roughening-roller surface 198 is heated by conductive heat source 249. The preceding subject matter of this paragraph characterizes example 70 of the present disclosure, wherein example 70 also includes the subject matter according to example 69, above.

Roughening roller 196, compared to alternative examples of surface roughener 144, may reduce the axial movement of thermosetting resin component 110 along segment 120 during abrasion thereof. Moreover, roughening roller surface 198, by being heated by conductive heat source 249 and rolling against segment 120 may provide for efficient heat transfer, and thus curing, of section 194.

Referring generally to FIG. 1, roughening-roller surface 198 is shaped to impart a predetermined cross-sectional shape to segment 120 of continuous flexible line 106 after segment 120 of continuous flexible line 106 exits delivery guide 112. The preceding subject matter of this paragraph characterizes example 71 of the present disclosure, wherein example 71 also includes the subject matter according to example 70, above.

It may be desirable, in some applications, to impart a predetermined cross-sectional shape to continuous flexible line 106 as it is being deposited by delivery guide 112.

Referring generally to FIG. 1 and particularly to, e.g., FIG. 23, surface roughener 144 comprises roughening drag surface 200 that is configured to translationally abrade at least section 194 of segment 120 of continuous flexible line 106 after segment 120 of continuous flexible line 106 exits delivery guide 112. Roughening drag surface 200 is heated by conductive heat source 249. The preceding subject matter of this paragraph characterizes example 72 of the present disclosure, wherein example 72 also includes the subject matter according to example 69, above.

Roughening drag surface 200, compared to alternative examples of surface roughener 144, may increase the axial movement of thermosetting resin component 110 along segment 120 during abrasion thereof. Moreover, drag surface 200, by being heated by conductive heat source 249 and dragging against segment 120 may provide for efficient heat transfer, and thus curing, of section 194.

Referring generally to FIG. 1 and particularly to, e.g., FIG. 23, surface roughener 144 is biased toward section 194 of segment 120 of continuous flexible line 106 after segment 120 of continuous flexible line 106 exits delivery guide 112. The preceding subject matter of this paragraph characterizes example 73 of the present disclosure, wherein example 73 also includes the subject matter according to any one of examples 69-72, above.

By being biased toward section 194, surface roughener 144 imparts a desired abrasion force against section 194.

Referring generally to FIG. 1 and particularly to, e.g., FIG. 23, surface roughener 144 is rotatable relative to delivery guide 112. The preceding subject matter of this paragraph characterizes example 74 of the present disclosure, wherein example 74 also includes the subject matter according to any one of examples 69-73, above.

By being rotatable relative to delivery guide 112, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, surface roughener 144 is configured to trail delivery guide 112 when delivery guide 112 moves relative to surface 114. The preceding subject matter of this paragraph characterizes example 75 of the present disclosure, wherein example 75 also includes the subject matter according to any one of examples 69-74, above.

By trailing delivery guide 112, surface roughener 144 is selectively positioned to abrade section 194 directly following segment 120 exiting delivery guide 112.

Referring generally to FIG. 1 and particularly to, e.g., FIG. 23, system 100 further comprises pivoting arm 152, configured such that pivoting arm 152 trails delivery guide 112 as delivery guide 112 moves relative to surface 114. Surface roughener 144 is coupled to pivoting arm 152. The preceding subject matter of this paragraph characterizes example 76 of the present disclosure, wherein example 76 also includes the subject matter according to any one of examples 69-75, above.

Pivoting arm 152 provides for selective pivoting of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 77 of the present disclosure, wherein example 77 also includes the subject matter according to example 76, above.

Pivoting-arm actuator 188 provides for selective pivoting of pivoting arm 152 and thus of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 78 of the present disclosure, wherein example 78 also includes the subject matter according to example 77, above.

Accordingly, surface roughener 144 may be selectively and actively positioned to abrade section 194 as delivery guide 112 moves, including as it changes directions, relative to surface 114 and/or vice versa.

Referring generally to FIG. 1 and particularly to, e.g., FIG. 23, system 100 further comprises compactor 138. Surface roughener 144 is positioned to abrade at least section 194 of segment 120 of continuous flexible line 106 following compaction of at least section 194 by compactor 138. The preceding subject matter of this paragraph characterizes example 79 of the present disclosure, wherein example 79 also includes the subject matter according to any one of examples 69-78, above.

System 100 according to example 79 includes both compactor 138 and surface roughener 144. By having surface roughener 144 positioned to abrade section 194 following compaction by compactor 138, the abrasion of section 194 is not hindered, or dulled, by a subsequent compaction thereof. Accordingly, abrasion of section 194 has an increased surface area for better adhesion of a subsequent layer deposited against it.

Referring generally to FIG. 1 and particularly to, e.g., FIG. 23, system 100 further comprises debris inlet 202, configured to collect debris resulting from abrading at least section 194 of segment 120 of continuous flexible line 106 with surface roughener 144. The preceding subject matter of this paragraph characterizes example 80 of the present disclosure, wherein example 80 also includes the subject matter according to any one of examples 69-79, above.

Collection by debris inlet 202 of debris that results from abrasion of section 194 by surface roughener 144, avoids unwanted, loose particles of thermosetting resin component 110 becoming trapped between adjacent deposited layers of continuous flexible line 106 that may otherwise result in unwanted properties of composite part 102.

Referring generally to FIG. 1 and particularly to, e.g., FIG. 23, system 100 further comprises vacuum source 203, selectively communicatively coupled with debris inlet 202. The preceding subject matter of this paragraph characterizes example 81 of the present disclosure, wherein example 81 also includes the subject matter according to example 80, above.

Vacuum source 203 draws air and debris from adjacent section 194 through debris inlet 202.

Referring generally to FIG. 1 and particularly to, e.g., FIG. 23, system 100 further comprises pivoting arm 152, coupled relative to delivery guide 112 such that pivoting arm 152 trails delivery guide 112 as delivery guide 112 moves relative to surface 114. Debris inlet 202 is operatively coupled to pivoting arm 152. The preceding subject matter of this paragraph characterizes example 82 of the present disclosure, wherein example 82 also includes the subject matter according to any one of examples 80 or 81, above.

By being coupled to pivoting arm 152, debris inlet 202 is selectively positioned to collect debris directly from adjacent section 194 as delivery guide 112 moves relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 83 of the present disclosure, wherein example 83 also includes the subject matter according to example 82, above.

Pivoting-arm actuator 188, by actively controlling a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 84 of the present disclosure, wherein example 84 also includes the subject matter according to example 83, above.

Pivoting-arm actuator 188, by actively coordinating a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIG. 1 and particularly to, e.g., FIG. 23, system 100 further comprises pressurized-gas outlet 204, configured to disperse debris, resulting from roughening of segment 120 of continuous flexible line 106 by surface roughener 144, with a pressurized gas. The preceding subject matter of this paragraph characterizes example 85 of the present disclosure, wherein example 85 also includes the subject matter according to any one of examples 69-84, above.

Dispersal by pressurized-gas outlet 204 of debris that results from abrasion of section 194 by surface roughener 144, avoids unwanted, loose particles of thermosetting resin component 110 becoming trapped between adjacent deposited layers of continuous flexible line 106 that may otherwise result in unwanted properties of composite part 102.

Referring generally to FIG. 1 and particularly to, e.g., FIG. 23, system 100 further comprises pressurized-gas source 205, selectively communicatively coupled with pressurized-gas outlet 204. The preceding subject matter of this paragraph characterizes example 86 of the present disclosure, wherein example 86 also includes the subject matter according to example 85, above.

Pressurized-gas source 205 provides a source of the pressurized gas to be delivered to section 194 via pressurized-gas outlet 204.

Referring generally to FIG. 1 and particularly to, e.g., FIG. 23, system 100 further comprises pivoting arm 152, configured such that pivoting arm 152 trails delivery guide 112 as delivery guide 112 moves relative to surface 114. Pressurized-gas outlet 204 is operatively coupled to pivoting arm 152. The preceding subject matter of this paragraph characterizes example 87 of the present disclosure, wherein example 87 also includes the subject matter according to any one of examples 85 or 86, above.

By being coupled to pivoting arm 152, pressurized-gas outlet 204 is selectively positioned to disperse debris directly from adjacent section 194 as delivery guide 112 moves relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 88 of the present disclosure, wherein example 88 also includes the subject matter according to example 87, above.

Pivoting-arm actuator 188, by actively controlling a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 89 of the present disclosure, wherein example 89 also includes the subject matter according to example 88, above.

Pivoting-arm actuator 188, by actively coordinating a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIG. 1 and particularly to, e.g., FIGS. 23-25, system 100 further comprises pivoting arm 152, coupled relative to delivery guide 112 such that pivoting arm 152 trails delivery guide 112 as delivery guide 112 moves relative to surface 114. Source 116 of curing energy 118 is coupled to pivoting arm 152. The preceding subject matter of this paragraph characterizes example 90 of the present disclosure, wherein example 90 also includes the subject matter according to any one of examples 41-54, above.

Pivoting arm 152 provides for selective pivoting of source 116 relative to delivery guide 112. Accordingly, source 116 may be selectively positioned to deliver curing energy 118 to portion 124 of segment 120 as delivery guide 112 moves, including as it changes directions, relative to surface 114 and/or vice versa.

Referring generally to FIG. 1 and particularly to, e.g., FIGS. 23-25, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 91 of the present disclosure, wherein example 91 also includes the subject matter according to example 90, above.

Pivoting-arm actuator 188 provides for selective pivoting of pivoting arm 152 and thus of source 116 relative to delivery guide 112. Accordingly, source 116 may be selectively positioned to deliver curing energy 118 to portion 124 of segment 120 as delivery guide 112 moves, including as it changes directions, relative to surface 114 and/or vice versa.

Referring generally to FIG. 1 and particularly to, e.g., FIGS. 23-25, pivoting-arm actuator 188 is configured to actively coordinate the rotational position of pivoting arm 152 with movement of delivery guide 112 relative to surface 114. The preceding subject matter of this paragraph characterizes example 92 of the present disclosure, wherein example 92 also includes the subject matter according to example 91, above.

Accordingly, source 116 may be selectively and actively positioned to deliver curing energy 118 to portion 124 of segment 120 as delivery guide 112 moves, including as it changes directions, relative to surface 114 and/or vice versa.

Referring generally to FIG. 1 and particularly to, e.g., FIGS. 14 and 23-28, source 116 of curing energy 118 is configured to trail delivery guide 112 when delivery guide 112 moves relative to surface 114. The preceding subject matter of this paragraph characterizes example 93 of the present disclosure, wherein example 93 also includes the subject matter according to any one of examples 41-92, above.

By trailing delivery guide 112, source 116 is selectively positioned to deliver curing energy 118 to portion 124 of segment 120 directly following portion 124 exiting delivery guide 112.

Referring generally to FIG. 1 and particularly to, e.g., FIGS. 10, 11, and 21, source 116 of curing energy 118 is configured to deliver ring 148 of curing energy 118 intersecting segment 120 of continuous flexible line 106. The preceding subject matter of this paragraph characterizes example 94 of the present disclosure, wherein example 94 also includes the subject matter according to any one of examples 41-54, above.

When ring 148 of curing energy 118 intersects segment 120, ring 148 ensures that curing energy 118 is delivered to portion 124 regardless of a direction that segment 120 is exiting delivery guide 112 as delivery guide 112 moves relative to surface 114 and/or vice versa.

Ring 148 of curing energy 118 may be defined by any suitable process and/or structure. For example, with reference to FIG. 10, and as discussed herein, delivery guide 112 may comprise curing-energy passage 146, and source 116 of curing energy 118 may be configured to deliver curing energy 118 through curing-energy passage 146 such that curing energy 118 defines ring 148. Additionally or alternatively, with reference to FIG. 21, as also discussed herein, energy source 116 may comprise at least one galvanometer mirror-positioning system 150 or other type of mirror-positioning system that is configured to deliver ring 148 of curing energy 118 to portion 124 of segment 120.

Referring generally to FIG. 1 and particularly to, e.g., FIGS. 9-11, delivery guide 112 further comprises curing-energy passage 146 and line passage 154, through which continuous flexible line 106 is delivered to print path 122. Source 116 of curing energy 118 is configured to deliver curing energy 118 through curing-energy passage 146 at least to portion 124 of segment 120 of continuous flexible line 106. Curing-energy passage 146 is optically isolated from line passage 154. The preceding subject matter of this paragraph characterizes example 95 of the present disclosure, wherein example 95 also includes the subject matter according to any one of examples 41-54 or 94, above.

System 100 according to example 95 provides for precise direction of curing energy 118 to portion 124 as continuous flexible line 106 is exiting delivery guide 112. Moreover, by being optically isolated from line passage 154, curing-energy passage 146 restricts curing energy 118, when in the form of light, from contacting continuous flexible line 106 before continuous flexible line 106 exits delivery guide 112. Moreover, in examples that include resin passage 264, curing-energy passage 146 is optically isolated from resin passage 264.

According to example 95 (referring, e.g., to FIG. 10), curing-energy passage 146 may encircle line passage 154 and may have a circular outlet around outlet 206 of line passage 154, such that the exit of curing energy 118 from curing-energy passage 146 results in ring 148 of curing energy 118, such as according to example 94 herein.

Referring generally to FIG. 1 and particularly to, e.g., FIG. 21, source 116 of curing energy 118 is not configured to move with delivery guide 112. The preceding subject matter of this paragraph characterizes example 96 of the present disclosure, wherein example 96 also includes the subject matter according to any one of examples 41-54, above.

Such an example of system 100 may provide for a less cumbersome assembly associated with delivery guide 112, permitting delivery guide 112 to more easily make micro-movements and turns, or angle changes, relative to surface 114 and/or vice versa, such as based on the configuration of composite part 102, and desired properties thereof, being manufactured.

FIG. 21 provides an example of system 100, with energy source 116 comprising two galvanometer mirror-positioning systems 150 that are static relative to delivery guide 112 as delivery guide 112 moves relative to surface 114, but with galvanometer mirror-positioning systems 150 configured to deliver curing energy 118 to portion 124 of segment 120 of continuous flexible line 106 as it exits delivery guide 112. While described herein as galvanometer mirror-positioning systems 150, other systems and devices for directing curing energy 118 to portion 124 may be used and are within the scope of the present disclosure, such as (but not limited to) a solid-state piezoelectric mirror-positioning system.

Referring generally to FIG. 1 and particularly to, e.g., FIG. 21, source 116 of curing energy 118 comprises at least one galvanometer mirror-positioning system 150, configured to deliver curing energy 118 at least to portion 124 of segment 120 of continuous flexible line 106 responsive to movement of delivery guide 112 relative to surface 114. The preceding subject matter of this paragraph characterizes example 97 of the present disclosure, wherein example 97 also includes the subject matter according to any one of examples 41-46, above.

In other words, one or more galvanometer mirror-positioning systems 150 may actively direct curing energy 118 at portion 124 of segment 120 as continuous flexible line 106 exits delivery guide 112.

Referring generally to FIG. 1 and particularly to, e.g., FIG. 8, source 116 of curing energy 118 is configured to partially cure first layer 140 of segment 120 of continuous flexible line 106 as at least a portion of first layer 140 is being deposited by delivery guide 112 against surface 114 and to further cure first layer 140 and to partially cure second layer 142 as second layer 142 is being deposited by delivery guide 112 against first layer 140. The preceding subject matter of this paragraph characterizes example 98 of the present disclosure, wherein example 98 also includes the subject matter according to any one of examples 41-97, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

By further curing first layer 140, it is meant that first layer 140 may be fully cured or less than fully cured. For example, in some applications, a less than full cure of composite part 102 may be desirable during manufacture by system 100 to permit for subsequent work on composite part 102 before an entirety of composite part 102 is fully cured, such as with a process separate from system 100. For example, composite part 102 may be baked, heated, and/or placed in an autoclave for final curing.

Referring generally to FIG. 1 and particularly to, e.g., FIGS. 12-16, 23, and 25, system 100 further comprises compactor 138, operatively coupled to delivery guide 112. Compactor 138 is configured to impart a compaction force at least to section 180 of segment 120 of continuous flexible line 106 after segment 120 of continuous flexible line 106 exits delivery guide 112. The preceding subject matter of this paragraph characterizes example 99 of the present disclosure, wherein example 99 also includes the subject matter according to any one of examples 1-54 or 69-98, above.

Compactor 138 compacts adjacent layers of continuous flexible line 106 that have been deposited by delivery guide 112 along print path 122.

Referring generally to FIG. 1 and particularly to, e.g., FIGS. 12-14, 23, and 25, compactor 138 comprises compaction roller 182, having compaction-roller surface 184 that is configured to roll over at least section 180 of segment 120 of continuous flexible line 106 after segment 120 of continuous flexible line 106 exits delivery guide 112. The preceding subject matter of this paragraph characterizes example 100 of the present disclosure, wherein example 100 also includes the subject matter according to example 99, above.

Compaction roller 182, compared to alternative examples of compactor 138, may reduce the axial movement of thermosetting resin component 110 along segment 120 during compaction. Additionally, compared to alternative examples of compactor 138, compaction roller 182 may provide a more desirable normal, or perpendicular, component of the compaction force.

Referring generally to FIG. 1 and particularly to, e.g., FIG. 12, compaction-roller surface 184 is textured. The preceding subject matter of this paragraph characterizes example 101 of the present disclosure, wherein example 101 also includes the subject matter according to example 100, above.

When compaction-roller surface 184 is textured, compaction-roller surface 184 imparts a texture to segment 120 or abrades segment 120, providing it with an increased surface area for better adhesion of a subsequent layer of continuous flexible line 106 deposited against it.

Referring generally to FIG. 1 and particularly to, e.g., FIG. 13, compaction-roller surface 184 is shaped to impart a predetermined cross-sectional shape at least to section 180 of segment 120 of continuous flexible line 106 after segment 120 of continuous flexible line 106 exits delivery guide 112. The preceding subject matter of this paragraph characterizes example 102 of the present disclosure, wherein example 102 also includes the subject matter according to any one of examples 100 or 101, above.

It may be desirable, in some applications, to impart a predetermined cross-sectional shape to continuous flexible line 106 as it is being deposited by delivery guide 112.

Referring generally to FIG. 1 and particularly to, e.g., FIG. 15, compactor 138 comprises compaction wiper 185, having wiper drag surface 186 that is configured to drag against at least section 180 of segment 120 of continuous flexible line 106 after segment 120 of continuous flexible line 106 exits delivery guide 112. The preceding subject matter of this paragraph characterizes example 103 of the present disclosure, wherein example 103 also includes the subject matter according to example 99, above.

Compaction wiper 185, compared to alternative examples of compactor 138, may increase the axial movement of thermosetting resin component 110 along segment 120 during compaction.

Referring generally to FIG. 1, wiper drag surface 186 is textured. The preceding subject matter of this paragraph characterizes example 104 of the present disclosure, wherein example 104 also includes the subject matter according to example 103, above.

When drag surface 186 is textured, drag surface 186 imparts a texture to segment 120 or abrades segment 120, providing it with an increased surface area for better adhesion of a subsequent layer of continuous flexible line 106 deposited against it.

Referring generally to FIG. 1, wiper drag surface 186 is shaped to impart a predetermined cross-sectional shape to segment 120 of continuous flexible line 106 after segment 120 of continuous flexible line 106 exits delivery guide 112. The preceding subject matter of this paragraph characterizes example 105 of the present disclosure, wherein example 105 also includes the subject matter according to any one of examples 103 or 104, above.

As mentioned, it may be desirable, in some applications, to impart a predetermined cross-sectional shape to continuous flexible line 106 as it is being deposited by delivery guide 112.

Referring generally to FIG. 1 and particularly to, e.g., FIGS. 14, 23, and 25, compactor 138 is biased toward section 180 of segment 120 of continuous flexible line 106. The preceding subject matter of this paragraph characterizes example 106 of the present disclosure, wherein example 106 also includes the subject matter according to any one of examples 99-105, above.

By being biased toward section 180, compactor 138 imparts a desired compaction force against section 180.

Compactor 138 may be biased toward section 180, such as by spring 181 (as illustrated in FIG. 1) or another biasing member.

Referring generally to FIG. 1 and particularly to, e.g., FIGS. 14, 23, and 25, compactor 138 is rotatable relative to delivery guide 112. The preceding subject matter of this paragraph characterizes example 107 of the present disclosure, wherein example 107 also includes the subject matter according to any one of examples 99-106, above.

By being rotatable relative to delivery guide 112, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 12, 23, and 25, compactor 138 is configured to trail delivery guide 112 when delivery guide 112 moves relative to surface 114. The preceding subject matter of this paragraph characterizes example 108 of the present disclosure, wherein example 108 also includes the subject matter according to any one of examples 99-107, above.

By trailing delivery guide 112, compactor 138 is selectively positioned to impart its compaction force against section 180 of segment 120 directly following section 180 exiting delivery guide 112.

Referring generally to FIG. 1 and particularly to, e.g., FIGS. 23 and 25, system 100 further comprises pivoting arm 152, coupled relative to delivery guide 112 such that pivoting arm 152 trails delivery guide 112 as delivery guide 112 moves relative to surface 114. Compactor 138 is coupled to pivoting arm 152. The preceding subject matter of this paragraph characterizes example 109 of the present disclosure, wherein example 109 also includes the subject matter according to any one of examples 99-108, above.

Pivoting arm 152 provides for selective pivoting of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 23 and 25, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 110 of the present disclosure, wherein example 110 also includes the subject matter according to example 109, above.

Pivoting-arm actuator 188 provides for selective pivoting of pivoting arm 152 and thus of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 23 and 25, pivoting-arm actuator 188 is configured to actively coordinate the rotational position of pivoting arm 152 with movement of delivery guide 112 relative to surface 114. The preceding subject matter of this paragraph characterizes example 111 of the present disclosure, wherein example 111 also includes the subject matter according to example 110, above.

Accordingly, compactor 138 may be selectively and actively positioned to impart its compaction force against section 180 of segment 120 as delivery guide 112 moves, including as it changes directions, relative to surface 114 and/or vice versa.

Referring generally to FIG. 1 and particularly to, e.g., FIG. 16, compactor 138 comprises skirt 190, coupled to delivery guide 112. Skirt 190 comprises skirt drag surface 192 that is positioned to drag against at least section 180 of segment 120 of continuous flexible line 106 after segment 120 of continuous flexible line 106 exits delivery guide 112. The preceding subject matter of this paragraph characterizes example 112 of the present disclosure, wherein example 112 also includes the subject matter according to example 99, above.

Skirt 190 extends from delivery guide 112 and circumferentially around outlet 206. Accordingly, regardless of a direction of movement of delivery guide 112 relative to surface 114, and/or vice versa, skirt 190 is positioned to compact section 180 of segment 120 of continuous flexible line 106 as it is being deposited.

Referring generally to FIG. 1 and particularly to, e.g., FIG. 23, system 100 further comprises surface roughener 144, operatively coupled to delivery guide 112. Surface roughener 144 is configured to abrade at least section 194 of segment 120 of continuous flexible line 106 after segment 120 of continuous flexible line 106 exits delivery guide 112. The preceding subject matter of this paragraph characterizes example 113 of the present disclosure, wherein example 113 also includes the subject matter according to any one of examples 1-68 or 90-112, above.

Surface roughener 144 abrades section 194, providing it with an increased surface area for better adhesion of a subsequent layer deposited against it.

Referring to FIG. 1, surface roughener 144 comprises roughening roller 196, having roughening-roller surface 198 that is configured to rotationally abrade at least section 194 of segment 120 of continuous flexible line 106 after segment 120 of continuous flexible line 106 exits delivery guide 112. The preceding subject matter of this paragraph characterizes example 114 of the present disclosure, wherein example 114 also includes the subject matter according to example 113, above.

Roughening roller 196, compared to alternative examples of surface roughener 144, may reduce the axial movement of thermosetting resin component 110 along segment 120 during abrasion thereof. Moreover, roughening roller surface 198, by being heated by conductive heat source 249 and rolling against segment 120 may provide for efficient heat transfer, and thus curing, of section 194.

Referring generally to FIG. 1, roughening-roller surface 198 is shaped to impart a predetermined cross-sectional shape to segment 120 of continuous flexible line 106 after segment 120 of continuous flexible line 106 exits delivery guide 112. The preceding subject matter of this paragraph characterizes example 115 of the present disclosure, wherein example 115 also includes the subject matter according to example 114, above.

It may be desirable, in some applications, to impart a predetermined cross-sectional shape to continuous flexible line 106 as it is being deposited by delivery guide 112.

Referring generally to FIG. 1 and particularly to, e.g., FIG. 23, surface roughener 144 comprises roughening drag surface 200 that is configured to translationally abrade at least section 194 of segment 120 of continuous flexible line 106 after segment 120 of continuous flexible line 106 exits delivery guide 112. The preceding subject matter of this paragraph characterizes example 116 of the present disclosure, wherein example 116 also includes the subject matter according to example 113, above.

Roughening drag surface 200, compared to alternative examples of surface roughener 144, may increase the axial movement of thermosetting resin component 110 along segment 120 during abrasion thereof.

Referring generally to FIG. 1 and particularly to, e.g., FIG. 23, surface roughener 144 is biased toward section 194 of segment 120 of continuous flexible line 106 after segment 120 of continuous flexible line 106 exits delivery guide 112. The preceding subject matter of this paragraph characterizes example 117 of the present disclosure, wherein example 117 also includes the subject matter according to any one of examples 113-116, above.

By being biased toward section 194, surface roughener 144 imparts a desired abrasion force against section 194.

Referring generally to FIG. 1 and particularly to, e.g., FIG. 23, surface roughener 144 is rotatable relative to delivery guide 112. The preceding subject matter of this paragraph characterizes example 118 of the present disclosure, wherein example 118 also includes the subject matter according to any one of examples 113-117, above.

By being rotatable relative to delivery guide 112, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, surface roughener 144 is configured to trail delivery guide 112 when delivery guide 112 moves relative to surface 114. The preceding subject matter of this paragraph characterizes example 119 of the present disclosure, wherein example 119 also includes the subject matter according to any one of examples 113-118, above.

By trailing delivery guide 112, surface roughener 144 is selectively positioned to abrade section 194 directly following segment 120 exiting delivery guide 112.

Referring generally to FIG. 1 and particularly to, e.g., FIG. 23, system 100 further comprises pivoting arm 152, configured such that pivoting arm 152 trails delivery guide 112 as delivery guide 112 moves relative to surface 114. Surface roughener 144 is coupled to pivoting arm 152. The preceding subject matter of this paragraph characterizes example 120 of the present disclosure, wherein example 120 also includes the subject matter according to any one of examples 113-119, above.

By trailing delivery guide 112, surface roughener 144 is selectively positioned to abrade section 194 directly following segment 120 exiting delivery guide 112.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 121 of the present disclosure, wherein example 121 also includes the subject matter according to example 120, above.

Pivoting-arm actuator 188 provides for selective pivoting of pivoting arm 152 and thus of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 122 of the present disclosure, wherein example 122 also includes the subject matter according to example 121, above.

Accordingly, surface roughener 144 may be selectively and actively positioned to abrade section 194 as delivery guide 112 moves, including as it changes directions, relative to surface 114 and/or vice versa.

Referring generally to FIG. 1 and particularly to, e.g., FIG. 23, system 100 further comprises compactor 138. Surface roughener 144 is positioned to abrade at least section 194 of segment 120 of continuous flexible line 106 following compaction of at least section 194 by compactor 138. The preceding subject matter of this paragraph characterizes example 123 of the present disclosure, wherein example 123 also includes the subject matter according to any one of examples 113-122, above.

System 100 according to example 123 includes both compactor 138 and surface roughener 144. By having surface roughener 144 positioned to abrade section 194 following compaction by compactor 138, the abrasion of section 194 is not hindered, or dulled, by a subsequent compaction thereof. Accordingly, abrasion of section 194 has an increased surface area for better adhesion of a subsequent layer deposited against it.

Referring generally to FIG. 1 and particularly to, e.g., FIG. 23, system 100 further comprises debris inlet 202, configured to collect debris resulting from abrading at least section 194 of segment 120 of continuous flexible line 106 with surface roughener 144. The preceding subject matter of this paragraph characterizes example 124 of the present disclosure, wherein example 124 also includes the subject matter according to any one of examples 113-123, above.

Collection by debris inlet 202 of debris that results from abrasion of section 194 by surface roughener 144, avoids unwanted, loose particles of thermosetting resin component 110 becoming trapped between adjacent deposited layers of continuous flexible line 106 that may otherwise result in unwanted properties of composite part 102.

Referring generally to FIG. 1 and particularly to, e.g., FIG. 23, system 100 further comprises vacuum source 203, selectively communicatively coupled with debris inlet 202. The preceding subject matter of this paragraph characterizes example 125 of the present disclosure, wherein example 125 also includes the subject matter according to example 124, above.

Vacuum source 203 draws air and debris from adjacent section 194 through debris inlet 202.

Referring generally to FIG. 1 and particularly to, e.g., FIG. 23, system 100 further comprises pivoting arm 152, coupled relative to delivery guide 112 such that pivoting arm 152 trails delivery guide 112 as delivery guide 112 moves relative to surface 114. Debris inlet 202 is operatively coupled to pivoting arm 152. The preceding subject matter of this paragraph characterizes example 126 of the present disclosure, wherein example 126 also includes the subject matter according to any one of examples 124 or 125, above.

By being coupled to pivoting arm 152, debris inlet 202 is selectively positioned to collect debris directly from adjacent section 194 as delivery guide 112 moves relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 127 of the present disclosure, wherein example 127 also includes the subject matter according to example 126, above.

Pivoting-arm actuator 188, by actively controlling a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 128 of the present disclosure, wherein example 128 also includes the subject matter according to example 127, above.

Pivoting-arm actuator 188, by actively coordinating a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIG. 1 and particularly to, e.g., FIG. 23, system 100 further comprises pressurized-gas outlet 204, configured to disperse debris, resulting from roughening of segment 120 of continuous flexible line 106 by surface roughener 144, with a pressurized gas. The preceding subject matter of this paragraph characterizes example 129 of the present disclosure, wherein example 129 also includes the subject matter according to any one of examples 113-128, above.

Dispersal by pressurized-gas outlet 204 of debris that results from abrasion of section 194 by surface roughener 144, avoids unwanted, loose particles of thermosetting resin component 110 becoming trapped between adjacent deposited layers of continuous flexible line 106 that may otherwise result in unwanted properties of composite part 102.

Referring generally to FIG. 1 and particularly to, e.g., FIG. 23, system 100 further comprises pressurized-gas source 205, selectively communicatively coupled with pressurized-gas outlet 204. The preceding subject matter of this paragraph characterizes example 130 of the present disclosure, wherein example 130 also includes the subject matter according to example 129, above.

Pressurized-gas source 205 provides a source of the pressurized gas to be delivered to section 194 via pressurized-gas outlet 204.

Referring generally to FIG. 1 and particularly to, e.g., FIG. 23, system 100 further comprises pivoting arm 152, configured such that pivoting arm 152 trails delivery guide 112 as delivery guide 112 moves relative to surface 114. Pressurized-gas outlet 204 is operatively coupled to pivoting arm 152. The preceding subject matter of this paragraph characterizes example 131 of the present disclosure, wherein example 131 also includes the subject matter according to any one of examples 129 or 130, above.

By being coupled to pivoting arm 152, pressurized-gas outlet 204 is selectively positioned to disperse debris directly from adjacent section 194 as delivery guide 112 moves relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 132 of the present disclosure, wherein example 132 also includes the subject matter according to example 131, above.

Pivoting-arm actuator 188, by actively controlling a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 133 of the present disclosure, wherein example 133 also includes the subject matter according to example 132, above.

Pivoting-arm actuator 188, by actively coordinating a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIG. 1 and particularly to, e.g., FIGS. 4, 5, and 23-31, feed mechanism 104 is coupled to delivery guide 112. The preceding subject matter of this paragraph characterizes example 134 of the present disclosure, wherein example 134 also includes the subject matter according to any one of examples 1-133, above.

Having feed mechanism 104 coupled to delivery guide 112 facilitates feed mechanism 104 being able to operatively push continuous flexible line 106 through delivery guide 112.

Referring generally to FIG. 1 and particularly to, e.g., FIGS. 4, 5, and 23-31, delivery guide 112 extends from feed mechanism 104. The preceding subject matter of this paragraph characterizes example 135 of the present disclosure, wherein example 135 also includes the subject matter according to any one of examples 1-134, above.

By extending from feed mechanism 104, delivery guide 112 may be positioned for selective deposition of continuous flexible line 106 in a desired location along print path 122.

Referring generally to FIG. 1 and particularly to, e.g., FIGS. 4 and 5, delivery guide 112 further comprises outlet 206 and line passage 154, extending from first inlet 170 to outlet 206. Outlet 206 is configured to provide an exit for continuous flexible line 106 from delivery guide 112. Feed mechanism 104 comprises support frame 156 and opposing rollers 157, having respective rotational axes 159. Opposing rollers 157 are rotatably coupled to support frame 156. Opposing rollers 157 are configured to engage opposite sides of non-resin component 108. Opposing rollers 157 are configured to selectively rotate to push non-resin component 108 through line passage 154 and continuous flexible line 106 out of delivery guide 112. The preceding subject matter of this paragraph characterizes example 136 of the present disclosure, wherein example 136 also includes the subject matter according to any one of examples 1-135, above.

Support frame 156 provides support for component parts of feed mechanism 104, including opposing rollers 157. Opposing rollers 157, when selectively rotated, act to frictionally engage non-resin component 108, thereby feeding it between opposing rollers 157 and pushing it into inlet 170 and through line passage 154.

Referring generally to FIGS. 4 and 5 and particularly to, e.g., FIG. 29-31, opposing rollers 157 are in contact with each other. The preceding subject matter of this paragraph characterizes example 137 of the present disclosure, wherein example 137 also includes the subject matter according to example 136, above.

Contact between opposing rollers 157 may ensure that opposing rollers 157 roll together and avoid imparting an uneven torque that would bend or otherwise create an internal curved bias to non-resin component 108 as it is drawn between the rollers. Additionally or alternatively, contact between opposing rollers 157 may permit for only one of opposing rollers 157 to be directly driven by a motor, while the other of opposing rollers 157 simply rotates as a result of being engaged with the driven roller.

Referring generally to FIGS. 4 and 5 and particularly to, e.g., FIGS. 30 and 31, each of opposing rollers 157 comprises circumferential channel 161, configured to contact a portion of non-resin component 108. The preceding subject matter of this paragraph characterizes example 138 of the present disclosure, wherein example 138 also includes the subject matter according to any one of examples 136 or 137, above.

Inclusion of circumferential channel 161 in each of opposing rollers 157 thereby creates a passage through which non-resin component 108 may extend and provides for a greater surface area of contact between opposing rollers 157 and non-resin component 108, thereby facilitating non-resin component 108 being pushed into inlet 170 and through line passage 154.

Referring generally to FIGS. 4 and 5 and particularly to, e.g., FIGS. 30 and 31, one of opposing rollers 157 comprises circumferential channel 161, configured to contact non-resin component 108. The preceding subject matter of this paragraph characterizes example 139 of the present disclosure, wherein example 139 also includes the subject matter according to any one of examples 136 or 137, above.

As with example 138, inclusion of one circumferential channel 161 creates a passage through which non-resin component 108 may extend and provides for a greater surface area of contact between opposing rollers 157 and non-resin component 108, thereby facilitating non-resin component 108 being pushed into inlet 170 and through line passage 154.

Referring generally to FIG. 1 and particularly to, e.g., FIGS. 29 and 30, opposing rollers 157 are differently sized. The preceding subject matter of this paragraph characterizes example 140 of the present disclosure, wherein example 140 also includes the subject matter according to any one of examples 136-139, above.

Differently sized opposing rollers 157 may permit for efficient packaging of feed mechanism 104. Additionally or alternatively, differently sized opposing rollers 157 may provide for a desired torque transfer between driven roller 158 and idle roller 160.

Referring generally to FIG. 1 and particularly to, e.g., FIGS. 4 and 5, opposing rollers 157 are identically sized. The preceding subject matter of this paragraph characterizes example 141 of the present disclosure, wherein example 141 also includes the subject matter according to any one of examples 136-139, above.

Identically sized opposing rollers 157 may permit for efficient packaging of feed mechanism 104. Additionally or alternatively, identically sized opposing rollers 157 may provide for a desired torque transfer between driven roller 158 and idle roller 160.

Referring generally to FIG. 1 and particularly to, e.g., FIGS. 4, 5, and 29-31, feed mechanism 104 further comprises motor 162, operatively coupled at least to one of opposing rollers 157 and configured to selectively rotate at least one of opposing rollers 157. The preceding subject matter of this paragraph characterizes example 142 of the present disclosure, wherein example 142 also includes the subject matter according to any one of examples 136-141, above.

Motor 162 provides a motive force for rotating opposing rollers 157 for feed mechanism 104 to push non-resin component 108 through delivery guide 112.

Referring generally to FIG. 1 and particularly to, e.g., FIGS. 4, 5, and 29-31, opposing rollers 157 comprise driven roller 158, operatively coupled to motor 162 and idle roller 160 biased toward driven roller 158 to operatively engage opposing sides of non-resin component 108. The preceding subject matter of this paragraph characterizes example 143 of the present disclosure, wherein example 143 also includes the subject matter according to example 142, above.

By having idle roller 160 biased toward driven roller 158, idle roller 160 need not be directly driven by a motor for feed mechanism 104 to push non-resin component 108 through delivery guide 112. Instead, idle roller 160 is rotated by idle roller 160 being engaged with driven roller 158 and/or by being engaged with non-resin component 108, which in turn is engaged with driven roller 158.

Idle roller 160 may be biased toward driven roller 158 by biasing member 164, which may be a spring, such as a coil spring.

Referring generally to FIG. 1 and particularly to, e.g., FIGS. 29-31, feed mechanism 104 further comprises rocker arm 169. Rocker arm 169 is pivotally coupled to support frame 156. Idle roller 160 is rotationally coupled to rocker arm 169. Rocker arm 169 is biased relative to support frame 156 so that idle roller 160 is biased toward driven roller 158. Rocker arm 169 is configured to selectively pivot idle roller 160 away from driven roller 158. The preceding subject matter of this paragraph characterizes example 144 of the present disclosure, wherein example 144 also includes the subject matter according to example 143, above.

Rocker arm 169 provides structure for a user to engage and pivot idle roller 160 away from driven roller 158 against the bias of biasing member 164. Accordingly, a user may selectively pivot idle roller 160 to facilitate initial insertion of non-resin component between opposing rollers 157, such as during initial set-up of system 100 and/or to change non-resin component 108 during manufacture of composite part 102.

As used herein, "to bias" means to continuously apply a force, which may or may not have a constant magnitude.

Referring generally to FIG. 1 and particularly to, e.g., FIGS. 29-31, feed mechanism 104 further comprises rocker-arm adjuster 171, configured to selectively adjust a force applied to rocker arm 169 to bias idle roller 160 toward driven roller 158. The preceding subject matter of this paragraph characterizes example 145 of the present disclosure, wherein example 145 also includes the subject matter according to example 144, above.

Rocker-arm adjuster 171 permits a user to selectively adjust the biasing force of idle roller 160 toward driven roller 158 and thus the force applied to non-resin component 108 between opposing rollers 157. For example, different magnitudes of force facilitate operation of system 100 in connection with different material properties of different configurations and/or different sizes of non-resin component 108 that may be used by system 100.

Referring generally to FIG. 1 and particularly to, e.g., FIGS. 4, 5, 29, and 30, delivery guide 112 further comprises first end portion 163, second end portion 165, and junction 167 between first end portion 163 and second end portion 165. First end portion 163 is shaped to be complementary to one of opposing rollers 157 and second end portion 165 is shaped to be complementary to another of opposing rollers 157. The preceding subject matter of this paragraph characterizes example 146 of the present disclosure, wherein example 146 also includes the subject matter according to any one of examples 136-145, above.

Having first end portion 163 and second end portion 165 complementary with opposing rollers 157, delivery guide 112 may be positioned in very close proximity to opposing rollers 157. Accordingly, when feed mechanism 104 pushes non-resin component 108 into and through delivery guide 112, non-resin component 108 is less likely to bunch, kink, clog, or otherwise mis-feed from feed mechanism 104 to delivery guide 112.

Referring to FIGS. 4 and 5, shortest distance D between junction 167 and plane 173, containing respective rotational axes 159 of opposing rollers 157, is less than a radius of a smallest one of opposing rollers 157. The preceding subject matter of this paragraph characterizes example 147 of the present disclosure, wherein example 147 also includes the subject matter according to example 146, above.

Again, having delivery guide 112 in close proximity to opposing rollers 157, such as with junction 167 within distance D of plane 173, non-resin component 108 operatively may be pushed into and through delivery guide 112.

Referring generally to FIG. 1 and particularly to, e.g., FIGS. 4, 5, 29, and 30, junction 167 comprises an edge. The preceding subject matter of this paragraph characterizes example 148 of the present disclosure, wherein example 148 also includes the subject matter according to any one of examples 146 or 147, above.

When junction 167 comprises an edge, the edge may be positioned in very close proximity to the interface between opposing rollers 157 and the interface between opposing rollers 157 and non-resin component 108.

In some examples, the edge may be linear. In some examples, the edge may be a sharp edge. In some examples, the edge may be a rounded edge.

Referring generally to FIG. 1 and particularly to, e.g., FIGS. 17-20, 23, 32, and 33, delivery guide 112 further comprises outlet 206 and line passage 154, extending from first inlet 170 to outlet 206. Outlet 206 is configured to provide an exit for continuous flexible line 106 from delivery guide 112. System 100 further comprises cutter 208, configured to selectively cut continuous flexible line 106 adjacent to outlet 206. The preceding subject matter of this paragraph characterizes example 149 of the present disclosure, wherein example 149 also includes the subject matter according to any one of examples 1-148, above.

Inclusion of cutter 208 permits for the selective stopping and starting of delivery of continuous flexible line 106 by delivery guide 112. By having cutter 208 configured to cut continuous flexible line 106 adjacent to outlet 206, continuous flexible line 106 may be cut prior to being cured, such as by curing energy 118, and while continuous flexible line 106 is not yet in contact with, and optionally compacted against, a prior deposited layer of continuous flexible line 106. In other words, access to an entirety of the circumference of continuous flexible line 106 by cutter 208 is permitted.

Referring generally to FIG. 1 and particularly to, e.g., FIGS. 17-19, 23, 32, and 33, cutter 208 comprises at least one blade 210, movable relative to delivery guide 112. The preceding subject matter of this paragraph characterizes example 150 of the present disclosure, wherein example 150 also includes the subject matter according to example 149, above.

Inclusion of at least one blade 210 may provide for a cost-effective cutter 208.

Referring generally to FIG. 1 and particularly to, e.g., FIG. 17, cutter 208 is iris diaphragm 212. The preceding subject matter of this paragraph characterizes example 151 of the present disclosure, wherein example 151 also includes the subject matter according to any one of examples 149 or 150, above.

Iris diaphragm 212 enables cutting of continuous flexible line 106 from multiple sides of continuous flexible line 106. Accordingly, a cross-sectional profile of continuous flexible line 106 may be less deformed by cutter 208 than may otherwise result from other examples of cutter 208.

Referring generally to FIG. 1 and particularly to, e.g., FIGS. 17 and 19, cutter 208 is positioned within delivery guide 112. The preceding subject matter of this paragraph characterizes example 152 of the present disclosure, wherein example 152 also includes the subject matter according to any one of examples 149-151, above.

Positioning of cutter 208 within delivery guide 112 provides for a compact assembly of system 100, such that cutter 208 does not hinder movement of delivery guide 112 relative to surface 114 and/or vice versa.

Referring generally to FIG. 1 and particularly to, e.g., FIG. 20, cutter 208 comprises cutting laser 213. The preceding subject matter of this paragraph characterizes example 153 of the present disclosure, wherein example 153 also includes the subject matter according to example 149, above.

Use of cutting laser 213 to cut continuous flexible line 106 facilitates precision cutting of continuous flexible line 106 at a desired location during manufacture of composite part 102.

Referring generally to FIG. 1 and particularly to, e.g., FIG. 20, cutter 208 further comprises at least one galvanometer mirror-positioning system 214, configured to direct cutting laser 213 to selectively cut continuous flexible line 106 adjacent to outlet 206. The preceding subject matter of this paragraph characterizes example 154 of the present disclosure, wherein example 154 also includes the subject matter according to example 153, above.

In other words, one or more galvanometer mirror-positioning systems 214 may actively direct cutting laser 213 at continuous flexible line 106 as it exits delivery guide 112.

Referring generally to FIG. 1 and particularly to, e.g., FIG. 22, system 100 further comprises drive assembly 216, operatively coupled at least to one of delivery guide 112 or surface 114 and configured to operatively and selectively move at least one of delivery guide 112 or surface 114 relative to another. The preceding subject matter of this paragraph characterizes example 155 of the present disclosure, wherein example 155 also includes the subject matter according to any one of examples 1-154, above.

Drive assembly 216 facilitates the relative movement between delivery guide 112 and surface 114 so that composite part 102 is manufactured from continuous flexible line 106 as it is deposited via delivery guide 112.

Referring generally to FIG. 1 and particularly to, e.g., FIG. 20, drive assembly 216 comprises X-axis drive 217, Y-axis drive 219, and Z-axis drive 215, at least one of which is operatively coupled at least to one of delivery guide 112 or surface 114. The preceding subject matter of this paragraph characterizes example 156 of the present disclosure, wherein example 156 also includes the subject matter according to example 155, above.

System 100 according to example 156 provides for three-dimensional relative movement between delivery guide 112 and surface 114.

Referring generally to FIG. 1, drive assembly 216 comprises robotic arm 218. The preceding subject matter of this paragraph characterizes example 157 of the present disclosure, wherein example 157 also includes the subject matter according to any one of examples 155 or 156, above.

Use of robotic arm 218 to operatively and selectively move delivery guide 112 relative to surface 114 and/or vice versa permits for multiple degrees of freedom and the manufacture of complex three-dimensional composite parts 102.

A sub-assembly of system 100 therefore may be described as an end-effector for robotic arm 218.

Referring generally to FIG. 1 and particularly to, e.g., FIG. 22, drive assembly 216 is configured to operatively and selectively move at least one of delivery guide 112 or surface 114 orthogonally in three dimensions relative to another. The preceding subject matter of this paragraph characterizes example 158 of the present disclosure, wherein example 158 also includes the subject matter according to any one of examples 155-157, above.

System 100 according to example 158 may manufacture composite part 102 in three dimensions.

Referring generally to FIG. 1 and particularly to, e.g., FIGS. 22 and 38, drive assembly 216 is configured to operatively and selectively move at least one of delivery guide 112 or surface 114 in three dimensions with at least three degrees of freedom relative to another. The preceding subject matter of this paragraph characterizes example 159 of the present disclosure, wherein example 159 also includes the subject matter according to any one of examples 155-157, above.

System 100 according to example 159 may manufacture complex three-dimensional composite parts 102.

Referring generally to FIGS. 1 and 38, drive assembly 216 is configured to operatively and selectively move at least one of delivery guide 112 or surface 114 in three dimensions with at least six degrees of freedom relative to another. The preceding subject matter of this paragraph characterizes example 160 of the present disclosure, wherein example 160 also includes the subject matter according to any one of examples 155-157, above.

System 100 according to example 160 may manufacture complex three-dimensional composite parts 102.

Referring generally to FIGS. 1 and 38, drive assembly 216 is configured to operatively and selectively move at least one of delivery guide 112 or surface 114 in three dimensions with at least nine degrees of freedom relative to another. The preceding subject matter of this paragraph characterizes example 161 of the present disclosure, wherein example 161 also includes the subject matter according to any one of examples 155-157, above.

System 100 according to example 161 may manufacture complex three-dimensional composite parts 102.

Referring generally to FIGS. 1 and 38, drive assembly 216 is configured to operatively and selectively move at least one of delivery guide 112 or surface 114 in three dimensions with at least twelve degrees of freedom relative to another. The preceding subject matter of this paragraph characterizes example 162 of the present disclosure, wherein example 162 also includes the subject matter according to any one of examples 155-157, above.

System 100 according to example 162 may manufacture complex three-dimensional composite parts 102.

With reference to FIG. 38, a schematic illustration according to example 162 is presented, with linear translational elements 290 and rotational elements 292 providing twelve degrees of freedom between delivery guide 112 and surface 114, and with controller 294 being operatively communicatively coupled to linear translational elements 290 and rotational elements 292.

Referring to FIG. 1, system 100 further comprises shielding-gas outlet 220, configured to at least partially protect segment 120 of continuous flexible line 106 from oxidation by delivering shielding gas 221 to segment 120 of continuous flexible line 106 after segment 120 exits delivery guide 112. The preceding subject matter of this paragraph characterizes example 163 of the present disclosure, wherein example 163 also includes the subject matter according to any one of examples 1-162, above.

Inclusion of shielding-gas outlet 220 and delivery of shielding gas 221 therefrom to segment 120 restricts oxidation of continuous flexible line 106 prior to being further cured and/or during further curing by source 116.

Referring to FIG. 1, system 100 further comprises shielding-gas source 222, selectively communicatively coupled with shielding-gas outlet 220. The preceding subject matter of this paragraph characterizes example 164 of the present disclosure, wherein example 164 also includes the subject matter according to example 163, above.

Shielding-gas source 222 provides a source of shielding gas 221 to be delivered to segment 120 via shielding-gas outlet 220.

Referring to FIG. 1, system 100 further comprises pivoting arm 152, coupled relative to delivery guide 112 such that pivoting arm 152 trails delivery guide 112 as at least one of delivery guide 112 or surface 114 moves relative to another. Shielding-gas outlet 220 is operatively coupled to pivoting arm 152. The preceding subject matter of this paragraph characterizes example 165 of the present disclosure, wherein example 165 also includes the subject matter according to any one of examples 163 or 164, above.

By being coupled to pivoting arm 152, shielding-gas outlet 220 is selectively positioned to deliver shielding gas 221 to segment 120 as delivery guide 112 moves relative to surface 114 and/or vice versa.

Referring to FIG. 1, system 100 further comprises defect detector 224, configured to detect defects in segment 120 of continuous flexible line 106 after segment 120 of continuous flexible line 106 exits delivery guide 112. The preceding subject matter of this paragraph characterizes example 166 of the present disclosure, wherein example 166 also includes the subject matter according to any one of examples 1-165, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected by defect detector 224 prior to a subsequent layer of continuous flexible line 106 obscuring, or hiding, the defect from view.

Referring to FIG. 1, defect detector 224 comprises optical detector 226 or ultrasonic detector 227. The preceding subject matter of this paragraph characterizes example 167 of the present disclosure, wherein example 167 also includes the subject matter according to example 166, above.

In some applications, optical detector 226 may be well suited to detect defects in segment 120 of continuous flexible line 106. In some applications, ultrasonic detector 227 may be well suited to detect defects in segment 120 of continuous flexible line 106.

Referring to FIG. 1, defect detector 224 comprises camera 228. The preceding subject matter of this paragraph characterizes example 168 of the present disclosure, wherein example 168 also includes the subject matter according to example 166, above.

Camera 228 may be well suited to detect defects in segment 120 of continuous flexible line 106.

Referring to FIG. 1, system 100 further comprises controller 230 and one or more of source 116 of curing energy 118; resin-metering system 256; at least one sensor 254; first pump 265; second pump 267; first vessel 262; second vessel 272; origin 126 of non-resin component 108; pivoting-arm actuator 188; compactor 138; surface roughener 144; motor 162; debris inlet 202; vacuum source 203, selectively communicatively coupled with debris inlet 202; pressurized-gas outlet 204; pressurized-gas source 205, selectively communicatively coupled with pressurized-gas outlet 204; cutter 208; drive assembly 216; shielding-gas outlet 220; shielding-gas source 222, selectively communicatively coupled with shielding-gas outlet 220; defect detector 224; heat source 136; heater 602, positioned to heat continuous flexible line 106 prior to exiting delivery guide 112; cooling system 234; delivery system 103; vacuum table 115; or surface 114. Controller 230 is programmed to selectively operate one or more of delivery guide 112, feed mechanism 104, source 116 of curing energy 118, resin-metering system 256, at least one sensor 254, first pump 265, second pump 267, first vessel 262, second vessel 272, origin 126 of non-resin component 108, pivoting-arm actuator 188, compactor 138, surface roughener 144, motor 162, vacuum source 203, pressurized-gas source 205, cutter 208, drive assembly 216, shielding-gas source 222, defect detector 224, heat source 136, heater 602, cooling system 234, delivery system 103, vacuum table 115, or surface 114. The preceding subject matter of this paragraph characterizes example 169 of the present disclosure, wherein example 169 also includes the subject matter according to any one of examples 1-168, above.

Controller 230 controls the operation of various component parts of system 100. For example, precise movement of delivery guide 112 and/or surface 114 relative to each other may be controlled to manufacture a desired three-dimensional composite part 102. Precise pivoting of pivoting arm 152 by pivoting-arm actuator 188 may be controlled to precisely deliver a compaction force by compactor 138, to precisely deliver curing energy 118, to precisely abrade continuous flexible line 106 by surface roughener 144, and so forth. Additionally, operation of various component parts may be selectively started and stopped by controller 230 during manufacture of composite part 102 to create desired properties and configurations of composite part 102.

In FIG. 1, communication between controller 230 and various component parts of system 100 is schematically represented by lightning bolts. Such communication may be wired and/or wireless in nature.

Controller 230 may include any suitable structure that may be adapted, configured, designed, constructed, and/or programmed to automatically control the operation of at least a portion of system 100. As illustrative, non-exclusive examples, controller 230 may include and/or be an electronic controller, a dedicated controller, a special-purpose controller, a personal computer, a display device, a logic device, and/or a memory device. In addition, controller 230 may be programmed to perform one or more algorithms to automatically control the operation of system 100. This may include algorithms that may be based upon and/or that may cause controller 230 to direct system 100 to perform methods 300 and 400 disclosed herein.

Referring generally to FIG. 1 and particularly to, e.g., FIG. 22, system 100 further comprises frame 232. Frame 232 supports feed mechanism 104 and surface 114. The preceding subject matter of this paragraph characterizes example 170 of the present disclosure, wherein example 170 also includes the subject matter according to any one of examples 1-169, above.

Frame 232 structurally supports feed mechanism 104 and surface 114 so that feed mechanism 104 may operatively and selectively move delivery guide 112 relative to surface 114 and/or vice versa.

Referring generally to FIG. 1, thermosetting resin component 110 is configured to cure at a temperature between about 20° C. and about 30° C. within a period greater than 5 minutes or to cure at a temperature greater than about 150° C. within a period of less than 5 seconds. The preceding subject matter of this paragraph characterizes example 171 of the present disclosure, wherein example 171 also includes the subject matter according to any one of examples 1-170, above.

Various thermosetting resins 252 may be used for thermosetting resin component 110 and may be selected based on one or more of desired properties prior to being cured, desired properties after being fully cured, desired curing properties, such as based on length of time and/or temperatures required to fully cure, etc. The examples set forth in example 171 are illustrative and non-exclusive, and other configurations of thermosetting resin 252, and thus thermosetting resin component 110, may be used with system 100. Moreover, the various temperature values may vary for a particular thermosetting resin 252 and thermosetting resin component 110 based on a volume of thermosetting resin 252 present at a location being cured.

Referring generally to FIG. 1, delivery guide 112 is configured to at least partially cure continuous flexible line 106 prior to exiting delivery guide 112. The preceding subject matter of this paragraph characterizes example 172 of the present disclosure, wherein example 172 also includes the subject matter according to any one of examples 1-171, above.

In some applications, it may be desirable to initiate the curing of continuous flexible line 106 prior to it being deposited.

Referring to FIG. 1, delivery guide 112 comprises heater 602, positioned to heat continuous flexible line 106 prior to exiting delivery guide 112. The preceding subject matter of this paragraph characterizes example 173 of the present disclosure, wherein example 173 also includes the subject matter according to example 172, above.

Heater 602 may provide for efficient curing, or pre-curing, or continuous flexible line 106 prior to exiting delivery guide 112.

Referring generally to FIG. 1 and particularly to, e.g., FIGS. 2 and 3, delivery guide 112 further comprises outlet 206 and line passage 154, extending from first inlet 170 to outlet 206. Outlet 206 is configured to provide an exit for continuous flexible line 106 from delivery guide 112. Heater 602 comprises resistive heater 604 positioned adjacent to outlet 206. The preceding subject matter of this paragraph characterizes example 174 of the present disclosure, wherein example 174 also includes the subject matter according to example 173, above.

Resistive heater 604 may be an efficient and inexpensive option for generating heat for at least partially curing continuous flexible line 106 prior to exiting delivery guide 112. Moreover, resistive heater 251 may provide for efficient packaging of delivery guide 112 with heater 602.

Referring to FIG. 1, system 100 further comprises cooling system 234, configured to maintain first part 253 of thermosetting resin 252 and second part 255 of thermosetting resin 252 below a threshold temperature at least prior to first part 253 of thermosetting resin 252 and second part 255 of thermosetting resin 252 being received by delivery guide 112. The preceding subject matter of this paragraph characterizes example 175 of the present disclosure, wherein example 175 also includes the subject matter according to any one of examples 1-174, above.

Cooling system 234 maintains first part 253 and second part 255 of thermosetting resin 252 below a threshold temperature, so as to maintain desired properties, such as viscosity of first part 253 and second part 255 prior to being combined. Moreover, the threshold temperature may be selected such that even after being combined, the combined thermosetting resin 252 is restricted from curing until thermosetting resin component 110 is formed and continuous flexible line 106 is deposited.

Referring generally to FIG. 1, cooling system 234 is further configured to maintain first part 253 of thermosetting resin 252 and second part 255 of thermosetting resin 252 below a threshold temperature within delivery guide 112. The preceding subject matter of this paragraph characterizes example 176 of the present disclosure, wherein example 176 also includes the subject matter according to example 175, above.

By maintaining first part 253 and second part 255, whether prior to being mixed together or after being mixed together, below a threshold temperature within delivery guide 112, thermosetting resin 252 and thermosetting resin component 110 may be restricted from curing within delivery guide 112, thereby avoiding delivery guide 112 becoming clogged or otherwise unusable.

Referring to FIG. 1, system 100 further comprises first vessel 262, configured to dispense first part 253 of thermosetting resin 252. System 100 further comprises second vessel 272, configured to dispense second part 255 of thermosetting resin 252. Cooling system 234 comprises one or more insulated stores 244. First vessel 262 and second vessel 272 are positioned within insulated stores 244. The preceding subject matter of this paragraph characterizes example 177 of the present disclosure, wherein example 177 also includes the subject matter according to any one of examples 175 or 176, above.

Inclusion of one or more insulated stores 244 within which first vessel 262 and second vessel 272 are positioned facilitates maintaining first part 253 and second part 255 below a threshold temperature.

Referring to FIG. 1, cooling system 234 further comprises pump 238 and coolant line 240, communicatively coupled with pump 238 and thermally coupled with one or more insulated stores 244. Pump 238 is configured to circulate coolant 246 through coolant line 240 to cool one or more insulated stores 244. The preceding subject matter of this paragraph characterizes example 178 of the present disclosure, wherein example 178 also includes the subject matter according to example 177, above.

Pump 238 may be used to circulate coolant 246 through coolant line 240, which due to being thermally coupled with one or more insulated stores 244, draws heat away from insulated stores 244 and further facilitates maintaining first part 253 and second part 255 below a threshold temperature.

Other mechanisms for maintaining insulated stores 244 and first part 253 and second part 255 of thermosetting resin 252 below a threshold temperature, including mechanisms that utilize a refrigeration cycle, also are within the scope of the present disclosure.

Referring to FIG. 1, system 100 further comprises first vessel 262, configured to dispense first part 253 of thermosetting resin 252, and second vessel 272, configured to dispense second part 255 of thermosetting resin 252. First vessel 262 and second vessel 272 comprise cooling system 234. The preceding subject matter of this paragraph characterizes example 179 of the present disclosure, wherein example 179 also includes the subject matter according to any one of examples 175 or 176, above.

By having first vessel 262 and second vessel 272 comprising cooling system 234, an efficient packaging of system 100 may be facilitated, such as avoiding one or more insulated stores 244.

Referring to FIG. 1, system 100 further comprises delivery system 103. Delivery system 103 comprises first vessel 262, configured to dispense first part 253 of thermosetting resin 252, second vessel 272, configured to dispense second part 255 of thermosetting resin 252, and one or more delivery lines 242, through which first part 253 of thermosetting resin 252 and second part 255 of thermosetting resin are delivered to delivery guide 112. System 100 further comprises cooling system 234, configured to maintain first part 253 of thermosetting resin 252 and second part 255 of thermosetting resin 252 within one or more delivery lines 242 below a threshold temperature. The preceding subject matter of this paragraph characterizes example 180 of the present disclosure, wherein example 180 also includes the subject matter according to any one of examples 1-178, above.

Cooling system 234 being configured to maintain first part 253 and second part 255 of thermosetting resin 252 within one or more delivery lines 242 below a threshold temperature enables a desired temperature of first part 253 and second part 255 prior to being mixed together, and thus enables a desired temperature of thermosetting resin 252 after first part 253 and second part 255 have been mixed together.

Referring to FIG. 1, system 100 further comprises cooling system 234, configured to maintain thermosetting resin component 110 of continuous flexible line 106 below a threshold temperature prior to continuous flexible line 106 being deposited by delivery guide 112. The preceding subject matter of this paragraph characterizes example 181 of the present disclosure, wherein example 181 also includes the subject matter according to any one of examples 1-180, above.

By having cooling system 234 configured to maintain thermosetting resin component 110, that is after thermosetting resin 252 has been applied to non-resin component 108, below a threshold temperature, continuous flexible line 106 may be restricted from curing until it is deposited or at least just prior in time to being deposited.

Referring to FIG. 1, delivery guide 112 comprises cooling system 234. The preceding subject matter of this paragraph characterizes example 182 of the present disclosure, wherein example 182 also includes the subject matter according to example 181, above.

When delivery guide 112 comprises cooling system 234, thermosetting resin component 110 may be restricted from being cured prior to continuous flexible line 106 being deposited by delivery guide 112.

Referring generally to FIG. 1, the threshold temperature is no greater than 20° C., 15° C., 10° C., 5° C., 0° C., −50° C., −100° C., −150° C., −200° C., −200--100° C., −100-0° C., −50-5° C., 5-20° C., 5-15° C., or 5-10° C. The preceding subject matter of this paragraph characterizes example 183 of the present disclosure, wherein example 183 also includes the subject matter according to any one of examples 175-182, above.

The threshold temperature associated with system 100 and cooling system 234 may be selected based on thermosetting resin 252 being used for thermosetting resin component 110, and the examples set forth in example 183 are illustrative and non-exclusive. Moreover, the threshold temperature may be selected to prevent curing of thermosetting resin 252 and thus thermosetting resin component 110 prior to being deposited.

Referring generally to FIG. 1 and particularly to, e.g., FIG. 22, system 100 further comprises surface 114. The preceding subject matter of this paragraph characterizes example 184 of the present disclosure, wherein example 184 also includes the subject matter according to any one of examples 1-183, above.

Inclusion of surface 114 as part of system 100 provides for selective properties and characteristics of surface 114.

Referring generally to FIG. 1, surface 114 is configured to be selectively heated. The preceding subject matter of this paragraph characterizes example 185 of the present disclosure, wherein example 185 also includes the subject matter according to example 184, above.

Selective heating of surface 114 may facilitate curing of an initial layer of continuous flexible line 106 being deposited. Additionally or alternatively, selective heating of surface 114, such as at or near the completion of composite part 102, may facilitate removal of composite part 102 from surface 114.

Referring to FIG. 1, surface 114 comprises vacuum table 115. The preceding subject matter of this paragraph characterizes example 186 of the present disclosure, wherein example 186 also includes the subject matter according to any one of examples 184 or 185, above.

Vacuum table 115 may help to secure composite part 102 to surface 114 while composite part 102 is being manufacture by system 100.

Referring generally to FIG. 1, delivery guide 112 further comprises outlet 206 configured to provide an exit for continuous flexible line 106 from delivery guide 112. Outlet 206 is further configured to impart a predetermined texture to continuous flexible line 106 as it exits delivery guide 112. The preceding subject matter of this paragraph characterizes example 187 of the present disclosure, wherein example 187 also includes the subject matter according to any one of examples 1-186, above.

By imparting a texture to continuous flexible line at outlet 206 of delivery guide 112, a desired adhesion between layers of continuous flexible line being deposited may be achieved. Moreover, in comparison to other examples disclosed herein, a more efficient packaging of system 100 may be achieved, while still providing the desired functionality of applying texture to continuous flexible line 106.

Referring, e.g., to FIGS. 1, 8-11, 14, 21, and 23-28 and particularly to FIG. 34, method 300 of additively manufacturing composite part 102 is disclosed. Method 300 comprises (block 302) depositing segment 120 of continuous flexible line 106 along print path 122. Continuous flexible line 106 comprises non-resin component 108 and thermosetting resin component 110 that is not fully cured. Method 300 further comprises (block 304), while advancing continuous flexible line 106 toward print path 122, delivering a predetermined or actively determined amount of curing energy 118 at least to portion 124 of segment 120 of continuous flexible line 106 at a controlled rate after segment 120 of continuous flexible line 106 is deposited along print path 122 to at least partially cure at least portion 124 of segment 120 of continuous flexible line 106. The preceding subject matter of this paragraph characterizes example 188 of the present disclosure.

Method 300 therefore may be performed to manufacture composite parts 102 from at least a composite material that includes thermosetting resin component 110 initially in an uncured state and that is at least partially cured while composite part 102 is being manufactured, or in situ, by curing energy 118. As a result of delivering a predetermined or actively determined amount of curing energy 118 at a controlled rate, a desired level, or degree, of cure may be established with respect to portion 124 of segment 120 at any given time during manufacture of composite part 102. For example, as discussed herein, in some examples, it may be desirable to cure one portion 124 greater than or less than another portion 124 during manufacture of composite part 102. Moreover, method 300 may be performed to manufacture composite parts 102 with continuous flexible line 106 being oriented in desired and/or predetermined orientations throughout composite part 102, such as to define desired properties of composite part 102.

Method 300 may be performed by system 100.

Referring, e.g., to FIGS. 1-5 and particularly to FIG. 34, method 300 further comprises (block 306) applying thermosetting resin 252 to non-resin component 108 while pushing continuous flexible line 106 out of delivery guide 112. Thermosetting resin component 110 comprises at least some of thermosetting resin 252 applied to non-resin component 108. The preceding subject matter of this paragraph characterizes example 189 of the present disclosure, wherein example 189 also includes the subject matter according to example 188, above.

By applying thermosetting resin 252 to non-resin component 108 during the manufacture of composite part 102, continuous flexible line 106 is created during manufacture of composite part 102. Accordingly, different non-resin components 108 and/or different thermosetting resins 252 may be selected during performance of method 300 to customize or otherwise create a desired composite part 102 with different characteristics at different locations within composite part 102. Moreover, depending on the properties of thermosetting resin 252 and/or its component parts, a complex and/or expensive cooling system may not be required to restrict curing of thermosetting resin 252 prior to thermosetting resin component 110 being applied to non-resin component 108 and continuous flexible line 108 being deposited.

Referring, e.g., to FIGS. 1-5 and particularly to FIG. 34, according to method 300, (block 306) applying thermosetting resin 252 to non-resin component 108 while pushing continuous flexible line 106 out of delivery guide 112 comprises (block 308) injecting thermosetting resin 252 into delivery guide 112. The preceding subject matter of this paragraph characterizes example 190 of the present disclosure, wherein example 190 also includes the subject matter according to example 189, above.

Injecting thermosetting resin 252 into delivery guide 112, as opposed to, e.g., pulling non-resin component 108 through a resin bath, permits for precise control of the application of thermosetting resin 252 to non-resin component 108.

Referring, e.g., to FIGS. 1-3 and 5 and particularly to FIG. 34, according to method 300, (block 308) injecting thermosetting resin 252 into delivery guide 112 comprises (block 310) separately injecting first part 253 of thermosetting resin 252 and second part 255 of thermosetting resin 252 into delivery guide 112. The preceding subject matter of this paragraph characterizes example 191 of the present disclosure, wherein example 191 also includes the subject matter according to example 190, above.

By separately injecting first part 253 and second part 255 into delivery guide 112, and thus, e.g., closer to outlet 206 of delivery guide 112, the amount of time that first part 253 and second part 255 are intermixed prior to being deposited as part of thermosetting resin component 110 may be minimized. As a result, curing of thermosetting resin component 110 and continuous flexible line 106 may be restricted until continuous flexible line 106 is deposited by delivery guide 112.

Referring, e.g., to FIGS. 1-3 and 5 and particularly to FIG. 34, method 300 further comprises (block 312) mixing first part 253 of thermosetting resin 252 and second part 255 of thermosetting resin 252 within delivery guide 112. The preceding subject matter of this paragraph characterizes example 192 of the present disclosure, wherein example 192 also includes the subject matter according to example 191, above.

By mixing first part 253 and second part 255 within delivery guide 112, the amount of time that first part 253 and second part 255 are intermixed prior to being deposited as part of thermosetting resin component 110 may be minimized. As a result, curing of thermosetting resin component 110 and continuous flexible line 106 may be restricted until continuous flexible line 106 is deposited by delivery guide 112.

Referring, e.g., to FIGS. 1 and 4 and particularly to FIG. 34, method 300 further comprises (block 314) mixing first part 253 of thermosetting resin 252 and second part 255 of thermosetting resin 252 externally to delivery guide 112. The preceding subject matter of this paragraph characterizes example 193 of the present disclosure, wherein example 193 also includes the subject matter according to example 190, above.

Mixing first part 253 and second part 255 externally to delivery guide 112 may provide for a less complex delivery guide structure and more efficient packaging of delivery guide 112. Moreover, as discussed herein, such a configuration may facilitate use of off-the-shelf resin mixers that may be easily and inexpensively replaced, when needed.

Referring, e.g., to FIGS. 1, 4, and 5 and particularly to FIG. 34, according to method 300, (block 306) applying thermosetting resin 252 to non-resin component 108 while pushing continuous flexible line 106 out of delivery guide 112 comprises (block 316) metering a flow of thermosetting resin 252. The preceding subject matter of this paragraph characterizes example 194 of the present disclosure, wherein example 194 also includes the subject matter according to any one of examples 189-193, above.

Metering the flow of thermosetting resin 252 permits for the selective increase and the selective decrease of the volume of thermosetting resin 252 applied to non-resin component 108. Accordingly, a desired level of saturation of non-resin component 108 with thermosetting resin 252 may be achieved.

Referring, e.g., to FIGS. 1, 4, and 5 and particularly to FIG. 34, according to method 300, (block 316) metering the flow of thermosetting resin 252 comprises (block 318) detecting a level of thermosetting resin 252 within delivery guide 112. The preceding subject matter of this paragraph characterizes example 195 of the present disclosure, wherein example 195 also includes the subject matter according to example 194, above.

Detection of a level of thermosetting resin 252 within delivery guide 112 provides a data input for metering the flow of thermosetting resin 252 to non-resin component 108.

Referring, e.g., to FIGS. 1, 4, and 5 and particularly to FIG. 34, according to method 300, (block 316) metering the flow of thermosetting resin 252 comprises (block 320) selectively reducing or selectively increasing the flow of thermosetting resin 252 to delivery guide 112 responsive to the level of thermosetting resin 252 within delivery guide 112. The preceding subject matter of this paragraph characterizes example 196 of the present disclosure, wherein example 196 also includes the subject matter according to example 195, above.

The selective reduction of the flow of thermosetting resin 252 permits for avoidance of overflowing thermosetting resin 252 from delivery guide 112. The selective increase of the flow of thermosetting resin 252 permits for avoidance of an undesirably low level of saturation of non-resin component 108 with thermosetting resin 252.

Referring, e.g., to FIGS. 1, 4, and 5 and particularly to FIG. 34, according to method 300, (block 316) metering the flow of thermosetting resin 252 comprises (block 322) detecting a saturation level of non-resin component 108 with thermosetting resin 252. The preceding subject matter of this paragraph characterizes example 197 of the present disclosure, wherein example 197 also includes the subject matter according to any one of examples 194-196, above.

Detecting a saturation level of non-resin component 108 with thermosetting resin 252, as opposed to, e.g., simply detecting the presence of thermosetting resin 252 at a given position, may facilitate precisely ensuring a desired level of saturation, such as ensuring adequate penetration of non-resin component 108 with thermosetting resin 252.

Referring, e.g., to FIGS. 1, 4, and 5 and particularly to FIG. 34, according to method 300, (block 316) metering the flow of thermosetting resin 252 comprises (block 324) selectively reducing or selectively increasing the flow of thermosetting resin 252 to delivery guide 112 responsive to the saturation level of non-resin component 108 with thermosetting resin 252. The preceding subject matter of this paragraph characterizes example 198 of the present disclosure, wherein example 198 also includes the subject matter according to example 197, above.

The selective reduction and the selective increase of the flow of thermosetting resin 252 responsive to the saturation level facilitate precisely achieving a desired level of saturation of non-resin component 108 with thermosetting resin 252.

Referring, e.g., to FIGS. 1, 4, and 5 and particularly to FIG. 34, according to method 300, (block 316) metering the flow of thermosetting resin 252 comprises (block 326) metering a flow of first part 253 of thermosetting resin 252 and metering a flow of second part 255 of thermosetting resin 252. The preceding subject matter of this paragraph characterizes example 199 of the present disclosure, wherein example 199 also includes the subject matter according to any one of examples 194-198, above.

Metering the flow of first part 253 and second part 255, that is before they are mixed to create thermosetting resin 252, permits for separately increasing and decreasing the flow of first part 253 and second part 255. Accordingly, while composite part 102 is being manufactured, the ratio of first part 253 to second part 255 may be actively varied, such as to result in desired properties of continuous flexible line 106 along its length and to result in varied properties at different locations within composite part 102.

Referring, e.g., to FIG. 1 and particularly to FIG. 34, method 300 further comprises (block 386) maintaining thermosetting resin 252 below a threshold temperature at least prior to applying thermosetting resin 252 to non-resin component 108. The preceding subject matter of this paragraph characterizes example 200 of the present disclosure, wherein example 200 also includes the subject matter according to any one of examples 189-199, above.

Maintaining thermosetting resin 252 below a threshold temperature prior to being applied to non-resin component 108 restricts curing of thermosetting resin component 110 before continuous flexible line 106 is deposited.

Referring, e.g., to FIG. 1 and particularly to FIG. 34, method 300 further comprises (block 388) maintaining thermosetting resin component 110 below a threshold temperature prior to depositing segment 120 of continuous flexible line 106 along print path 122. The preceding subject matter of this paragraph characterizes example 201 of the present disclosure, wherein example 201 also includes the subject matter according to any one of examples 189-200, above.

Maintaining thermosetting resin component 110 below a threshold temperature prior to continuous flexible line 106 being deposited restricts curing of thermosetting resin component 110.

Referring to FIG. 34, according to method 300, (block 390) the threshold temperature is no greater than 20° C., 15° C., 10° C., 5° C., 0° C., −50° C., −100° C., −150° C., −200° C., −200−−100° C., −100-0° C., −50-5° C., 5-20° C., 5-15° C., or 5-10° C. The preceding subject matter of this paragraph characterizes example 202 of the present disclosure, wherein example 202 also includes the subject matter according to any one of examples 200 or 201, above.

The threshold temperature associated with method 300 may be selected based on a thermosetting resin 252 being used, and the examples set forth in example 202 are illustrative and non-exclusive.

Referring, e.g., to FIGS. 6 and 7 and particularly to FIG. 34, according to method 300, (block 328) non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 203 of the present disclosure, wherein example 203 also includes the subject matter according to any one of examples 188-202, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

FIG. 6 schematically represents continuous flexible line 106 with a single fiber as non-resin component 108 within a matrix of thermosetting resin component 110. FIG. 7 schematically represents continuous flexible line 106 with more than one fiber as non-resin component 108 within a matrix of thermosetting resin component 110.

Referring, e.g., to FIGS. 1 and 8 and particularly to FIG. 34, according to method 300, (block 302) depositing segment 120 of continuous flexible line 106 along print path 122 comprises (block 330) layering continuous flexible line 106 against itself to additively manufacture composite part 102. The preceding subject matter of this paragraph characterizes example 204 of the present disclosure, wherein example 204 also includes the subject matter according to any one of examples 188-203, above.

By layering continuous flexible line 106 against itself or a previously deposited segment 120, a three-dimensional composite part 102 may be manufactured by performance of method 300.

Accordingly, method 300 may be described as a 3-D printing method and/or as an additive manufacturing method.

Referring, e.g., to FIG. 1 and particularly to FIG. 34, according to method 300, (block 302) depositing segment 120 of continuous flexible line 106 along print path 122 comprises (block 332) depositing continuous flexible line 106 in a predetermined pattern to selectively control one or more physical characteristics of composite part 102. The preceding subject matter of this paragraph characterizes example 205 of the present disclosure, wherein example 205 also includes the subject matter according to any one of examples 188-204, above.

By controlling one or more physical characteristics of composite part 102, less overall material may be used and/or the size of a specific composite part may be reduced when compared to a similar part manufactured by a traditional composite layup method.

For example, in contrast to composite parts constructed from multiple layers of planar plies of composite material, composite part 102 may be manufactured so that the orientation of continuous flexible line 106, and thus of non-resin component 108, results in desired properties. As an example, if a part includes holes, continuous flexible line 106 may be arranged generally in concentric circles or spiral around the holes, resulting in no or few interruptions to continuous flexible line 106 at the boundary of the holes. As a result, the strength of the composite part may be significantly greater around the hole than a similar part constructed by traditional composite layup methods. In addition the composite part may be less subject to cracks and propagation thereof at the boundary of the holes. Moreover, because of the desired properties around the holes, the overall thickness, volume, and/or mass of the composite part may be reduced while achieving the desired properties, when compared to a similar part constructed by traditional composite layup methods.

Referring, e.g., to FIG. 1 and particularly to FIG. 34, according to method 300, (block 334) at least one of depositing segment 120 of continuous flexible line 106 along print path 122 or delivering the predetermined or actively determined amount of curing energy 118 at least to portion 124 of segment 120 of continuous flexible line 106 at the controlled rate provides different physical characteristics at different locations of composite part 102. The preceding subject matter of this paragraph characterizes example 206 of the present disclosure, wherein example 206 also includes the subject matter according to any one of examples 188-205, above.

Again, for various reasons and applications, it may be desirable to manufacture composite part 102 with different properties at different locations.

Referring to FIG. 34, according to method 300, (blocks 336 and 338) the physical characteristics include at least one of strength, stiffness, flexibility, ductility, or hardness. The preceding subject matter of this paragraph characterizes example 207 of the present disclosure, wherein example 207 also includes the subject matter according to any one of examples 205 or 206, above.

Each of these physical characteristics may be selected for a particular purpose. For example, in a composite part that when in use receives a significant torque on a sub-part thereof compared to the remainder of the composite part, it may be desirable to have such sub-part less stiff and/or more flexible than other portions of the composite part. Additionally, it may be desirable to build more strength into a sub-part than other portions of composite part 102 for various reasons depending on a specific application of composite part 102.

Referring, e.g., to FIGS. 1 and 8 and particularly to FIG. 34, according to method 300, (block 304) delivering the predetermined or actively determined amount of curing energy 118 at least to portion 124 of segment 120 of continuous flexible line 106 at the controlled rate comprises (block 340) partially curing first layer 140 of segment 120 of continuous flexible line 106 as first layer 140 is being deposited and further curing first layer 140 as second layer 142 is being deposited against first layer 140. The preceding subject matter of this paragraph characterizes example 208 of the present disclosure, wherein example 208 also includes the subject matter according to any one of examples 188-207, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

Referring, e.g., to FIGS. 1 and 8 and particularly to FIG. 34, according to method 300, (block 304) delivering the predetermined or actively determined amount of curing energy 118 at least to portion 124 of segment 120 of continuous flexible line 106 at the controlled rate comprises (block 342) partially curing first layer 140 of segment 120 of continuous flexible line 106 as first layer 140 is being deposited and fully curing first layer 140 as second layer 142 is being deposited against first layer 140. The preceding subject matter of this paragraph characterizes example 209 of the present disclosure, wherein example 209 also includes the subject matter according to any one of examples 188-208, above.

Again, by only partially curing first layer 140 as first layer 140 is being deposited, first layer 140 may remain tacky, or sticky, thereby facilitating adhesion of second layer 142 against first layer 140 as second layer 142 is deposited against first layer 140. However, according to this example 209, first layer 140 is fully cured as second layer 142 is being partially cured.

Referring, e.g., to FIG. 1 and particularly to FIG. 34, according to method 300, (block 304) delivering the predetermined or actively determined amount of curing energy 118 at least to portion 124 of segment 120 of continuous flexible line 106 at the controlled rate comprises (block 344) curing less than an entirety of composite part 102. The preceding subject matter of this paragraph characterizes example 210 of the present disclosure, wherein example 210 also includes the subject matter according to any one of examples 188-209, above.

In some applications, a less cured portion may be desirable so that it may be subsequently worked on by a subsequent process, such as to remove material and/or add a structural or other component to composite part 102.

Referring, e.g., to FIG. 1 and particularly to FIG. 34, method 300 further comprises (block 346) restrictively curing at least a portion of composite part 102. The preceding subject matter of this paragraph characterizes example 211 of the present disclosure, wherein example 211 also includes the subject matter according to any one of examples 188-210, above.

Again, in some applications, a less cured portion may be desirable so that it may be subsequently worked on by a subsequent process, such as to remove material and/or add a structural or other component to composite part 102, and a less cured portion may result from restriction of the curing process.

Referring, e.g., to FIG. 1 and particularly to FIG. 34, according to method 300, (block 348) the portion of composite part 102 is restrictively cured to facilitate subsequent processing of the portion. The preceding subject matter of this paragraph characterizes example 212 of the present disclosure, wherein example 212 also includes the subject matter according to example 211, above.

Subsequent processing on composite part 102 may be desirable, such as to remove material and/or add a structural or other component to composite part 102.

Referring, e.g., to FIG. 1 and particularly to FIG. 34, according to method 300, (block 304) delivering the predetermined or actively determined amount of curing energy 118 at least to portion 124 of segment 120 of continuous flexible line 106 at the controlled rate comprises (block 350) selectively varying at least one of a delivery rate or a delivery duration of curing energy 118 to impart varying physical characteristics to composite part 102. The preceding subject matter of this paragraph characterizes example 213 of the present disclosure, wherein example 213 also includes the subject matter according to any one of examples 188-212, above.

By imparting varying physical characteristics to composite part 102, a customized composite part 102 may be manufactured with sub-parts having desirable properties that are different from other sub-parts.

Referring to FIG. 34, according to method 300, (block 352) the varying physical characteristics include at least one of strength, stiffness, flexibility, ductility, or hardness. The preceding subject matter of this paragraph characterizes example 214 of the present disclosure, wherein example 214 also includes the subject matter according to example 213, above.

Each of these physical characteristics may be selected for a particular purpose. For example, in composite part 102 that when in use receives a significant torque on a sub-part thereof compared to the remainder of composite part 102, it may be desirable to have such sub-part less stiff and/or more flexible than other portions of composite part 102. Additionally, it may be desirable to build more strength into a sub-part than other portions of composite part 102 for various reasons depending on a specific application of composite part 102.

Referring, e.g., to FIGS. 1, 12-16, 23, and 25 and particularly to FIG. 34, method 300 further comprises (block 354), simultaneously with depositing segment 120 of continuous flexible line 106 along print path 122, compacting at least section 180 of segment 120 of continuous flexible line 106 after segment 120 of continuous flexible line 106 is deposited along print path 122. The preceding subject matter of this paragraph characterizes example 215 of the present disclosure, wherein example 215 also includes the subject matter according to any one of examples 188-214, above.

Compaction of section 180 of continuous flexible line 106 during performance of method 300 facilitates adherence between adjacent layers of continuous flexible line 106 being deposited during performance of method 300.

Referring, e.g., to FIG. 13 and particularly to FIG. 34, according to method 300, (block 354) compacting at least section 180 of segment 120 of continuous flexible line 106 after segment 120 of continuous flexible line 106 is deposited along print path 122 comprises (block 356) imparting a desired cross-sectional shape to segment 120 of continuous flexible line 106. The preceding subject matter of this paragraph characterizes example 216 of the present disclosure, wherein example 216 also includes the subject matter according to example 215, above.

It may be desirable, in some applications, to impart a predetermined cross-sectional shape to continuous flexible line 106 as it is being deposited.

Referring, e.g., to FIGS. 1, 12-16, 23, and 25 and particularly to FIG. 34, according to method 300, (block 354) compacting at least section 180 of segment 120 of continuous flexible line 106 after segment 120 of continuous flexible line 106 is deposited along print path 122 comprises (block 392) heating section 180 of segment 120 of continuous flexible line 106 to at least partially cure at least section 180 of segment 120 of continuous flexible line 106. The preceding subject matter of this paragraph characterizes example 217 of the present disclosure, wherein example 217 also includes the subject matter according to any one of examples 215 or 216, above.

Having compaction also deliver heat to continuous flexible line 106 efficiently cures continuous flexible line 106.

Referring, e.g., to FIGS. 1, 12, and 23 and particularly to FIG. 34, method 300 further comprises (block 358), simultaneously with depositing segment 120 of continuous flexible line 106 along print path 122, roughening at least section 194 of segment 120 of continuous flexible line 106 after segment 120 of continuous flexible line 106 is deposited along print path 122. The preceding subject matter of this paragraph characterizes example 218 of the present disclosure, wherein example 218 also includes the subject matter according to any one of examples 188-217, above.

Roughening section 194 of continuous flexible line 106 increases the surface area thereof and aids in adhesion of a subsequent layer of continuous flexible line 106 deposited against it during performance of method 300.

Referring, e.g., to FIGS. 1 and 23 and particularly to FIG. 34, method 300 further comprises (block 360), simultaneously with roughening at least section 194 of segment 120 of continuous flexible line 106, collecting debris resulting from roughening at least section 194 of segment 120 of continuous flexible line 106. The preceding subject matter of this paragraph characterizes example 219 of the present disclosure, wherein example 219 also includes the subject matter according to example 218, above.

Collection of debris that results from roughening section 194 avoids unwanted, loose particles of thermosetting resin component 110 becoming trapped between adjacent deposited layers of continuous flexible line 106 that may otherwise result in unwanted properties of composite part 102.

Referring, e.g., to FIGS. 1 and 23 and particularly to FIG. 34, method 300 further comprises (block 362), simultaneously with roughening at least section 194 of segment 120 of continuous flexible line 106, dispersing debris resulting from roughening at least section 194 of segment 120 of continuous flexible line 106. The preceding subject matter of this paragraph characterizes example 220 of the present disclosure, wherein example 220 also includes the subject matter according to any one of examples 218 or 219, above.

Dispersal of debris that results from roughening section 194 avoids unwanted, loose particles of thermosetting resin component 110 becoming trapped between adjacent deposited layers of continuous flexible line 106 that may otherwise result in unwanted properties of composite part 102.

Referring, e.g., to FIGS. 1 and 23 and particularly to FIG. 34, according to method 300, (block 358) roughening at least section 194 of segment 120 of continuous flexible line 106 after segment 120 of continuous flexible line 106 is deposited along print path 122 comprises (block 394) heating section 194 of segment 120 of continuous flexible line 106 to at least partially cure at least section 194 of segment 120 of continuous flexible line 106. The preceding subject matter of this paragraph characterizes example 221 of the present disclosure, wherein example 221 also includes the subject matter according to any one of examples 218-220, above.

Having the roughening also deliver heat to continuous flexible line 106 efficiently cures continuous flexible line 106.

Referring, e.g., to FIGS. 1, 17-20, 23, 32, and 33 and particularly to FIG. 34, method 300 further comprises (block 364) selectively cutting continuous flexible line 106. The preceding subject matter of this paragraph characterizes example 222 of the present disclosure, wherein example 222 also includes the subject matter according to any one of examples 188-221, above.

Selective cutting of continuous flexible line 106 during performance of method 300 permits for the stopping and starting of continuous flexible line 106 in different locations on composite part 102.

Referring, e.g., to FIGS. 1, 17-20, 23, 32, and 33 and particularly to FIG. 34, according to method 300, (block 366) continuous flexible line 106 is selectively cut simultaneously with depositing segment 120 of continuous flexible line 106 along print path 122. The preceding subject matter of this paragraph characterizes example 223 of the present disclosure, wherein example 223 also includes the subject matter according to example 222, above.

Simultaneous cutting and delivering of continuous flexible line 106 provides for controlled deposition of continuous flexible line 106 along print path 122.

Referring, e.g., to FIG. 1 and particularly to FIG. 34, method 300 further comprises (block 368), simultaneously with delivering the predetermined or actively determined amount of curing energy 118 at least to portion 124 of segment 120 of continuous flexible line 106 at the controlled rate, at least partially protecting at least portion 124 of segment 120 of continuous flexible line 106 from oxidation after segment 120 exits delivery guide 112. The preceding subject matter of this paragraph characterizes example 224 of the present disclosure, wherein example 224 also includes the subject matter according to any one of examples 188-223, above.

Protecting portion 124 from oxidation may facilitate the subsequent and/or simultaneous curing of portion 124.

Referring, e.g., to FIG. 1 and particularly to FIG. 34, according to method 300, (block 370) at least portion 124 of segment 120 of continuous flexible line 106 is at least partially protected from the oxidation with shielding gas 221. The preceding subject matter of this paragraph characterizes example 225 of the present disclosure, wherein example 225 also includes the subject matter according to example 224, above.

Again, protecting portion 124 from oxidation may facilitate the subsequent and/or simultaneous curing of portion 124.

Referring, e.g., to FIG. 1 and particularly to FIG. 34, method 300 further comprises (block 372), simultaneously with depositing segment 120 of continuous flexible line 106 along print path 122, detecting defects in composite part 102. The preceding subject matter of this paragraph characterizes example 226 of the present disclosure, wherein example 226 also includes the subject matter according to any one of examples 188-225, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected prior to a subsequent layer of continuous flexible line 106 obscuring, or hiding, the defect from view.

Referring, e.g., to FIG. 1 and particularly to FIG. 34, according to method 300, (block 302) depositing segment 120 of continuous flexible line 106 along print path 122 comprises (block 374) depositing at least a portion of segment 120 of continuous flexible line 106 over a sacrificial layer. The preceding subject matter of this paragraph characterizes example 227 of the present disclosure, wherein example 227 also includes the subject matter according to any one of examples 188-226, above.

Use of a sacrificial layer may permit for deposition of an initial layer of continuous flexible line 106 in midair without requiring an outer mold, surface 114, or other rigid structure for initial deposition of the initial layer. That is, the sacrificial layer may become an outer mold for subsequent deposition of layers that are not sacrificial. Additionally or alternatively, the sacrificial layer may be deposited within an internal volume of composite part 102, such as to facilitate the formation of a void within composite part 102, with the sacrificial layer remaining within the void or with the sacrificial layer subsequently being removed or otherwise disintegrated, for example, so that it does not impact the structural integrity of composite part 102.

Referring, e.g., to FIG. 1 and particularly to FIG. 34, method 300 further comprises (block 376) removing the sacrificial layer to form composite part 102. The preceding subject matter of this paragraph characterizes example 228 of the present disclosure, wherein example 228 also includes the subject matter according to example 227, above.

Removal of the sacrificial layer results in composite part 102 being in a desired state, which may be a completed state or may be a state that is subsequently operated on by processes after completion of method 300.

Referring, e.g., to FIG. 1 and particularly to FIG. 34, method 300 further comprises (block 378) depositing segment 120A of continuous flexible line 106A along print path 122. The preceding subject matter of this paragraph characterizes example 229 of the present disclosure, wherein example 229 also includes the subject matter according to any one of examples 188-228, above.

In other words, different configurations of continuous flexible line 106 may be used during performance of method 300.

For example, different properties of different continuous flexible lines 106 may be selected for different sub-parts of composite part 102. As an example, continuous flexible line 106 may comprise non-resin component 108 that comprises carbon fiber for a significant portion of composite part 102, but continuous flexible line 106 may comprise non-resin component 108 that comprises copper wiring for another portion to define an integral electrical path for connection to an electrical component. Additionally or alternatively, a different non-resin component 108 may be selected for an outer surface of composite part 102 than non-resin component 108 selected for internal portions of composite part 102. Various other examples also are within the scope of example 229.

Referring to FIG. 34, according to method 300, (block 380) continuous flexible line 106A differs from continuous flexible line 106 in at least one of non-resin component 108 or thermosetting resin component 110. The preceding subject matter of this paragraph characterizes example 230 of the present disclosure, wherein example 230 also includes the subject matter according to example 229, above.

Varying non-resin component 108 and/or thermosetting resin component 110 during performance of method 300 permits for customized composite parts 102 to be manufactured with varying and desired properties throughout composite part 102.

Referring, e.g., to FIGS. 1, 4, 5, and 29-31 and particularly to FIG. 34, according to method 300, (block 302) depositing segment 120 of continuous flexible line 106 along print path 122 comprises (block 382) pushing continuous flexible line 106 through delivery guide 112. The preceding subject matter of this paragraph characterizes example 231 of the present disclosure, wherein example 231 also includes the subject matter according to any one of examples 188-230, above.

By pushing continuous flexible line 106 through delivery guide 112, delivery guide 112 may be positioned downstream of the source of motive force that pushes continuous flexible line 106, such as feed mechanism 104 herein. As a result, such source of motive force does not interfere with deposition of continuous flexible line 106, and delivery guide 112 may be more easily manipulated in complex three-dimensional patterns during performance of method 300.

Referring to FIG. 34, method 300 further comprises (block 384) curing composite part 102 in an autoclave or in an oven. The preceding subject matter of this paragraph characterizes example 232 of the present disclosure, wherein example 232 also includes the subject matter according to any one of examples 188-231, above.

In some applications, it may be desirable to not fully cure composite part, in situ, that is, when continuous flexible line 106 is being deposited to form composite part 102. For example, as discussed, in some applications, it may be desirable to not fully cure composite part, in situ, to permit for subsequent work on composite part 102. In such applications, following the subsequent work, a full cure may be achieved in an autoclave or oven.

Referring, e.g., to FIG. 1 and particularly to FIG. 34, according to method 300, (block 396) depositing segment 120 of continuous flexible line 106 along print path 122 and delivering the predetermined or actively determined amount of curing energy 118 at least to portion 124 of segment 120 of continuous flexible line 106 at the controlled rate are performed within chamber 258 that is one of positively pressurized or negatively pressurized relative to atmospheric pressure. The preceding subject matter of this paragraph characterizes example 233 of the present disclosure, wherein example 233 also includes the subject matter according to any one of examples 188-232, above.

Depending on the configuration of composite part 102 being manufactured, it may be desirable to increase and/or decrease the pressure within chamber 258 during curing to obtain desirable properties of composite part 102.

Chamber 258 may be described as, or as comprising or as being comprised by, an autoclave.

Referring, e.g., to FIG. 1 and particularly to FIG. 34, according to method 300, (block 302) depositing segment 120 of continuous flexible line 106 along print path 122 comprises (block 398) initially depositing segment 120 of continuous flexible line 106 against surface 114. The preceding subject matter of this paragraph characterizes example 234 of the present disclosure, wherein example 234 also includes the subject matter according to any one of examples 188-233, above.

Surface 114 therefore provides at least an initial deposition surface, against which continuous flexible line 106 may be deposited. However, subsequent layers of continuous flexible line 106 may be deposited against previously deposited layers of continuous flexible line 106, with surface 114 ultimately providing the structural support for composite part 102 and optionally compaction thereof.

Referring, e.g., to FIG. 1 and particularly to FIG. 34, method 300 further comprises (block 399) heating surface 114. The preceding subject matter of this paragraph characterizes example 235 of the present disclosure, wherein example 235 also includes the subject matter according to example 234, above.

Selective heating of surface 114 may facilitate curing of an initial layer of continuous flexible line 106 being deposited. Additionally or alternatively, selective heating of surface 114, such as at or near the completion of composite part 102, may facilitate removal of composite part 102 from surface 114.

Referring, e.g., to FIG. 1 and particularly to FIG. 34, method 300 further comprises (block 301) applying a vacuum to surface 114. The preceding subject matter of this paragraph characterizes example 236 of the present disclosure, wherein example 236 also includes the subject matter according to any one of examples 234 or 235, above.

Applying a vacuum to surface 114 secures composite part 102 to surface 114 while composite part 102 is being manufactured by method 300.

Referring, e.g., to FIG. 1 and particularly to FIG. 34, according to method 300, (block 303) surface 114 comprises removable gasket 105. The preceding subject matter of this paragraph characterizes example 237 of the present disclosure, wherein example 237 also includes the subject matter according to any one of examples 234-236, above.

Removable gasket 105 may be used, for example, when surface 114 has a vacuum applied thereto, to define an area within which composite part 102 is being built on surface 114.

Referring, e.g., to FIG. 1 and particularly to FIG. 34, method 300 further comprises (block 305) texturing continuous flexible line 106 as continuous flexible line 106 is being deposited. The preceding subject matter of this paragraph characterizes example 238 of the present disclosure, wherein example 238 also includes the subject matter according to any one of examples 188-237, above.

By texturing continuous flexible line 106 as it is being deposited, adhesion between adjacent layers of continuous flexible line may be achieved.

Referring, e.g., to FIGS. 1-5 and particularly to FIG. 35, method 400 of additively manufacturing composite part 102 is disclosed. Method 400 comprises (block 402) applying thermosetting resin 252 to non-resin component 108 of continuous flexible line 106 while pushing non-resin component 108 through delivery guide 112 and pushing continuous flexible line 106 out of delivery guide 112. Continuous flexible line 106 further comprises thermosetting resin component 110 that comprises at least some of thermosetting resin 252 applied to non-resin component 108. Method 400 further comprises (block 404) depositing, via delivery guide 112, segment 120 of continuous flexible line 106 along print path 122. The preceding subject matter of this paragraph characterizes example 239 of the present disclosure.

Method 400 therefore may be performed to manufacture composite parts 102 from at least a composite material that includes non-resin component 108 and thermosetting resin component 110. By applying thermosetting resin 252 to non-resin component 108 during the manufacture of composite part 102, continuous flexible line 106 is created during manufacture of composite part 102. Accordingly, different non-resin components 108 and/or different thermosetting resins 252 may be selected during performance of method 400 to customize or otherwise create a desired composite part 102 with different characteristics at different locations within composite part 102. Moreover, method 400 may be performed to manufacture composite parts 102 with continuous flexible line 106 being oriented in desired and/or predetermined orientations throughout composite part 102, such as to define desired properties of composite part 102.

Method 400 may be performed by system 100.

Referring, e.g., to FIGS. 1-5 and particularly to FIG. 35, according to method 400, (block 402) applying thermosetting resin 252 to non-resin component 108 comprises (block 406) injecting thermosetting resin 252 into delivery guide 112. The preceding subject matter of this paragraph characterizes example 240 of the present disclosure, wherein example 240 also includes the subject matter according to example 239, above.

Injecting thermosetting resin 252 into delivery guide 112, as opposed to, e.g., pulling non-resin component 108 through a resin bath, permits for precise control of the application of thermosetting resin 252 to non-resin component 108.

Referring, e.g., to FIGS. 1-3 and 5 and particularly to FIG. 35, according to method 400, (block 406) injecting thermosetting resin 252 into delivery guide 112 comprises (block 408) separately injecting first part 253 of thermosetting resin 252 and second part 255 of thermosetting resin 252 into delivery guide 112. The preceding subject matter of this paragraph characterizes example 241 of the present disclosure, wherein example 241 also includes the subject matter according to example 240, above.

By separately injecting first part 253 and second part 255 into delivery guide 112, and thus, e.g., closer to outlet 206 of delivery guide 112, the amount of time that first part 253 and second part 255 are intermixed prior to being deposited as part of thermosetting resin component 110 may be minimized. As a result, curing of thermosetting resin component 110 and continuous flexible line 106 may be restricted until continuous flexible line 106 is deposited by delivery guide 112.

Referring, e.g., to FIGS. 1-3 and 5 and particularly to FIG. 35, method 400 further comprises (block 410) mixing first part 253 and second part 255 of thermosetting resin 252 within delivery guide 112. The preceding subject matter of this paragraph characterizes example 242 of the present disclosure, wherein example 242 also includes the subject matter according to example 241, above.

By mixing first part 253 and second part 255 within delivery guide 112, the amount of time that first part 253 and second part 255 are intermixed prior to being deposited as part of thermosetting resin component 110 may be minimized. As a result, curing of thermosetting resin component 110 and continuous flexible line 106 may be restricted until continuous flexible line 106 is deposited by delivery guide 112.

Referring, e.g., to FIGS. 1 and 4 and particularly to FIG. 35, method 400 further comprises (block 412) mixing first part 253 of thermosetting resin 252 and second part 255 of thermosetting resin 252 externally to delivery guide 112. The preceding subject matter of this paragraph characterizes example 243 of the present disclosure, wherein example 243 also includes the subject matter according to example 240, above.

Mixing first part 253 and second part 255 externally to delivery guide 112 may provide for a less complex delivery guide structure and more efficient packaging of delivery guide 112. Moreover, as discussed herein, such a configuration may facilitate use of off-the-shelf resin mixers that may be easily and inexpensively replaced, when needed.

Referring, e.g., to FIGS. 1, 4, and 5 and particularly to FIG. 35, according to method 400, (block 402) applying thermosetting resin 252 to non-resin component 108 comprises (block 414) metering a flow of thermosetting resin 252. The preceding subject matter of this paragraph characterizes example 244 of the present disclosure, wherein example 244 also includes the subject matter according to any one of examples 239-243, above.

Metering the flow of thermosetting resin 252 permits for the selective increase and the selective decrease of the volume of thermosetting resin 252 applied to non-resin component 108. Accordingly, a desired level of saturation of non-resin component 108 with thermosetting resin 252 may be achieved.

Referring, e.g., to FIGS. 1, 4, and 5 and particularly to FIG. 35, according to method 400, (block 414) metering the flow of thermosetting resin 252 comprises (block 416) detecting a level of thermosetting resin 252 within delivery guide 112. The preceding subject matter of this paragraph characterizes example 245 of the present disclosure, wherein example 245 also includes the subject matter according to example 244, above.

Detection of a level of thermosetting resin 252 within delivery guide 112 provides a data input for metering the flow of thermosetting resin 252 to non-resin component 108.

Referring, e.g., to FIGS. 1, 4, and 5 and particularly to FIG. 35, according to method 400, (block 414) metering the flow of thermosetting resin 252 comprises (block 418) selectively reducing or selectively increasing the flow of thermosetting resin 252 to delivery guide 112 responsive to the level of thermosetting resin 252 within delivery guide 112. The preceding subject matter of this paragraph characterizes example 246 of the present disclosure, wherein example 246 also includes the subject matter according to example 245, above.

The selective reduction of the flow of thermosetting resin 252 permits for avoidance of overflowing thermosetting resin 252 from delivery guide 112. The selective increase of the flow of thermosetting resin 252 permits for avoidance of an undesirably low level of saturation of non-resin component 108 with thermosetting resin 252.

Referring, e.g., to FIGS. 1, 4, and 5 and particularly to FIG. 35, according to method 400, (block 414) metering the flow of thermosetting resin 252 comprises (block 420) detecting a saturation level of non-resin component 108 with thermosetting resin 252. The preceding subject matter of this paragraph characterizes example 247 of the present disclosure, wherein example 247 also includes the subject matter according to any one of examples 244-246, above.

Detecting a saturation level of non-resin component 108 with thermosetting resin 252, as opposed to, e.g., simply detecting the presence of thermosetting resin 252 at a given position, may facilitate precisely ensuring a desired level of saturation, such as ensuring adequate penetration of non-resin component 108 with thermosetting resin 252.

Referring, e.g., to FIGS. 1, 4, and 5 and particularly to FIG. 35, according to method 400, (block 414) metering the flow of thermosetting resin 252 comprises (block 422) selectively reducing or selectively increasing the flow of thermosetting resin 252 to delivery guide 112 responsive to the saturation level of non-resin component 108 with thermosetting resin 252. The preceding subject matter of this paragraph characterizes example 248 of the present disclosure, wherein example 248 also includes the subject matter according to example 247, above.

The selective reduction and the selective increase of the flow of thermosetting resin 252 responsive to the saturation level facilitate precisely achieving a desired level of saturation of non-resin component 108 with thermosetting resin 252.

Referring, e.g., to FIGS. 1, 4, and 5 and particularly to FIG. 35, according to method 400, (block 414) metering the flow of thermosetting resin 252 comprises (block 424) metering a flow of first part 253 of thermosetting resin 252 and metering a flow of second part 255 of thermosetting resin 252. The preceding subject matter of this paragraph characterizes example 249 of the present disclosure, wherein example 249 also includes the subject matter according to any one of examples 244-248, above.

Metering the flow of first part 253 and second part 255, that is before they are mixed to create thermosetting resin 252, permits for separately increasing and decreasing the flow of first part 253 and second part 255. Accordingly, while composite part 102 is being manufactured, the ratio of first part 253 to second part 255 may be actively varied, such as to result in desired properties of continuous flexible line 106 along its length and to result in varied properties at different locations within composite part 102.

Referring, e.g., to FIGS. 6 and 7 and particularly to FIG. 35, according to method 400, (block 426) non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 250 of the present disclosure, wherein example 250 also includes the subject matter according to any one of examples 239-249, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

FIG. 6 schematically represents continuous flexible line 106 with a single fiber as non-resin component 108 within a matrix of thermosetting resin component 110. FIG. 7 schematically represents continuous flexible line 106 with more than one fiber as non-resin component 108 within a matrix of thermosetting resin component 110.

Referring, e.g., to FIGS. 1 and 8 and particularly to FIG. 35, according to method 400, (block 404) depositing segment 120 of continuous flexible line 106 along print path 122 comprises (block 428) layering continuous flexible line 106 against itself to additively manufacture composite part 102. The preceding subject matter of this paragraph characterizes example 251 of the present disclosure, wherein example 251 also includes the subject matter according to any one of examples 239-250, above.

By layering continuous flexible line 106 against itself or a previously deposited segment 120, a three-dimensional composite part 102 may be manufactured by performance of method 400.

Referring, e.g., to FIG. 1 and particularly to FIG. 35, according to method 400, (block 404) depositing segment 120 of continuous flexible line 106 along print path 122 comprises (block 430) depositing continuous flexible line 106 in a predetermined pattern to selectively control one or more physical characteristics of composite part 102. The preceding subject matter of this paragraph characterizes example 252 of the present disclosure, wherein example 252 also includes the subject matter according to any one of examples 239-251, above.

By controlling one or more physical characteristics of composite part 102, less overall material may be used and/or the size of a specific part may be reduced when compared to a similar part manufactured by a traditional composite layup method.

For example, in contrast to composite parts constructed from multiple layers of planar plies of composite material, composite part 102 may be manufactured so that the orientation of continuous flexible line 106, and thus of non-resin component 108, results in desired properties. As an example, if a part includes holes, continuous flexible line 106 may be arranged generally in concentric circles or spiral around the holes, resulting in no or few interruptions to continuous flexible line 106 at the boundary of the holes. As a result, the strength of the composite part may be significantly greater around the hole than a similar part constructed by traditional composite layup methods. In addition the composite part may be less subject to cracks and propagation thereof at the boundary of the holes. Moreover, because of the desired properties around the holes, the overall thickness, volume, and/or mass of the composite part may be reduced while achieving the desired properties, when compared to a similar part constructed by traditional composite layup methods.

Referring to FIG. 35, according to method 400, (block 432) the physical characteristics include at least one of strength, stiffness, flexibility, ductility, or hardness. The preceding subject matter of this paragraph characterizes example 253 of the present disclosure, wherein example 253 also includes the subject matter according to example 252, above.

Each of these physical characteristics may be selected for a particular purpose. For example, in a composite part that when in use receives a significant torque on a sub-part thereof compared to the remainder of the composite part, it may be desirable to have such sub-part less stiff and/or more flexible than other portions of the composite part. Additionally, it may be desirable to build more strength into a sub-part than other portions of composite part 102 for various reasons depending on a specific application of composite part 102.

Referring, e.g., to FIGS. 1, 8-11, 14, 21, and 23-28 and particularly to FIG. 35, method 400 further comprises (block 434) delivering a predetermined or actively determined amount of curing energy 118 at least to portion 124 of segment 120 of continuous flexible line 106 at a controlled rate while advancing continuous flexible line 106 toward print path 122 and after segment 120 of continuous flexible line 106 is deposited along print path 122 to at least partially cure at least portion 124 of segment 120 of continuous flexible line 106. The preceding subject matter of this paragraph characterizes example 254 of the present disclosure, wherein example 254 also includes the subject matter according to any one of examples 239-253, above.

By delivering a predetermined or actively determined amount of curing energy 118 to portion 124, continuous flexible line 106, and thus composite part 102, is at least partially cured while composite part 102 is being manufactured, or in situ. As a result of delivering a predetermined or actively determined amount of curing energy 118 at a controlled rate, a desired level, or degree, of cure may be established with respect to portion 124 of segment 120 at any given time during manufacture of composite part 102. For example, as discussed herein, in some examples, it may be desirable to cure one portion 124 greater than or less than another portion 124 during manufacture of composite part 102.

Referring, e.g., to FIGS. 1 and 8 and particularly to FIG. 35, according to method 400, (block 434) delivering the predetermined or actively determined amount of curing energy 118 at least to portion 124 of segment 120 of continuous flexible line 106 at the controlled rate comprises (block 436) partially curing first layer 140 of segment 120 of continuous flexible line 106 as first layer 140 is being deposited and further curing first layer 140 as second layer 142 is being deposited against first layer 140. The preceding subject matter of this paragraph characterizes example 255 of the present disclosure, wherein example 255 also includes the subject matter according to example 254, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

Referring, e.g., to FIGS. 1 and 8 and particularly to FIG. 35, according to method 400, (block 434) delivering the predetermined or actively determined amount of curing energy 118 at least to portion 124 of segment 120 of continuous flexible line 106 at the controlled rate comprises (block 438) partially curing first layer 140 of segment 120 of continuous flexible line 106 as first layer 140 is being deposited and fully curing first layer 140 as second layer 142 is being deposited against first layer 140. The preceding subject matter of this paragraph characterizes example 256 of the present disclosure, wherein example 256 also includes the subject matter according to any one of examples 254 or 255, above.

Again, by only partially curing first layer 140 as first layer 140 is being deposited, first layer 140 may remain tacky, or sticky, thereby facilitating adhesion of second layer 142 against first layer 140 as second layer 142 is deposited against first layer 140. However, according to this example 256, first layer 140 is fully cured as second layer 142 is being partially cured.

Referring, e.g., to FIG. 1 and particularly to FIG. 35, according to method 400, (block 434) delivering the predetermined or actively determined amount of curing energy 118 at least to portion 124 of segment 120 of continuous flexible line 106 at the controlled rate comprises (block 440) curing less than an entirety of composite part 102. The preceding subject matter of this paragraph characterizes example 257 of the present disclosure, wherein example 257 also includes the subject matter according to any one of examples 254-256, above.

In some applications, a less cured portion may be desirable so that it may be subsequently worked on by a subsequent process, such as to remove material and/or add a structural or other component to composite part 102.

Referring, e.g., to FIG. 1 and particularly to FIG. 35, method 400 further comprises (block 442) restrictively curing at least a portion of composite part 102. The preceding subject matter of this paragraph characterizes example 258 of the present disclosure, wherein example 258 also includes the subject matter according to any one of examples 254-257, above.

Again, in some applications, a less cured portion may be desirable so that it may be subsequently worked on by a subsequent process, such as to remove material and/or add a structural or other component to composite part 102, and a less cured portion may result from restriction of the curing process.

Referring, e.g., to FIG. 1 and particularly to FIG. 35, according to method 400, (block 444) the portion of composite part 102 is restrictively cured to facilitate subsequent processing of the portion of composite part 102. The preceding subject matter of this paragraph characterizes example 259 of the present disclosure, wherein example 259 also includes the subject matter according to example 258, above.

Subsequent processing on composite part 102 may be desirable, such as to remove material and/or add a structural or other component to composite part 102.

Referring, e.g., to FIG. 1 and particularly to FIG. 35, according to method 400, (block 434) delivering the predetermined or actively determined amount of curing energy 118 at least to portion 124 of segment 120 of continuous flexible line 106 at the controlled rate comprises (block 446) selectively varying at least one of a delivery rate, a delivery duration, or a temperature of curing energy 118 to impart varying physical characteristics to composite part 102. The preceding subject matter of this paragraph characterizes example 260 of the present disclosure, wherein example 260 also includes the subject matter according to any one of examples 254-259, above.

By imparting varying physical characteristics of composite part 102, a customized composite part 102 may be manufactured with sub-parts having desirable properties that are different from other sub-parts.

Referring to FIG. 35, according to method 400, (block 448) the varying physical characteristics include at least one of strength, stiffness, flexibility, ductility, or hardness. The preceding subject matter of this paragraph characterizes example 261 of the present disclosure, wherein example 261 also includes the subject matter according to example 260, above.

Each of these physical characteristics may be selected for a particular purpose. For example, in composite part 102 that when in use receives a significant torque on a sub-part thereof compared to the remainder of composite part 102, it may be desirable to have such sub-part less stiff and/or more flexible than other parts of composite part 102. Additionally, it may be desirable to build more strength into a sub-part than other parts of composite part 102 for various reasons depending on a specific application of composite part 102.

Referring, e.g., to FIG. 1 and particularly to FIG. 35, method 400 further comprises (block 450), simultaneously with delivering the predetermined or actively determined amount of curing energy 118 at least to portion 124 of segment 120 of continuous flexible line 106 at the controlled rate, at least partially protecting at least portion 124 of segment 120 of continuous flexible line 106 from oxidation after segment 120 exits delivery guide 112. The preceding subject matter of this paragraph characterizes example 262 of the present disclosure, wherein example 262 also includes the subject matter according to any one of examples 254-261, above.

Protecting portion 124 from oxidation may facilitate the subsequent and/or simultaneous curing of portion 124.

Referring, e.g., to FIG. 1 and particularly to FIG. 35, according to method 400, (block 452) at least portion 124 of segment 120 of continuous flexible line 106 is at least partially protected from oxidation with shielding gas 221. The preceding subject matter of this paragraph characterizes example 263 of the present disclosure, wherein example 263 also includes the subject matter according to example 262, above.

Again, protecting portion 124 from oxidation may facilitate the subsequent and/or simultaneous curing of portion 124.

Referring, e.g., to FIGS. 1, 12-16, 23, and 25 and particularly to FIG. 35, method 400 further comprises (block 454), simultaneously with depositing segment 120 of continuous flexible line 106 along print path 122, compacting at least section 180 of segment 120 of continuous flexible line 106 after segment 120 of continuous flexible line 106 is deposited along print path 122. The preceding subject matter of this paragraph characterizes example 264 of the present disclosure, wherein example 264 also includes the subject matter according to any one of examples 239-263, above.

Compaction of section 180 of continuous flexible line 106 during performance of method 400 facilitates adherence between adjacent layers of continuous flexible line 106 being deposited during performance of method 400.

Referring, e.g., to FIG. 13 and particularly to FIG. 35, according to method 400, (block 454) compacting at least section 180 of segment 120 of continuous flexible line 106 after segment 120 of continuous flexible line 106 is deposited along print path 122 comprises (block 456) imparting a desired cross-sectional shape to segment 120 of continuous flexible line 106. The preceding subject matter of this paragraph characterizes example 265 of the present disclosure, wherein example 265 also includes the subject matter according to example 264, above.

It may be desirable, in some applications, to impart a predetermined cross-sectional shape to continuous flexible line 106 as it is being deposited.

Referring, e.g., to FIGS. 1, 12-16, 23, and 25 and particularly to FIG. 35, according to method 400, (block 454) compacting at least section 180 of segment 120 of continuous flexible line 106 after segment 120 of continuous flexible line 106 is deposited along print path 122 comprises (block 480) heating section 180 of segment 120 of continuous flexible line 106 to at least partially cure at least section 180 of segment 120 of continuous flexible line 106. The preceding subject matter of this paragraph characterizes example 266 of the present disclosure, wherein example 266 also includes the subject matter according to any one of examples 264 or 265, above.

Having compaction also deliver heat to continuous flexible line 106 efficiently cures continuous flexible line 106.

Referring, e.g., to FIGS. 1, 12, and 23 and particularly to FIG. 35, method 400 further comprises (block 458), simultaneously with depositing segment 120 of continuous flexible line 106 along print path 122, roughening at least section 194 of segment 120 of continuous flexible line 106 after segment 120 of continuous flexible line 106 is deposited along print path 122. The preceding subject matter of this paragraph characterizes example 267 of the present disclosure, wherein example 267 also includes the subject matter according to any one of examples 239-266, above.

Roughening section 194 of continuous flexible line 106 increases the surface area thereof and aids in adhesion of a subsequent layer of continuous flexible line 106 deposited against it during performance of method 400.

Referring, e.g., to FIGS. 1 and 23 and particularly to FIG. 35, method 400 further comprises (block 460), simultaneously with roughening at least section 194 of segment 120 of continuous flexible line 106, collecting debris resulting from roughening at least section 194 of segment 120 of continuous flexible line 106. The preceding subject matter of this paragraph characterizes example 268 of the present disclosure, wherein example 268 also includes the subject matter according to example 267, above.

Collection of debris that results from roughening section 194 avoids unwanted, loose particles of thermosetting resin component 110 becoming trapped between adjacent deposited layers of continuous flexible line 106 that may otherwise result in unwanted properties of composite part 102.

Referring, e.g., to FIGS. 1 and 23 and particularly to FIG. 35, method 400 further comprises (block 462), simultaneously with roughening at least section 194 of segment 120 of continuous flexible line 106, dispersing debris resulting from roughening at least section 194 of segment 120 of continuous flexible line 106. The preceding subject matter of this paragraph characterizes example 269 of the present disclosure, wherein example 269 also includes the subject matter according to any one of examples 267 or 268, above.

Dispersal of debris that results from roughening section 194 avoids unwanted, loose particles of thermosetting resin component 110 becoming trapped between adjacent deposited layers of continuous flexible line 106 that may otherwise result in unwanted properties of composite part 102.

Referring, e.g., to FIGS. 1 and 23 and particularly to FIG. 35, according to method 400, (block 458) roughening at least section 194 of segment 120 of continuous flexible line 106 after segment 120 of continuous flexible line 106 is deposited along print path 122 comprises (block 482) heating section 194 of segment 120 of continuous flexible line 106 to at least partially cure at least section 194 of segment 120 of continuous flexible line 106. The preceding subject matter of this paragraph characterizes example 270 of the present disclosure, wherein example 270 also includes the subject matter according to any one of examples 267-269, above.

Having the roughening also deliver heat to continuous flexible line 106 efficiently cures continuous flexible line 106.

Referring, e.g., to FIGS. 1, 17-20, 23, 32, and 33 and particularly to FIG. 35, method 400 further comprises (block 464) selectively cutting continuous flexible line 106. The preceding subject matter of this paragraph characterizes example 271 of the present disclosure, wherein example 271 also includes the subject matter according to any one of examples 239-270, above.

Selective cutting of continuous flexible line 106 during performance of method 300 permits for the stopping and starting of continuous flexible line 106 in different locations on composite part 102.

Referring, e.g., to FIGS. 1, 17-20, 23, 32, and 33 and particularly to FIG. 35, according to method 400, (block 466) continuous flexible line 106 is selectively cut simultaneously with depositing segment 120 of continuous flexible line 106 along print path 122. The preceding subject matter of this paragraph characterizes example 272 of the present disclosure, wherein example 272 also includes the subject matter according to example 271, above.

Simultaneous cutting and delivering of continuous flexible line 106 provides for controlled deposition of continuous flexible line 106 along print path 122.

Referring, e.g., to FIG. 1 and particularly to FIG. 35, method 400 further comprises (block 468), simultaneously with depositing segment 120 of continuous flexible line 106 along print path 122, detecting defects in composite part 102. The preceding subject matter of this paragraph characterizes example 273 of the present disclosure, wherein example 273 also includes the subject matter according to any one of examples 239-272, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected prior to a subsequent layer of continuous flexible line 106 obscuring, or hiding, the defect from view.

Referring, e.g., to FIG. 1 and particularly to FIG. 35, according to method 400, (block 404) depositing segment 120 of continuous flexible line 106 along print path 122 comprises (block 470) depositing at least a portion of segment 120 of continuous flexible line 106 over a sacrificial layer. The preceding subject matter of this paragraph characterizes example 274 of the present disclosure, wherein example 274 also includes the subject matter according to any one of examples 239-273, above.

Use of a sacrificial layer may permit for deposition of an initial layer of continuous flexible line 106 in midair without requiring an outer mold, surface 114, or other rigid structure for initial deposition of the initial layer. That is, the sacrificial layer may become an outer mold for subsequent deposition of layers that are not sacrificial. Additionally or alternatively, the sacrificial layer may be deposited within an internal volume of composite part 102, such as to facilitate the formation of a void within composite part 102, with the sacrificial layer remaining within the void or with the sacrificial layer subsequently being removed or otherwise disintegrated, for example, so that it does not impact the structural integrity of composite part 102.

Referring, e.g., to FIG. 1 and particularly to FIG. 35, method 400 further comprises (block 472) removing the sacrificial layer to form composite part 102. The preceding subject matter of this paragraph characterizes example 275 of the present disclosure, wherein example 275 also includes the subject matter according to example 274, above.

Removal of the sacrificial layer results in composite part 102 being in a desired state, which may be a completed state or may be a state that is subsequently operated on by processes after completion of method 400.

Referring, e.g., to FIG. 1 and particularly to FIG. 35, method 400 further comprises (block 474) depositing segment 120A of continuous flexible line 106A along print path 122. The preceding subject matter of this paragraph characterizes example 276 of the present disclosure, wherein example 276 also includes the subject matter according to any one of examples 239-275, above.

In other words, different configurations of continuous flexible line 106 may be used during performance of method 400.

For example, different properties of different continuous flexible lines 106 may be selected for different sub-parts of composite part 102. As an example, continuous flexible line 106 may comprise non-resin component 108 that comprises carbon fiber for a significant portion of composite part 102, but continuous flexible line 106 may comprise non-resin component 108 that comprises copper wiring for another portion to define an integral electrical path for connection to an electrical component. Additionally or alternatively, a different non-resin component 108 may be selected for an outer surface of composite part 102 than non-resin component 108 selected for internal portions of composite part 102. Various other examples also are within the scope of example 276.

Referring to FIG. 35, according to method 400, (block 476) continuous flexible line 106A differs from continuous flexible line 106 in at least one of non-resin component 108 or thermosetting resin component 110. The preceding subject matter of this paragraph characterizes example 277 of the present disclosure, wherein example 277 also includes the subject matter according to example 276, above.

Varying non-resin component 108 and/or thermosetting resin component 110 during performance of method 400 permits for customized composite parts 102 to be manufactured with varying and desired properties throughout composite part 102.

Referring, e.g., to FIGS. 1, 4, 5, and 29-31 and particularly to FIG. 35, method 400 further comprises (block 478) curing composite part 102 in an autoclave or in an oven. The preceding subject matter of this paragraph characterizes example 278 of the present disclosure, wherein example 278 also includes the subject matter according to any one of examples 239-277, above.

By pushing continuous flexible line 106 through delivery guide 112, delivery guide 112 may be positioned downstream of the source of motive force that pushes continuous flexible line 106, such as feed mechanism 104 herein. As a result, such source of motive force does not interfere with deposition of continuous flexible line 106, and delivery guide 112 may be more easily manipulated in complex three-dimensional patterns during performance of method 400.

Referring, e.g., to FIG. 1 and particularly to FIG. 35, method 400 further comprises (block 484) maintaining thermosetting resin 252 below a threshold temperature at least prior to applying thermosetting resin 252 to non-resin component 108. The preceding subject matter of this paragraph characterizes example 279 of the present disclosure, wherein example 279 also includes the subject matter according to any one of examples 239-278, above.

Maintaining thermosetting resin 252 below a threshold temperature prior to being applied to non-resin component 108 restricts curing of thermosetting resin component 110 before continuous flexible line 106 is deposited.

Referring, e.g., to FIG. 1 and particularly to FIG. 35, method 400 further comprises (block 486) maintaining thermosetting resin component 110 below a threshold temperature prior to depositing segment 120 of continuous flexible line 106 along print path 122. The preceding subject matter of this paragraph characterizes example 280 of the present disclosure, wherein example 280 also includes the subject matter according to any one of examples 239-279, above.

Maintaining thermosetting resin component 110 below a threshold temperature prior to continuous flexible line 106 being deposited restricts curing of thermosetting resin component 110.

Referring to FIG. 35, according to method 400, (block 488) the threshold temperature is no greater than 20° C., 15° C., 10° C., 5° C., 0° C., −50° C., −100° C., −150° C., −200° C., −200-−100° C., −100-0° C., −50-5° C., 5-20° C., 5-15° C., or 5-10° C. The preceding subject matter of this paragraph characterizes example 281 of the present disclosure, wherein example 281 also includes the subject matter according to any one of examples 279 or 280, above.

The threshold temperature associated with method 400 may be selected based on thermosetting resin 252 being used, and the examples set forth in example 202 are illustrative and non-exclusive.

Referring, e.g., to FIG. 1 and particularly to FIG. 35, according to method 400, (block 490) depositing segment 120 of continuous flexible line 106 along print path 122 is performed within chamber 258 that is one of positively pressurized or negatively pressurized relative to atmospheric pressure. The preceding subject matter of this paragraph characterizes example 282 of the present disclosure, wherein example 282 also includes the subject matter according to any one of examples 239-281, above.

Depending on the configuration of composite part 102 being manufactured, it may be desirable to increase and/or decrease the pressure within chamber 258 during curing to obtain desirable properties of composite part 102.

Chamber 258 may be described as, or as comprising or as being comprised by, an autoclave.

Referring, e.g., to FIG. 1 and particularly to FIG. 35, according to method 400, (block 404) depositing segment 120 of continuous flexible line 106 along print path 122 comprises (block 492) initially depositing segment 120 of continuous flexible line 106 against surface 114. The preceding subject matter of this paragraph characterizes example 283 of the present disclosure, wherein example 283 also includes the subject matter according to any one of examples 239-282, above.

Surface 114 therefore provides at least an initial deposition surface, against which continuous flexible line 106 may be deposited. However, subsequent layers of continuous flexible line 106 may be deposited against previously deposited layers of continuous flexible line 106, with surface 114 ultimately providing the structural support for composite part 102 and optionally compaction thereof.

Referring, e.g., to FIG. 1 and particularly to FIG. 35, method 400 further comprises (block 494) heating surface 114. The preceding subject matter of this paragraph characterizes example 284 of the present disclosure, wherein example 284 also includes the subject matter according to example 283, above.

Selective heating of surface 114 may facilitate curing of an initial layer of continuous flexible line 106 being deposited. Additionally or alternatively, selective heating of surface 114, such as at or near the completion of composite part 102, may facilitate removal of composite part 102 from surface 114.

Referring, e.g., to FIG. 1 and particularly to FIG. 35, method 400 further comprises (block 496) applying a vacuum to surface 114. The preceding subject matter of this paragraph characterizes example 285 of the present disclosure, wherein example 285 also includes the subject matter according to any one of examples 283 or 284, above.

Applying a vacuum to surface 114 secures composite part 102 to surface 114 while composite part 102 is being manufactured by method 400.

Referring, e.g., to FIG. 1 and particularly to FIG. 35, according to method 400, (block 498) surface 114 comprises removable gasket 105. The preceding subject matter of this paragraph characterizes example 286 of the present disclosure, wherein example 286 also includes the subject matter according to any one of examples 283-285, above.

Removable gasket 105 may be used, for example, when surface 114 has a vacuum applied thereto, to define an area within which composite part 102 is being built on surface 114.

Referring, e.g., to FIG. 1 and particularly to FIG. 35, method 400 further comprises (block 499) texturing continuous flexible line 106 as continuous flexible line 106 is being deposited. The preceding subject matter of this paragraph characterizes example 287 of the present disclosure, wherein example 287 also includes the subject matter according to any one of examples 239-286, above.

By texturing continuous flexible line 106 as it is being deposited, adhesion between adjacent layers of continuous flexible line 106 may be achieved.

Examples of the present disclosure may be described in the context of aircraft manufacturing and service method 1100 as shown in FIG. 36 and aircraft 1102 as shown in FIG. 37. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 37, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A system for additively manufacturing a composite part, the system comprising:
    a delivery guide, movable relative to a surface, wherein:
        the delivery guide is configured to deposit at least a segment of a continuous flexible line along a print path, wherein the continuous flexible line comprises a non-resin component and a thermosetting resin component, wherein the thermosetting resin component comprises a first part of a thermosetting resin and a second part of the thermosetting resin;
        the print path is stationary relative to the surface;
        the delivery guide comprises a first inlet, configured to receive the non-resin component, and a second inlet, configured to receive at least the first part of the thermosetting resin; and
        the delivery guide is further configured to apply the first part of the thermosetting resin and the second part of the thermosetting resin to the non-resin component;
    a feed mechanism, configured to push the continuous flexible line out of the delivery guide; and
    a source of curing energy, wherein the source of the curing energy comprises at least one galvanometer mirror-positioning system, configured to deliver a ring of the curing energy, intersecting the segment of the continuous flexible line, responsive to movement of the delivery guide relative to the surface after the segment of the continuous flexible line exits the delivery guide.

2. The system according to claim 1, further comprising an external mixing structure, configured to operatively combine the first part and the second part of the thermosetting resin outside of the delivery guide, wherein the second inlet is configured to receive the thermosetting resin from the external mixing structure.

3. The system according to claim 2, wherein the external mixing structure comprises one or more mixing guides, configured to intermix the first part of the thermosetting resin and the second part of the thermosetting resin.

4. The system according to claim 2, wherein the external mixing structure comprises an off-the-shelf resin-mixing nozzle.

5. The system according to claim 2, further comprising:
    a first vessel, configured to dispense the first part of the thermosetting resin to the external mixing structure;
    a second vessel, configured to dispense the second part of the thermosetting resin to the external mixing structure; and
    a resin-metering system, configured to actively control a flow of the first part of the thermosetting resin to the external mixing structure and to actively control a flow of the second part of the thermosetting resin to the external mixing structure, and thus to actively control a flow of the thermosetting resin to the second inlet of the delivery guide, wherein the resin-metering system comprises at least one sensor, configured to detect a level of the thermosetting resin in the delivery guide.

6. The system according to claim 5, wherein:
    the at least one sensor comprises a high-level sensor, configured to detect when the level of the thermosetting resin is at or above an upper threshold level in the delivery guide; and
    the resin-metering system is configured to reduce the flow of the first part and the flow of the second part of the thermosetting resin responsive to the thermosetting resin being at or above the upper threshold level in the delivery guide.

7. The system according to claim 5, wherein:
    the at least one sensor comprises a low-level sensor, configured to detect when the level of the thermosetting resin is at or below a lower threshold level in the delivery guide; and
    the resin-metering system is configured to increase the flow of the first part and the flow of the second part of the thermosetting resin responsive to the thermosetting resin being at or below the lower threshold level in the delivery guide.

8. The system according to claim 7, wherein the low-level sensor is positioned upstream from the second inlet.

9. The system according to claim 7, wherein the low-level sensor is positioned downstream from the second inlet.

10. The system according to claim 5, wherein the at least one sensor comprises a saturation sensor, positioned to detect a level of saturation of the non-resin component with the thermosetting resin, prior to the continuous flexible line exiting the delivery guide.

11. The system according to claim 5, wherein the resin-metering system further comprises:
a first pump, configured to selectively increase or decrease the flow of the first part of the thermosetting resin responsive to input from the at least one sensor; and
a second pump, configured to selectively increase or decrease the flow of the second part of the thermosetting resin responsive to input from the at least one sensor.

12. The system according to claim 1, wherein the delivery guide further comprises:
a third inlet, configured to receive the second part of the thermosetting resin; and
an internal mixing structure, configured to operatively combine the first part and the second part of the thermosetting resin within the delivery guide.

13. The system according to claim 12, wherein the delivery guide is further configured to provide selective access to the internal mixing structure for removing cured thermosetting resin from the delivery guide.

14. The system according to claim 13, wherein the delivery guide further comprises a first portion and a second portion, configured to be selectively spaced away from the first portion.

15. The system according to claim 14, wherein the first portion is hinged to the second portion.

16. The system according to claim 12, wherein:
the delivery guide further comprises an outlet and a line passage, extending from the first inlet to adjacent the outlet;
the outlet is configured to provide an exit for the continuous flexible line from the delivery guide;
the delivery guide further comprises a resin passage, extending from the second inlet and the third inlet to adjacent the outlet; and
the internal mixing structure comprises one or more mixing guides, positioned within the resin passage.

17. The system according to claim 16, wherein:
the line passage is isolated from the resin passage longitudinally along at least a portion of the line passage; and
the line passage and the resin passage are in fluid communication with each other adjacent to the outlet, such that the thermosetting resin is applied to the non-resin component adjacent to the outlet.

18. The system according to claim 16, wherein the one or more mixing guides are at least partially discontinuous along the resin passage.

19. The system according to claim 12, wherein the system further comprises:
a first vessel, configured to dispense the first part of the thermosetting resin to the second inlet of the delivery guide;
a second vessel, configured to dispense the second part of the thermosetting resin to the third inlet of the delivery guide; and
a resin-metering system, configured to actively control a flow of the first part of the thermosetting resin to the second inlet of the delivery guide and to actively control a flow of the second part of the thermosetting resin to the third inlet of the delivery guide, wherein the resin-metering system comprises at least one sensor, configured to detect a level of the thermosetting resin in the delivery guide.

20. The system according to claim 19, wherein:
the at least one sensor comprises a high-level sensor, configured to detect when the level of the thermosetting resin is at or above an upper threshold level in the delivery guide; and
the resin-metering system is configured to reduce the flow of the first part and the flow of the second part of the thermosetting resin responsive to the thermosetting resin being at or above the upper threshold level in the delivery guide.

21. The system according to claim 19, wherein:
the at least one sensor comprises a low-level sensor, configured to detect when the level of the thermosetting resin is at or below a lower threshold level in the delivery guide; and
the resin-metering system is configured to increase the flow of the first part and the flow of the second part of the thermosetting resin responsive to the thermosetting resin being at or below the lower threshold level in the delivery guide.

22. The system according to claim 21, wherein the low-level sensor is positioned upstream from the second inlet and the third inlet.

23. The system according to claim 21, wherein the low-level sensor is positioned downstream from the second inlet and the third inlet.

24. The system according to claim 19, wherein the at least one sensor comprises a saturation sensor, positioned to detect a level of saturation of the non-resin component with the thermosetting resin, prior to the continuous flexible line exiting the delivery guide.

25. The system according to claim 19, wherein the resin-metering system further comprises:
a first pump, configured to selectively increase or decrease the flow of the first part of the thermosetting resin responsive to input from the at least one sensor; and
a second pump, configured to selectively increase or decrease the flow of the second part of the thermosetting resin responsive to input from the at least one sensor.

26. The system according to claim 12, wherein:
the delivery guide further comprises an outlet and a line passage, extending from the first inlet to the outlet;
the outlet is configured to provide an exit for the continuous flexible line from the delivery guide; and
the internal mixing structure comprises one or more mixing guides, positioned within the delivery guide and configured to intermix the first part and the second part of the thermosetting resin.

27. The system according to claim 26, wherein the one or more mixing guides are at least partially discontinuous along the line passage.

28. The system according to claim 26, wherein only a portion of the one or more mixing guides defines the line passage.

29. The system according to claim 26, wherein at least a portion of the one or more mixing guides is angled toward the outlet.

30. The system according to claim 29, wherein at least the portion of the one or more mixing guides is angled toward the outlet at a pitch that varies along the line passage.

31. The system according to claim 1, wherein:
the source of the curing energy further comprises a heat source;
the heat source comprises a conductive heat source;
the system further comprises a compactor, operatively coupled to the delivery guide;
the compactor is configured to impart a compaction force at least to a section of the segment of the continuous flexible line after the segment of the continuous flexible line exits the delivery guide; and
the compactor comprises the conductive heat source.

32. The system according to claim 31, wherein the compactor is configured to trail the delivery guide when the delivery guide moves relative to the surface.

33. The system according to claim 1, wherein:
the source of the curing energy further comprises a heat source;
the heat source comprises a conductive heat source;
the system further comprises a surface roughener, operatively coupled to the delivery guide;
the surface roughener is configured to abrade at least a section of the segment of the continuous flexible line after the segment of the continuous flexible line exits the delivery guide; and
the surface roughener comprises the conductive heat source.

34. The system according to claim 33, wherein the surface roughener is configured to trail the delivery guide when the delivery guide moves relative to the surface.

35. The system according to claim 1, wherein the source the curing energy is configured to partially cure a first layer of the segment of the continuous flexible line as at least a portion of the first layer is being deposited by the delivery guide against the surface and to further cure the first layer and to partially cure a second layer as the second layer is being deposited by the delivery guide against the first layer.

36. The system according to claim 1, further comprising a compactor operatively coupled to the delivery guide, wherein the compactor is configured to impart a compaction force at least to a section of the segment of the continuous flexible line after the segment of the continuous flexible line exits the delivery guide.

37. The system according to claim 36, further comprising a pivoting arm coupled relative to the delivery guide such that the pivoting arm trails the delivery guide as the delivery guide moves relative to the surface, wherein the compactor is coupled to the pivoting arm.

38. The system according to claim 1, further comprising a surface roughener operatively coupled to the delivery guide, wherein the surface roughener is configured to abrade at least a section of the segment of the continuous flexible line after the segment of the continuous flexible line exits the delivery guide.

39. The system according claim 38, further comprising a pivoting arm, configured such that the pivoting arm trails the delivery guide as the delivery guide moves relative to the surface, wherein the surface roughener is coupled to the pivoting arm.

40. The system according to claim 1, wherein:
the delivery guide further comprises an outlet and a line passage, extending from the first inlet to the outlet;
the outlet is configured to provide an exit for the continuous flexible line from the delivery guide;
the feed mechanism comprises a support frame and opposing rollers having respective rotational axes;
the opposing rollers are rotatably coupled to the support frame;
the opposing rollers are configured to engage opposite sides of the non-resin component; and
the opposing rollers are configured to selectively rotate to push the non-resin component through the line passage and the continuous flexible line out of the delivery guide.

41. The system according to claim 1, wherein:
the delivery guide further comprises an outlet and a line passage, extending from the first inlet to the outlet;
the outlet is configured to provide an exit for the continuous flexible line from the delivery guide; and
the system further comprises a cutter, configured to selectively cut the continuous flexible line adjacent to the outlet.

42. The system according to claim 1, further comprising a defect detector, configured to detect defects in the segment the continuous flexible line after the segment of the continuous flexible line exits the delivery guide.

43. The system according to claim 1, further comprising a cooling system, configured to maintain the thermosetting resin component of the continuous flexible line below a threshold temperature prior to the continuous flexible line being deposited by the delivery guide.

* * * * *

UNITED STATES PATENT AND TRADEMARK OFFICE
CERTIFICATE OF CORRECTION

PATENT NO. : 10,343,355 B2
APPLICATION NO. : 14/995507
DATED : July 9, 2019
INVENTOR(S) : Nick S. Evans et al.

Page 1 of 1

It is certified that error appears in the above-identified patent and that said Letters Patent is hereby corrected as shown below:

In the Claims

Claim 35, Column 75, Lines 32-33, "source the curing energy" should be --source of the curing energy--

Claim 42, Column 76, Lines 37-38, "segment the continuous flexible line" should be --segment of the continuous flexible line--

Signed and Sealed this
Third Day of December, 2019

Andrei Iancu
*Director of the United States Patent and Trademark Office*